United States Patent
Tansey, Jr.

(10) Patent No.: US 10,513,424 B2
(45) Date of Patent: *Dec. 24, 2019

(54) INTERNET-ENABLED BEVERAGE MAKER

(71) Applicant: Francis X. Tansey, Jr., Manalapan, NJ (US)

(72) Inventor: Francis X. Tansey, Jr., Manalapan, NJ (US)

(73) Assignee: FOUNTAIN MASTER, LLC, Manalapan, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/261,132

(22) Filed: Sep. 9, 2016

(65) Prior Publication Data

US 2016/0376140 A1 Dec. 29, 2016

Related U.S. Application Data

(60) Continuation of application No. 14/641,013, filed on Mar. 6, 2015, now Pat. No. 9,809,437, which is a
(Continued)

(51) Int. Cl.
*B67D 1/00* (2006.01)
*A47J 31/44* (2006.01)
(Continued)

(52) U.S. Cl.
CPC .............. *B67D 1/0021* (2013.01); *A23L 2/54* (2013.01); *A47J 31/44* (2013.01); *A47J 31/4492* (2013.01);
(Continued)

(58) Field of Classification Search
CPC .................................................. B67D 1/0021
(Continued)

(56) References Cited

U.S. PATENT DOCUMENTS

| 3,081,002 A | 3/1963 | Tauschinski |
| 4,915,261 A | 4/1990 | Strenger |

(Continued)

FOREIGN PATENT DOCUMENTS

| AU | 2011202602 A1 | 7/2011 |
| EP | 1629882 A1 | 3/2006 |

(Continued)

OTHER PUBLICATIONS

PCT/US2012/053847; PCT International Preliminary Report on Patentability; dated Mar. 12, 2014.
(Continued)

*Primary Examiner* — Timothy R Waggoner
(74) *Attorney, Agent, or Firm* — Haley Guiliano LLP; James A. Leiz

(57) ABSTRACT

A home beverage dispensing device for dispensing servings of a beverage, having a vessel for holding a volume of liquid. This vessel may be equipped with a refrigeration unit, or may be comprised of a removable pitcher that may be put in an external refrigerator. This invention is equipped with a radio communications controller to provide for the ability to communicate over radio frequencies such as Wi-Fi and Bluetooth. A special disposable beverage cartridge or beverage pouch fits into the holder. This cartridge or pouch may have pressure rupturable seals or diaphragms and contain beverage concentrate. The mixing structure also receives the optionally chilled liquid from vessel for holding a volume of liquid, and ensures that the concentrate mixes with the liquid without contacting the walls of the mixing structure.

14 Claims, 31 Drawing Sheets

Related U.S. Application Data continuation-in-part of application No. 14/620,423, filed on Feb. 12, 2015, now Pat. No. 9,701,527, which is a continuation-in-part of application No. 13/604,825, filed on Sep. 6, 2012, now Pat. No. 8,985,395, which is a division of application No. 13/604,825, filed on Sep. 6, 2012, now Pat. No. 8,985,395.

(60) Provisional application No. 61/581,722, filed on Dec. 30, 2011, provisional application No. 61/532,692, filed on Sep. 9, 2011.

(51) Int. Cl.

| | | |
|---|---|---|
| *B65D 47/20* | (2006.01) | |
| *B65D 75/58* | (2006.01) | |
| *B67D 1/04* | (2006.01) | |
| *B67D 1/08* | (2006.01) | |
| *B67D 1/10* | (2006.01) | |
| *A23L 2/54* | (2006.01) | |
| *G06Q 30/02* | (2012.01) | |
| *B65D 1/09* | (2006.01) | |
| *B65D 35/28* | (2006.01) | |
| *B65D 1/02* | (2006.01) | |

(52) U.S. Cl.
CPC ...... *B65D 47/2031* (2013.01); *B65D 75/5811* (2013.01); *B65D 75/5883* (2013.01); *B67D 1/0001* (2013.01); *B67D 1/0015* (2013.01); *B67D 1/0051* (2013.01); *B67D 1/0057* (2013.01); *B67D 1/0058* (2013.01); *B67D 1/0071* (2013.01); *B67D 1/0078* (2013.01); *B67D 1/0079* (2013.01); *B67D 1/0085* (2013.01); *B67D 1/0462* (2013.01); *B67D 1/0801* (2013.01); *B67D 1/0809* (2013.01); *B67D 1/0857* (2013.01); *B67D 1/0858* (2013.01); *B67D 1/0869* (2013.01); *B67D 1/0884* (2013.01); *B67D 1/0888* (2013.01); *B67D 1/10* (2013.01); *B67D 1/101* (2013.01); *G06Q 30/0269* (2013.01); *A23V 2002/00* (2013.01); *B65D 1/0238* (2013.01); *B65D 1/095* (2013.01); *B65D 35/28* (2013.01); *B65D 35/285* (2013.01); *B65D 75/5822* (2013.01); *B65D 75/5855* (2013.01); *B67D 2001/0811* (2013.01)

(58) Field of Classification Search
USPC .......................................................... 700/236
See application file for complete search history.

(56) References Cited

U.S. PATENT DOCUMENTS

| | | |
|---|---|---|
| 5,213,236 A | 5/1993 | Brown et al. |
| 5,954,237 A | 9/1999 | Lampe et al. |
| 6,182,555 B1 | 2/2001 | Scheer |
| 6,169,420 B1 | 3/2001 | Gutierrez |
| 6,421,583 B1 * | 7/2002 | Sudolcan ............ B67D 1/0888 700/232 |
| 6,536,626 B2 * | 3/2003 | Newman ............ B67D 1/0028 222/129.3 |
| 6,799,085 B1 * | 9/2004 | Crisp, III ............ B67D 1/0057 222/146.6 |
| 6,874,665 B2 | 4/2005 | Doherty |
| 7,594,525 B2 * | 9/2009 | Girard .................. A47J 31/407 141/351 |
| 7,651,015 B2 | 1/2010 | Girard et al. |
| 7,661,352 B2 | 7/2010 | Boland |
| 8,157,127 B2 | 4/2012 | Mauger |
| 8,250,972 B2 | 8/2012 | Santoiemmo |
| 8,356,733 B2 | 1/2013 | Py |
| 8,469,240 B2 | 6/2013 | Wellman |
| 8,348,104 B2 | 8/2013 | Py |
| 2006/0144244 A1 * | 7/2006 | Girard .................. A47J 31/402 99/295 |
| 2008/0135117 A1 | 6/2008 | Hansson et al. |
| 2010/0003386 A1 | 1/2010 | Cheng |
| 2010/0263544 A1 | 10/2010 | Kodden |
| 2011/0020508 A1 | 1/2011 | Santoiemmo |
| 2014/0314918 A1 | 10/2014 | Wettlaufer et al. |
| 2016/0000135 A1 | 1/2016 | Evans et al. |

FOREIGN PATENT DOCUMENTS

| | | |
|---|---|---|
| WO | 2007056097 A3 | 5/2007 |
| WO | 2007072374 A3 | 6/2007 |
| WO | 2008124851 A1 | 10/2008 |
| WO | 2011/020934 A2 | 2/2011 |

OTHER PUBLICATIONS

PCT/US2012/053847; International Search Report and Written Opinion; dated Feb. 7, 2013.
PCT/US2016/020930;International Search Report and Written Opinion; dated Jun. 23, 2016.

* cited by examiner

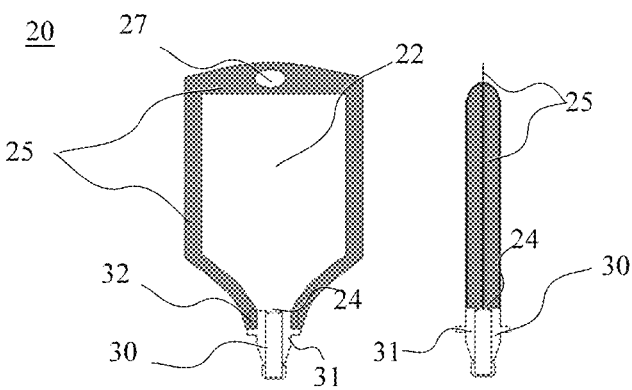
FIG. 7A    FIG. 7B
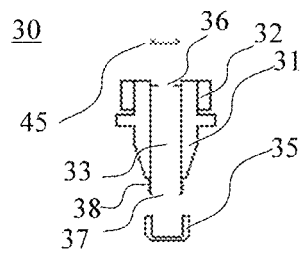  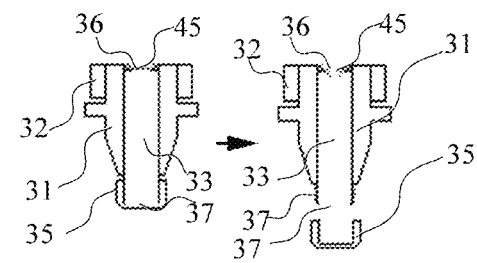
FIG. 7C    FIG. 7D
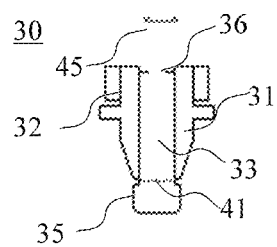  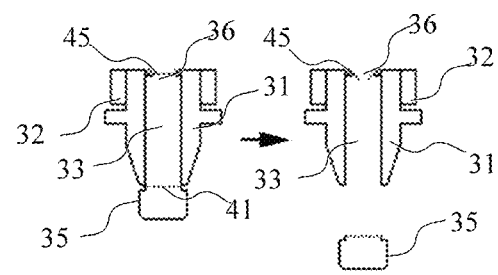
FIG. 7E    FIG. 7F
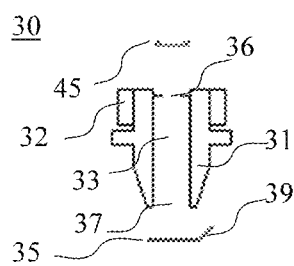  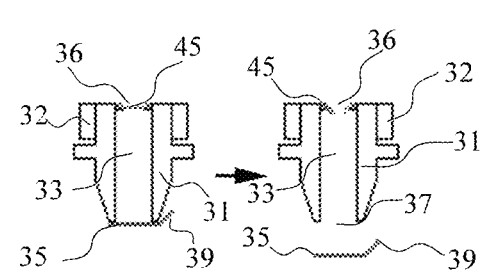
FIG. 7G    FIG. 7H

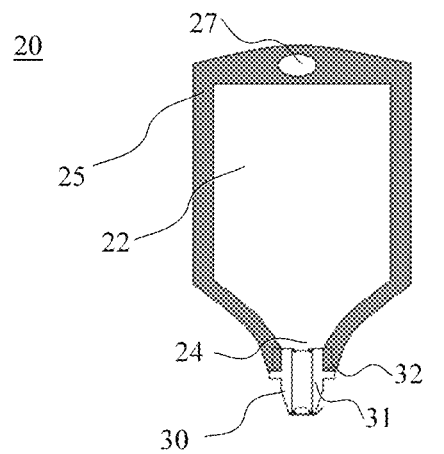
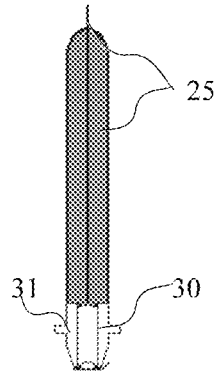
FIG. 8A      FIG. 8B
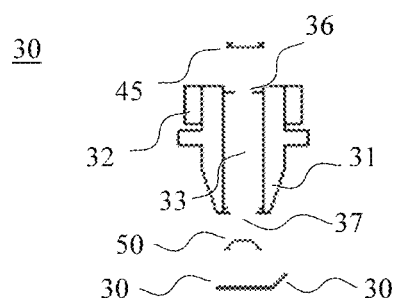
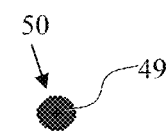
FIG. 8C      FIG. 8D
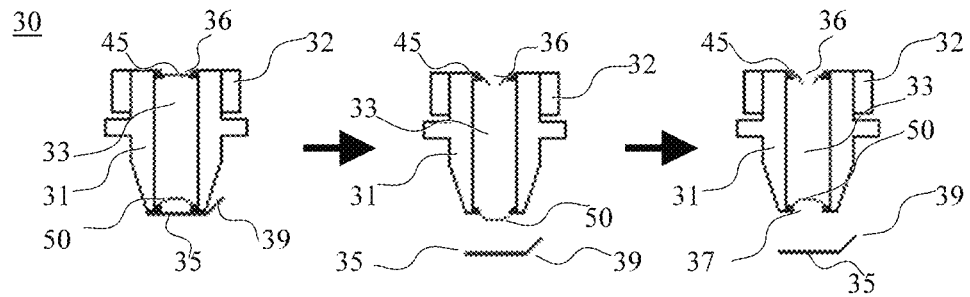
FIG. 8E      FIG. 8F      FIG. 8G

INTERNET-ENABLED BEVERAGE MAKER

CLAIM OF PRIORITY

This application is a continuation of U.S. patent application Ser. No. 14/641,013 filed on Mar. 6, 2015, which is a continuation-in-part of U.S. patent application Ser. No. 14/620,423, filed on Feb. 12, 2015, which is a divisional of U.S. patent application Ser. No. 13/604,825, filed on Sep. 6, 2012 (now U.S. Pat. No. 8,985,395) which claims priority to U.S. Provisional Application No. 61/532,692, filed on Sep. 9, 2011, and 61/581,722, filed on Dec. 30, 2011. This application further claims the priority of U.S. patent application Ser. No. 15/152,171 filed on Mar. 11, 2016 which is a continuation of Ser. No. 14/686,867 filed on Apr. 15, 2015 which is a continuation of U.S. patent application Ser. No. 14/620,423, filed on Feb. 12, 2015, which is a divisional of U.S. patent application Ser. No. 13/604,825 filed on Sep. 6, 2012 which claims priority to U.S. Provisional Application No. 61/532,692, filed on Sep. 9, 2011, and 61/581,722, filed on Dec. 30, 2011. The contents of all of these applications are hereby fully incorporated by reference in their entirety.

FIELD OF THE INVENTION

The invention relates to a single serve beverage maker and dispenser, including the disposable beverage containers and removable water pitcher used therein. More particularly, the current invention relates to a device for preparing, making and dispensing single servings of a selected beverage from an associated refrigerating device or a removable water pitcher, wherein the beverage may or may not be carbonated, may or may not be cooled, using a disposable beverage pouch or cartridge that avoids flavor contamination of the device by the beverage being dispensed, may provide precise mixing ratios in order to dispense high quality beverages, and may be operated via, for example, a Wi-Fi connection.

BACKGROUND OF THE INVENTION

The invention relates to a single serve dispenser for beverages that use individual disposable beverage pouches or cartridges and in which the dispensed beverage may, or may not, be carbonated.

Single serve dispensers for hot beverages are popular as they allow individuals to quickly brew a fresh cup of their favorite flavored hot beverage in a reasonably economic way.

Having a similar device for cold flavored beverages should be as popular. There are, however, problems in producing cold beverages from single serve cartridges, and currently, there are no single serve container/delivery systems for serving cold beverages.

A significant problem is serving temperature. While coffee is best made at about 195 degrees Fahrenheit, even hot coffee is only drunk at about 150 degrees Fahrenheit. The flavor of the coffee is, therefore, not diminished when the boiling hot water at 212 degrees Fahrenheit is cooled significantly as it comes into contact with the contents of the disposable beverage cartridge.

With cold drinks, a problem is that sodas and juices such as, but not limited to, Coca-Cola™, Pepsi™, or Minute Made™ Orange juice, taste best when consumed at a temperature of around 34-36 degrees Fahrenheit. This temperature is important both because warm drinks are less able to maintain carbonation, and warm drinks melt more ice, diluting the optimum syrup/water ratio. As the best refrigeration unit is only going to maintain water at a temperature of about 33-34 degrees Fahrenheit, and the disposable beverage cartridge or pouch is at room temperature, i.e., 70 degrees Fahrenheit, the device has to be carefully constructed so that the single serve beverage is not dispensed at an unpleasantly—or at least, sub-optimal—warm temperature.

A second problem is the nature of the contents of the disposable beverage pouch or cartridge. With hot drinks, the contents of the pouch or cartridge are typically granules or powders that are easily dissolved into the hot water, making the system essentially self-cleaning. With cold drinks, the contents of the pouch or cartridge are typically concentrated, often sugary, syrups. These syrups can, if the device is not carefully designed, re-coagulate and contaminate the dispensing elements. Not only may this reduce the efficiency of the process, but it may lead to cross-contamination of the flavor of the beverage, spoiling the user experience.

A third problem is the mix ratio, i.e., the ratio of the volumes of water to syrup or concentrate that must be combined for the optimum taste experience. These ratios tend to be more exacting for cold beverages because the resultant cold beverage is a combination of the two kinds of liquid, rather than an infusion of an ingredient into the primary liquid as in a hot drink.

A forth problem is dispensing time. With hot drinks dispensing time is usually 30 to 60 seconds, the water flows through the cartridge where it fuses with the dry ingredients, sits for a few seconds to steep, then exists into the users cup. With a cold beverage, dispensing time should take between 4 to 6 seconds, especially with carbonated beverages, because the $CO_2$ gas starts to leave the liquid as soon as it is mixed which will affect drink quality.

A fifth problem is method of dispensing. With hot drinks the liquid flows through the cartridge or pouch and mixes inside a brewing compartment where the ingredients fuse. With a cold beverage, especially carbonated ones, this method will cause excessive off-gassing of the carbonated liquid when it mixes with the syrup/concentrate causing the mixture to excessively bubble and foam which creates a mess and affects the quality of the drink. My cold beverage dispensing method is constructed in such a way to avoid these issues.

It is these, and related, problems associated with dispensing small quantities of cold beverages from disposable beverage container that our inventive disposable beverage pouch or cartridge and dispensing device address.

DESCRIPTION OF THE RELATED ART

The relevant prior art involving single serving beverage dispensers includes:

U.S. Pat. No. 6,182,555 granted to Scheer, et al. on Feb. 6, 2001 entitled "Apparatus and methods for brewing and dispensing beverages" that describes a brewing machine that freshly brews a single-serving of coffee or tea to be served hot or cold. The machine preferably includes a housing assembly, with a window therein to permit the viewing of the brewing of a fresh serving of coffee or tea, a water supply, a dry coffee or tea storage area, a brewer, and a flavor additive storage area. The coffee or tea is preferably brewed in a condensed form which becomes diluted to drinking strength by the addition of hot or cool water, and/or by the addition of hot or cool flavorings. The cool drink can subsequently be served over ice to provide a cold serving of iced coffee or tea. Mixing the various ingredients to obtain the final cup of coffee or tea preferably occurs in the user's cup. Preferred methods of making a freshly brewed single-serving of coffee or tea are disclosed.

U.S. Pat. No. 7,661,352 granted to Sher, et al. on Feb. 16, 2010 entitled "Method and system for in-cup dispensing, mixing and foaming hot and cold beverages from liquid concentrates" that describes a liquid food dispensing device (1) for dispensing hot or cold beverages or other liquid foods without using any mixing or whipping chambers comprising at least one liquid component source (30, 31) and a diligent source (18), a delivery device and at least one diligent nozzle and one food component nozzle wherein the delivery device and diligent and food component nozzles are configured for ejecting at least one stream (6a, 6b) of diligent at a predetermined spatial configuration inside a container (10) and within a velocity range effective to create turbulence and mix the food component so to produce the food product such as the hot or cold beverage.

US Patent Application 20110020508 by Santoiemmo; Carl published on Jan. 27, 2011 entitled "Select Serving and Flavored Sparkling Beverage Maker" that describes a method and a device to make a single or a multiple repeated single servings of a select flavored, carbonated beverage.

US Patent Application 20100003386 by Cheng; Pu-Sheng et al, published on Jan. 7, 2010 entitled "System, Method and Composition for Dispensing a Liquid Beverage Concentrate" that describes a beverage system for providing a beverage, methods of making the beverage and the resulting beverage are disclosed herein. The system includes a beverage-forming concentrate and an aroma or aroma-providing component separated from the concentrate; wherein the concentrate and aroma are combinable upon reconstitution for providing the beverage. One method includes delivering a fresh beverage taste to an on-premise beverage at a point of dispensation, by delivering at least one aroma or aroma-providing component in an amount sufficient to enhance the organoleptic properties of a beverage separately from a beverage concentrate prior to when the beverage is dispensed, and mixing the aroma or aroma-providing compound with a liquid and the beverage concentrate or with a mixture of a beverage concentrate and a liquid when the beverage is being dispensed. The resulting beverage may be coffee, tea, carbonation, a juice, milk, or a non-dairy creamer-based component; or a combination thereof, while the aroma or aroma-providing component is coffee aroma, tea aroma, chocolate or cocoa aroma, malt, Maillard reaction flavor, or a combination thereof.

Various implements are known in the art, but fail to address all of the problems solved by the invention described herein. One embodiment of this invention is illustrated in the accompanying drawings and will be described in more detail herein below.

SUMMARY OF THE INVENTION

The present invention relates to a beverage dispensing device for dispensing individual servings of a cold beverage which may or may not be carbonated. In a preferred embodiment, the beverage dispensing device may have a liquid container that is fluidly connected to a liquid refrigeration unit or a removable vessel that may be put into a refrigerator. The beverage dispensing device may also include a beverage cartridge or pouch holder. The beverage dispensing device may be designed such that a beverage dispensing pouch or a beverage dispensing cartridge may be fitted into the holder.

The present invention also relates to a method comprising the steps of: providing, a home beverage dispensing device, wherein said device is capable of receiving a volume of liquid, optionally carbonating said liquid, and said device comprising: a vessel for holding a volume of a liquid; a main unit comprising: a head compartment; a main unit housing substantially enveloping said main unit; a bottom; a system for carbonating said liquid; at least one sensor; a source of $CO_2$; and a controller for connecting to the internet; operating, the device, in a manner where the sensor is triggered to create at least one item of information, and combined with a predetermined amount of a consumable; transmitting, information obtained by said at least one sensor to an internet-enabled electronic device; viewing, via a software application, said information obtained by said at least one sensor on said internet-enabled electronic device.

The present invention also discloses a method comprising the steps of: providing, a home beverage dispensing device, wherein said device is capable of receiving a volume of liquid, optionally carbonating said liquid, and said device is equipped with at least one sensor, a nozzle, and a controller for connecting to the internet; placing, a receptacle under the nozzle attached to a dispensing head; operating, the device, in a manner where the sensor is triggered to create at least one item of information, and combined with a predetermined amount of a consumable; transmitting, via the internet, information acquired by said sensor to an external server; transferring, said information acquired by said at least one sensor to a customer database.

In one embodiment, the present invention is comprised of a single serve cold beverage dispenser that utilizes a pouch or cartridge filled with concentrate/syrup to reconstitute a cold beverage of, but not limited to, soda, juice, iced coffee, iced tea, lemonade, energy drink, protein drink or vitamin water. This pouch is described in U.S. patent application Ser. No. 13/604,825, the contents of which are hereby incorporated by reference. This embodiment is able to carbonate water for the soda drinks and any other drink a user may desire. This embodiment may also be equipped with a removable water pitcher with filter that should be stored in the refrigerator until the device is to be used. It is intended for the user experience regarding this device is identical to that of using a post-mix soda machine.

In addition to the basic functions of the present invention, the above embodiment may also include a telemetry control and data retrieval system. For example, a Wi-Fi card or a similar transmitting device like Bluetooth may be implanted into the circuits of the beverage dispensing device, allowing it to communicate with the internal IC board and connect to the user's home Wi-Fi network and the Internet. The user may register his/her beverage dispensing machine via secure passcode or MAC Address through their home network with a designated website and create a user profile on the company's backend database. This connectivity will allow the beverage dispensing device to communicate with the supplier's back end servers to track the user's personal consumption and allow an automated re-order system to know when to send out the user's next order of consumables. It will also help to identify what flavors of beverage are selling best and allow the manufacturing facility to streamline what is manufactured to avoid excessive warehousing of inventory. The supplier may also be able to target users with special offerings based on this data. It is also within the realm of this disclosure to include a specific program, or application, for smart phones such as the iPhone®, and/or other hand-held computing devices such as iPad®, to allow the users to see and manage their consumptions and be notified when they are running low on consumables such as beverage pouches, filter cartridges and CO2 gas cylinders.

In another embodiment, a disposable beverage dispensing cartridge may have a body that is substantially impermeable to light and to liquids at room temperature. The impermeable, cylindrical body may have an open top end and a closed lower end. The beverage dispensing cartridge preferably also contains an upper and a lower piston, both sized and shaped to be a sliding, sealing, pressure fit to an inside of the impermeable body. The lower piston may also have a spout protruding from its lower surface. The spout may have an open lower end that is in fluid connection with an upper surface of the lower piston. The lower end of the spout may also be covered by, contained within, or attached to, a pressure rupturable diaphragm that may be shaped to have a base and a funnel like attachment. The lower end of the spout may act as a self-piecing nozzle of the pressure rupturable diaphragm, and of the base of the cartridge.

Pre-measured amount of beverage concentrate may be contained in the beverage dispensing cartridge, disposed between the upper and lower pistons in a substantially hermetically sealed environment. In such an environment, beverage concentrates may have a shelf-life of up to twelve months, even without refrigeration.

In an embodiment with the cartridge, a concentrate dispensing mechanism may operate to move the upper piston downwards towards the lower piston. In doing so the liquid outlet of the lower piston, acting as a self piercing nozzle, breaks the pressure rupturable diaphragm and the base of the impermeable, cylindrical cartridge. The concentrate contained in the impermeable, cylindrical cartridge may then be discharged through the liquid outlet into a mixing nozzle structure.

In another embodiment, a beverage dispensing pouch comprises a pouch void enclosed in an impermeable seal that is substantially impermeable to liquids at room temperature. The pouch void has an open lower end while the beverage dispensing pouch further comprises a pouch fitment sealing the open lower end of the pouch void. The pouch fitment has an interior, an interior wall, an upper opening, and a lower opening and comprises a snap-in ring attached to the upper opening, the snap-in ring having a snap-in ring opening; a first pressure rupturable diaphragm sealing the snap-in ring opening; a pouch fitment sealing the lower opening of the pouch. In addition, the pouch fitment further comprises a plunger having a top aperture, a plunger piston, and a liquid outlet; and a second pressure rupturable diaphragm sealing the top aperture of the plunger. While the plunger resides in the interior of the pouch fitment, the liquid outlet is above the pouch fitment, the top aperture of the plunger is below the upper opening of the pouch fitment, the plunger piston stays abut the interior wall of the pouch fitment, forming a slidable seal.

Similarly to the beverage dispensing cartridge, a pre-measured amount of beverage concentrate may be contained in the beverage dispensing pouch, stored in the pouch void in a substantially hermetically sealed environment. In such an environment, beverage concentrates may have a shelf-life of up to twelve months, even without refrigeration.

When pressure is applied to the pouch void, it is partially transmitted to push against the pouch fitment. When the pressure increases, the first pressure rupturable diaphragm ruptures, then the plunger is pushed downward so that the liquid outlet pierces the sanitary foil cover, and the second pressure rupturable diaphragm ruptures to allow the beverage concentrate in the pouch void to flow from the liquid outlet into a mixing nozzle structure.

A mixing nozzle structure may be fluidly connected to the liquid container so that a predetermined amount of liquid may also flow into the mixing nozzle structure as the beverage concentrate is being ejected into the mixing nozzle structure from the beverage dispensing pouch or the beverage dispensing cartridge. The mixing nozzle structure may be sized and shaped such that the concentrate being dispensed mixes with the liquid flowing into the mixing nozzle structure, but does not contact the walls of the mixing nozzle structure during the mixing process. The mixing preferably occurs outside and beneath the mixing nozzle structure, essentially in mid-air between the mixing nozzle structure and a beverage container. This type of mixing in the air is sometimes referred to as "post-mixing".

Therefore, the present invention succeeds in conferring the following, and others not mentioned, desirable and useful benefits and objectives.

It is an object of the present invention to provide an easy to use, single serve dispenser for cold beverages.

It is another object of the present invention to provide a device that provides exact, predetermined mixing ratios of water and concentrate.

It is another object of the present invention to provide a single serve, cold beverage dispenser in which the end product may, or may not, be carbonated.

Yet another object of the present invention is to provide a single serve, cold beverage dispenser that requires a minimum of maintenance.

Still another object of the present invention is to provide a single serve, cold beverage container that keeps the beverage concentrates fresh for an extended period of time.

It is another object of the present invention to provide a beverage dispensing device with a pouch fitment.

It is the yet another object of the present invention to provide a cartridge or pouch for use in containing and dispensing a measured quantity of concentrate or syrup.

It is the still another object of the present invention to provide a cartridge or pouch for metering the discharge of contents over a predetermined period of time.

Yet another object of the invention is to provide a cartridge or pouch that can withstand normal pressures occurred during shipping and handling which resists accidental rupturing.

Yet another object of the present invention is to provide a beverage dispensing container with rupturable diaphragms that control the flow of liquid.

Still another object of the present invention is to provide a beverage dispensing device that combines rupturable diaphragms and a pouch fitment to further control the flow of liquid.

It is a further object of the invention to provide an economic, easy to manufacture, easy to change, disposable pouch or cartridge for creating and dispensing cold beverages.

It is a further object of the invention to provide a reliable method of producing exact mixing ratios of soda water and concentrates as measured by Brix standards set by beverage and concentrate purveyors.

Yet another object of the invention is to provide the ability to begin brewing a beverage using an internet-enabled electronic device.

It is a further object of the invention to provide a means to track a user's beverage consumption habits and provide an ability to market to said user accordingly.

BRIEF DESCRIPTION OF THE DRAWINGS

FIG. 7A shows a front cross-section view of a preferred embodiment of a single serve disposable beverage pouch of the present invention prior to use.

FIG. 7B shows a partial side view and partial side cross section view, of a preferred embodiment of a single serve disposable beverage pouch of the present invention prior to use.

FIG. 7C shows a cross-section exploded view of a first preferred pouch fitment prior to use.

FIG. 7D shows a side cross section view of the first preferred pouch fitment both prior to and after use.

FIG. 7E shows a cross-section exploded view of a second preferred pouch fitment prior to use.

FIG. 7F shows a side cross section view of a second preferred pouch fitment both prior to and after use.

FIG. 7G shows a cross-section exploded view of a third preferred pouch fitment prior to use.

FIG. 7H shows a side cross section view of the third preferred pouch fitment both prior to and after use.

FIG. 8A shows a front cross-section view of another preferred embodiment of a single serve disposable beverage pouch using a fourth preferred pouch fitment prior to use.

FIG. 8B shows a partial side view and partial cross section view, of another preferred embodiment of a single serve disposable beverage pouch using a fourth preferred pouch fitment prior to use.

FIG. 8C shows a side exploded cross-sectional view of the fourth preferred pouch fitment prior to use.

FIG. 8D shows a top view of an outflow valve having a "+" shaped outlet.

FIGS. 8E, 8F, and 8G show a side cross section view of the fourth preferred pouch fitment prior to, during, and after use.

FIG. 12 A-C show another preferred embodiment of the beverage dispensing pouch wherein the pouch is sealed with a pressure rupturable seal and a tear-off pouch tip.

DESCRIPTION OF THE PREFERRED EMBODIMENTS

Figure 1:
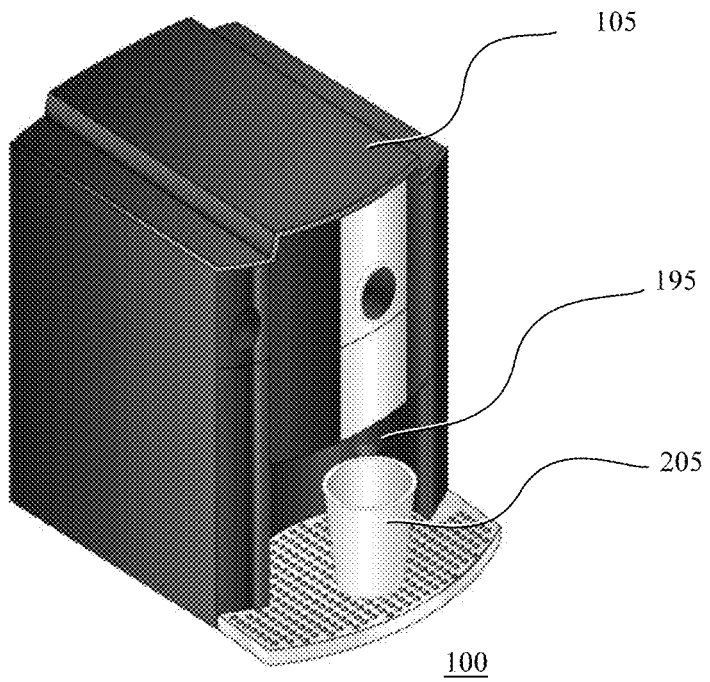
FIG. 1 shows a perspective view of a preferred embodiment of the single serve beverage dispenser of the present invention.

The preferred embodiments of the present invention will now be described with reference to the drawings. Identical elements in the various figures are identified, as far as possible, with the same reference numerals.

Reference will now be made in detail to embodiments of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto without deviating from the innovative concepts of the invention.

FIG. 1 shows a perspective view of a preferred embodiment of the single serve, chilled beverage dispensing device 100 of the present invention. In a preferred embodiment, the beverage dispensing device 100 may have a product shell 105 housing the functional components of the beverage dispensing device 100. FIG. 1 also shows a mixing nozzle structure 195 that may be used to prepare the cold beverage, typically by mixing a beverage concentrate with chilled water, on its way to it being served into a beverage container 205.

Figure 2:
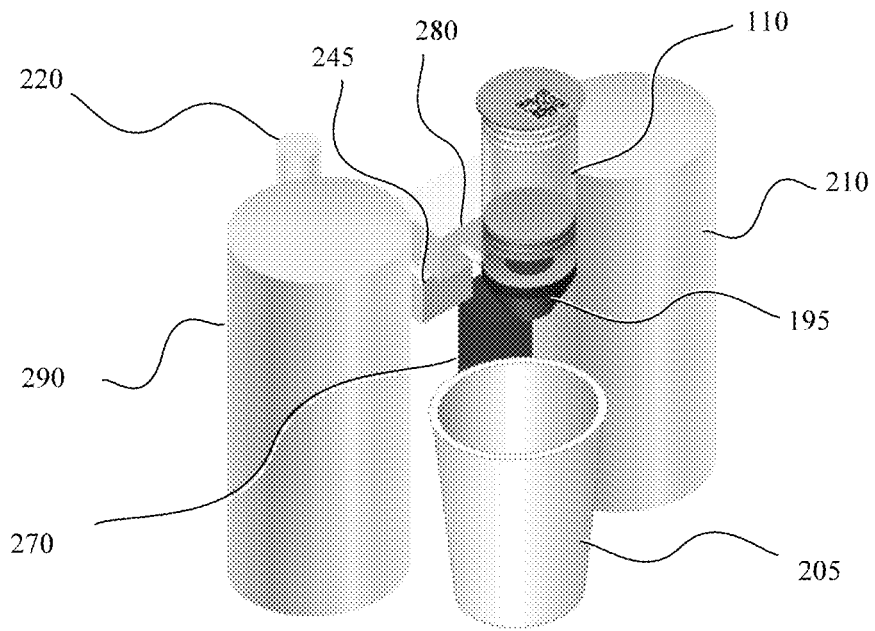
FIG. 2 shows an X-ray view of another preferred embodiment of the single serve beverage dispenser of the present invention while a beverage dispensing cartridge is used.

FIG. 2 shows an "X-ray view" of a preferred embodiment of the single serve cold beverage dispenser of the present invention, in which aspects of the invention are displayed, though not all in their entirety or with fully functional connectivity. One of ordinary skill in the art will readily appreciate that the elements of FIG. 2 show important components of the invention, but they are not intended to limit the invention to the specific elements shown, the way they are connected or the functionality they contribute to the invention.

FIG. 2 shows a liquid container 210 that is preferably filled with water, connected via a liquid pump 245 to an insulated liquid container 290. The insulated liquid container 290 may be cooled by a liquid refrigeration unit 220 such as, but not limited to, a Peltier device, a conventional compression based refrigeration device or some combination thereof. As described in more detail below, the liquid refrigeration unit 220 may also act as a recirculation device, extracting liquid from the insulated liquid container 290, cooling it, and then returning the liquid to the insulated liquid container 290.

The insulated liquid container 290 may then be connected via an optionally selectable carbonation device 280 that may, for instance, be activated by the CO2 cylinder 270. The liquid may then be transported to the mixing nozzle structure 195. In this way the user may select to have either a carbonated or an un-carbonated beverage, and may, in certain embodiments, select a degree of carbonation of the drink delivered to the beverage container 205, and a preferred temperature of the dispensed beverage. Core ingredients of the beverage delivered to the beverage container 205 may be determined by the contents of the disposable beverage dispensing cartridge 110 that would typically be selected by the user.

Figure 3:
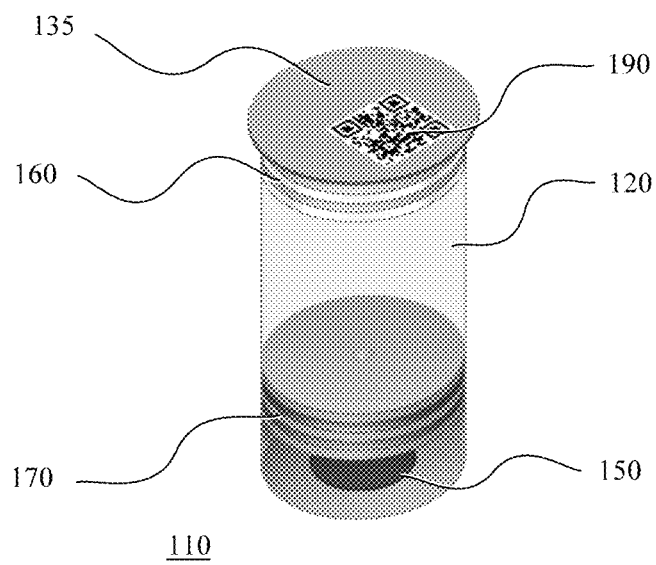
FIG. 3 shows a top perspective view of a preferred embodiment of a single serve disposable beverage cartridge of the present invention prior to use.

FIG. 3 shows a top perspective view of a preferred embodiment of a single serve disposable beverage cartridge of the present invention.

In a preferred embodiment, the disposable beverage dispensing cartridge 110 may have a substantially impermeable, cylindrical cartridge 120 with a top end that may be covered with an air tight, sealing diaphragm 135. In a preferred embodiment, the bottom of the impermeable, cylindrical cartridge 120 may be closed. In an alternate embodiment, however, the bottom of the impermeable, cylindrical cartridge 120 may be partially closed bottom that may be temporarily sealed with a ruptureable foil covering.

The top end may be sealed with a suitable metal or plastic foil that forms an air tight, sealing diaphragm 135, or, in alternate embodiment, it may be sealed by an upper piston 160. The upper piston 160 is preferably a sliding, pressure fit to the inside of the impermeable, cylindrical cartridge 120 and may also provide a hermetic or airtight seal.

The lower piston 170 may also be a sliding, pressure fit to the inside of the impermeable, cylindrical cartridge 120 and may also provide an airtight seal. The sealing of the bottom of the impermeable, cylindrical cartridge 120 may also include a pressure rupturable diaphragm 150.

In a preferred embodiment, the impermeable, cylindrical cartridge 120 may be made of a suitable material that is substantially impermeable to liquids at room temperature such as, but not limited to, a metal foil or a plastic such as, but not limited to, HDPE, TPE, polyethylene terephthalate (PET), polyethylene (PE), high-density polyethylene, polyvinyl chloride (PVC), polyvinylidene chloride (PVDC), low-density polyethylene (LDPE), polypropylene (PP), polystyrene (PS), high impact polystyrene (HIPS) and polycarbonate (PC), or paperboard coated with a suitable waterproof coating such as, but not limited to, polyethylene, or some combination thereof.

The impermeable, cylindrical cartridge 120 may also be made of a recyclable material such as, but not limited to, paperboard coated with suitable water proofing such as, but not limited to, polyethylene. Such a construction is well known in the milk carton industry.

Also shown in FIG. 3 is a machine readable identification element 190. The machine readable identification element 190 may for instance be a machine readable printed label such as, but not limited to, a bar code or a Quick Response (QR) code or it may be an electronically readable chip such as, but not limited to, an RFID tag. The machine readable identification element 190 may be read by optics and/or electronics in the beverage dispensing device 100 and used to adjust mixing of the drink by making selections such as, but not limited to, the quantity of water to be added, whether or not to provide carbonated water, the degree of carbonation and the temperature of the water being used to mix with the concentrate or some combination thereof.

Figure 4:
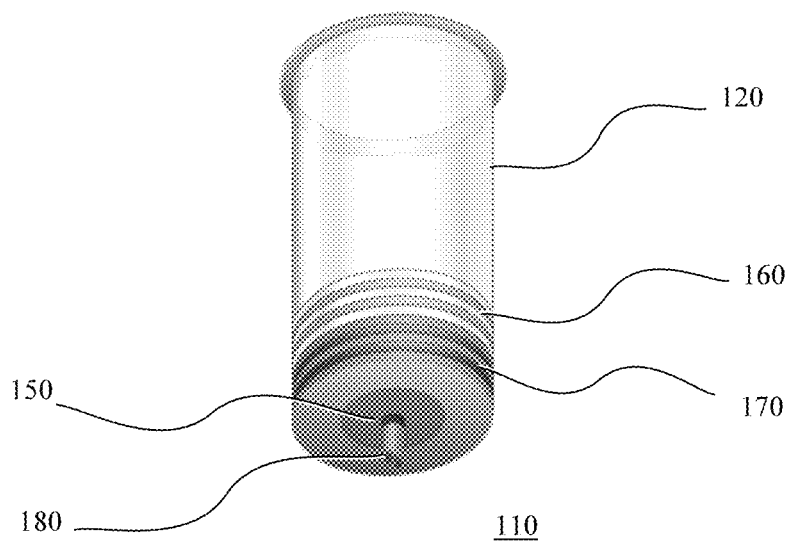
FIG. 4 shows a bottom perspective view of a preferred embodiment of a single serve disposable beverage cartridge of the present invention after use.

FIG. 4 shows a bottom perspective view of a preferred embodiment of a single serve disposable beverage cartridge of the present invention.

In FIG. 4, the beverage dispensing cartridge 110 is shown in a dispensed state, i.e., the upper piston 160 has been forced down towards the lower piston 170 by a suitable dispensing initiator such as, but not limited to, a mechanically controlled cylinder, an electrically or magnetically operated solenoid or a pneumatically operated cylinder, or some combination thereof.

In a preferred embodiment, as the upper piston 160 has been compressed downward, the liquid outlet 180 has been impressed against the pressure rupturable diaphragm 150, and, acting as a self piercing nozzle, breaking it. The liquid outlet 180 may then have encountered and, once more acting as a self piercing nozzle, ruptured the base of the impermeable, cylindrical cartridge 120. Having ruptured both the base and the diaphragm 150 the liquid outlet 180 may then dispense the beverage concentrate stored in the impermeable, cylindrical cartridge 120 via the liquid outlet 180 into the mixing nozzle structure 195 (not shown in FIG. 4).

Figure 5:
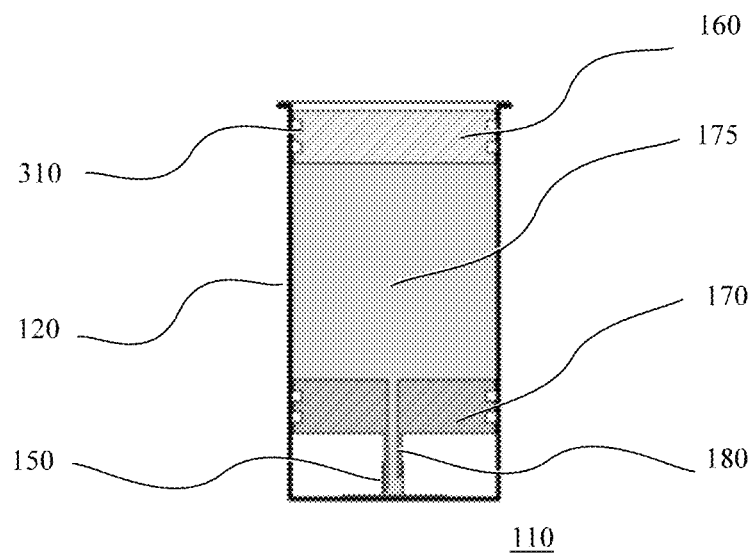
FIG. 5 shows a cross-section view of a preferred embodiment of a single serve disposable beverage cartridge of the present invention prior to use.

FIG. 5 shows a cross-section view of a preferred embodiment of a single serve disposable beverage cartridge of the present invention prior to use.

In FIG. 5, the beverage concentrate 175 is shown contained in the impermeable, cylindrical cartridge 120 between the upper piston 160 and the lower piston 170. The pistons may form air-tight, pressure seals with the impermeable, cylindrical cartridge 120, and may have groves 310 to facilitate the air-tight, sliding pressure sealing. In an alternate embodiment, the grooves 310 may incorporate O-rings that may also facilitate a sliding but air-tight seal, though this option may be more expensive to manufacture.

The lower piston 170 preferably has a liquid outlet 180 that may be used both to penetrate the pressure rupturable diaphragm 150 and the base of the impermeable, cylindrical cartridge 120 and thereby deliver the beverage concentrate 175 into the mixing nozzle structure 195 (not shown in FIG. 5).

The beverage dispensing cartridge 110, the upper piston 160, the lower piston 170 and the pressure rupturable diaphragm 150 may be made from any suitable materials such as, but not limited to a metal foil such as, but not limited to, nickel/manganese/silicone alloys, aluminum and aluminum alloys, brass, copper and copper alloys, nickel/chromium alloys, nickel/iron alloys, nickel, phosphor bronze, stainless steels, titanium, vanadium and zirconium, or some combination thereof, or a plastic such as, but not limited to, HDPE, TPE, polyethylene terephthalate (PET), polyethylene (PE), high-density polyethylene, polyvinyl chloride (PVC), polyvinyldiene chloride (PVDC), low-density polyethylene (LDPE), polypropylene (PP), polystyrene (PS), high impact polystyrene (HIPS) and polycarbonate (PC), or water-proofed paperboard, such as, but not limited to, paperboard coated with polyethylene, or some combination thereof.

Figure 6:
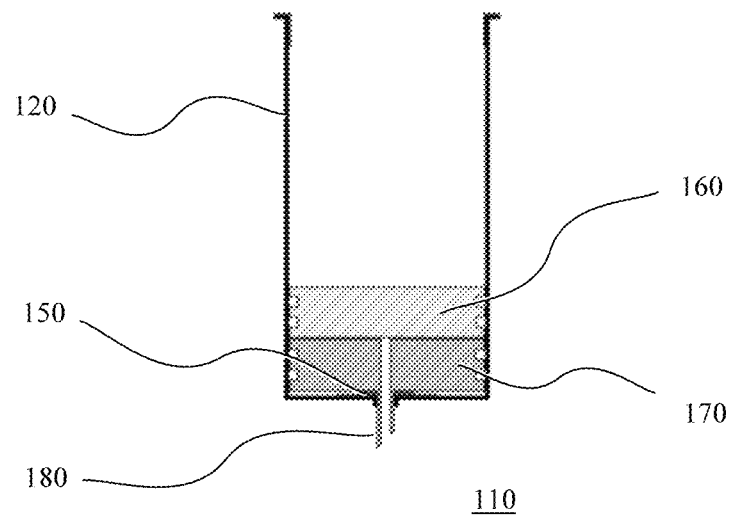
FIG. 6 shows a cross-section view of a preferred embodiment of a single serve disposable beverage cartridge of the present invention after use.

FIG. 6 shows a cross-section view of a preferred embodiment of a single serve disposable beverage cartridge of the present invention after use.

In FIG. 6, the beverage dispensing cartridge 110 is shown with the upper piston 160 moved into contact with the lower piston 170 which itself is shown at the bottom of the impermeable, cylindrical cartridge 120. The pressure rupturable diaphragm 150 and the base of the impermeable, cylindrical cartridge 120 are shown as having been ruptured by the liquid outlet 180 of the lower piston 170, so that all the beverage concentrate 175 that had been contained between the upper piston 160 and the lower piston 170 has been dispensed through the liquid outlet 180.

FIG. 7A shows a front cross-section view of a preferred embodiment of a single serve disposable beverage pouch of the present invention prior to use. The beverage dispensing pouch may replace the beverage dispensing cartridge in FIG. 2. The beverage dispensing pouch 20 serves similar roles as the cartridge in that these containers are used to dispense the "central" ingredients of the beverage. In some cases, the pouch or the cartridge may be used to dispense beverage concentrates that would typically be selected by the user.

Shown in FIG. 7A is a pouch void 22 enclosed in an impermeable seal 25 substantially impermeable to liquids at room temperature. Also shown in FIG. 7A is that the pouch void 22 has an open lower end 24 which is sealed by a pouch fitment 30. The pouch fitment 30 has positioning fins 32 that help to anchor the pouch fitment 30 to the impermeable seal 25. The detailed structures of the pouch fitment 30 are shown in FIG. 7C.

FIG. 7B shows a partial side view and partial side cross section view, of a preferred embodiment of a single serve disposable beverage pouch of the present invention prior to use. For clarity, FIG. 7B shows the pouch fitment 30 in a sectional view while demonstrating the side view of the impermeable seal 25. The impermeable seal 25 encloses the pouch void 22, as shown in FIG. 7A, and forms a wide margin around the pouch void 22, as shown in FIGS. 7A and 7B.

It should be noted that the shape of the beverage dispensing pouch 20 and its pouch void 22 shown here is only supposed to be illustrative. The beverage dispensing pouch 20 and the pouch void 22 may be any shape that is necessary and desirable. While FIGS. 7A and 7B show the beverage dispensing pouch 20 with a flat side view, it does not necessarily have to be like that. The beverage dispensing pouch 20 may also have a round shape or any other shape that allows easy manufacturing and implementation.

The pouch void 22 here refers to the space enclosed within the impermeable seal 25, which is impermeable to liquids at room temperature. The impermeable seal 25 may be formed by heating or sonic welding the proper materials so that an empty space is created. Preferably, the impermeable seal 25 is made of thin, flexible, and impermeable materials that are non-toxic to humans. The impermeable seal 25 may be made from rubber, leather, fabric with waterproof coating, metal foil or plastic such as, but not limited to, polyethylene (PE), vinyl polymer, polystyrene (PS), and polypropene, or paper coated with a suitable waterproof coating such as, but not limited to, polyethylene, or some combination thereof. The impermeable seal 25 may be one layer of material or a multi-layer structure. For a multi-layer impermeable seal 25, each layer may be made from the same or different materials indicated as above.

The pouch fitment 30 is preferably permanently attached to the impermeable seal 25 and fluidly connected to the pouch void 22. However, it may also be desirable to have a pouch fitment 30 that is removable and may be asserted to a pouch void 22 having a receiving slot. In the preferred embodiment shown in FIGS. 7A and 7B, the pouch fitment 30 has positioning fins 32 to help to anchor the pouch fitment 30 to the impermeable seal 25. The positioning fins 32 are integrally welded, glued, molded or co-molded with the impermeable seal 25. The design may be altered here as long as the pouch void 22 is hermetically sealed by the impermeable seal 25 and the pouch fitment 30.

FIG. 7C shows a cross-section exploded view of a first preferred pouch fitment 30 prior to use. The detailed structure of the pouch fitment 30 included in FIGS. 7A and 7B are illustrated here. Shown in 7C is the pouch fitment 30 having a fitment body 31 having an upper opening 36, a lower opening 37, an interior 33, and positioning fins 32, a pressure rupturable diaphragm 45, and a sealing member 35. The upper opening 36 of the fitment body 31 is sealed by the first pressure rupturable diaphragm 45 and the lower opening 37 of the fitment body 31 is sealed by the sealing member 35.

FIG. 7D shows a side cross section view of the first preferred pouch fitment both prior to and after use. All the structures shown in FIG. 7C are included in FIG. 7D. The arrow in FIG. 7D indicates the transition from a sealed unused pouch fitment 30 to an open used pouch fitment 30. While in the left panel of FIG. 7D the sealing member 35 is securely lodged on the lower opening 37 and the pressure rupturable diaphragm 45 is intact, in the right panel of FIG. 7D the sealing member 35 is removed and the pressure rupturable diaphragm 45 is ruptured. The sealing member 35 may be made from all kinds of materials, including but not limited to plastic, foil, and metals.

In the process of making a beverage, a user may remove the sealing member 35 prior to use. Then pressure is applied to the pouch void 22 and the pressure is partially transmitted to the pouch fitment 30, with the pressure rupturable diaphragm 45 being the focus. When the pressure increases, the pressure rupturable diaphragm 45 ruptures and liquid may flow through the upper opening 36, the interior 33, and the lower opening 37 of the pouch fitment 30 to be dispensed. Alternatively, a user may apply pressure to rupture the pressure rupturable diaphragm 45 and then remove the sealing member 35 to allow liquid to flow out of the pouch void 22.

In FIGS. 7C and 7D, the sealing member 35 is a screw cap. There are screw threads 38 on the exterior of the fitment body 31, allowing the sealing member 35 to be screw on the fitment body 31 to the seal the lower opening 37. Alternatively, the screw threads 38 may be on the interior wall 34 and the sealing member 35 may have a protruding part that having corresponding screw threads. Then the sealing member 35 may be screwed not to "cover," but to "plug" the fitment body 31. As clearly demonstrated by FIGS. 7E-7H, the sealing member 35 may take different formats, while goals to have an easy-to-seal and easy-to-remove sealing member 35 and to form a hermetic seal remain consistent.

The fitment body 31 of the pouch fitment 30 is preferably a single-molded plastic piece. It may be made from plastic such as but not limited to HDPE, TPE, polyethylene terephthalate (PET), polyethylene (PE), high-density polyethylene, polyvinyl chloride (PVC), polyvinylidene chloride (PVDC), low-density polyethylene (LDPE), polypropylene (PP), polystyrene (PS), high impact polystyrene (HIPS) and polycarbonate (PC). It may also be made from other materials such as a metal, wood, rigid plastic or rubber or some combination thereof.

The fitment body 31 of the pouch fitment 30 is preferably a cylindrical shape in general, with the horizontal cross-section being a circle of an oval. However, it should be noted that the fitment body 31 may take any shape and the horizontal cross-section may be a square, a rectangle, a triangle, or any other shape that allows easy manufacturing and handling.

The pressure rupturable diaphragm 45 may be made from many kinds of materials, such as but not limited to: foil, paper or fabric with waterproof coatings, thin layers of plastic, and synthetic or natural membranes, or any combination thereof. The key is that the pressure rupturable diaphragm 45 should have a consistent and measurable resistance to fluid pressure. When a certain threshold is passed, the pressure rupturable diaphragm 45 should be ruptured to allow the through flow of fluids.

The pressure rupturable diaphragm 45 may be welded, glued, molded, or co-molded with the fitment body 31. Preferably, the pressure rupturable diaphragm 45 is sonic-welded with the fitment body 31. The key is to have the pressure rupturable diaphragm 45 securely attached to the fitment body 31 and hermetically sealing the upper opening 36. As long as this goal may be attained, the specific method to attach the pressure rupturable diaphragm 45 to the fitment body 31 may vary.

The sealing member 35 may be made of the same or different material as the fitment body 31. In general, the sealing member 35 may be made from foil, metal, paper and fabric with waterproof coatings, wood, rubber, plastic such as but not limited to polyethylene terephthalate (PET), HDPE, TPE, polyethylene (PE), high-density polyethylene, polyvinyl chloride (PVC), polyvinylidene chloride (PVDC), low-density polyethylene (LDPE), polypropylene (PP), polystyrene (PS), high impact polystyrene (HIPS) and polycarbonate (PC), or some combination thereof. The choice of material of the sealing member 35 will depend on the ease of manufacturing and the specific design of the sealing member 35.

FIG. 7E shows a cross-section exploded view of a second preferred pouch fitment prior to use. FIG. 7F shows a side cross section view of a second preferred pouch fitment both prior to and after use. The components shown FIGS. 7E and 7F are the same as FIGS. 7C and 7D, except that the sealing member 35 takes a different form and there are no screw threads 38 on the fitment body 31.

In FIGS. 7E and 7F, the sealing member 35 is a detachable cap that may be used to seal the lower opening 37 of the fitment body 31. The sealing member 35 is attached to the fitment body 31 by a circle of weakened connections 41. The weakened connections 41 may be produced by making the connecting layer of plastic between the cap sealing member 35 and the fitment body 31 particularly thin. Prior to use, a user may break the cap from the fitment body 31 and apply pressure to the pouch void 22 to cause the first pressure rupturable diaphragm 45 to rupture, thus allowing liquid in the pouch void 22 to flow from the pouch fitment 30.

FIG. 7G shows a cross-section exploded view of a third preferred pouch fitment prior to use. FIG. 7H shows a side cross section view of the third preferred pouch fitment both prior to and after use. The components shown FIGS. 7G and 7H are the same as FIGS. 7C and 7D, except that the sealing member 35 takes a different form and there are no screw threads 38 on the fitment body 31.

In FIGS. 7G and 7H, the sealing member 35 is a cover that has a peel-away tab 39. Preferably the sealing member 35 is a foil cover. The sealing member 35 may be glued or welded to the fitment body 31. The key here is to allow the sealing member 35 to be removed peeling the peel-away tab 39. Therefore, as long as this goal can be achieved, the sealing member 35 may be attached to the fitment body 31 with any suitable method. Prior to use, a user may peel away the sealing member 35 from the fitment body 31 and apply pressure to the pouch void 22 to cause the pressure rupturable diaphragm 45 to rupture, thus allowing liquid in the pouch void 22 to flow from the pouch fitment 30.

FIG. 8A shows a front cross-section view of another preferred embodiment of a single serve disposable beverage pouch using a fourth preferred pouch fitment prior to use. Shown in FIG. 8A is a pouch void 22 enclosed in an impermeable seal 25 substantially impermeable to liquids at room temperature. Also shown in FIG. 8A is that the pouch void 22 has a lower end 24 which is sealed by a pouch fitment 30. The pouch fitment 30 has positioning fins 32 that may be used to anchor the pouch fitment 30 to the pouch void 22. The detailed structures of the pouch fitment 30 are shown in FIG. 8C.

FIG. 8B shows a partial side view and partial cross section view, of another preferred embodiment of a single serve disposable beverage pouch using a fourth preferred pouch fitment prior to use. For clarity, FIG. 8B shows the pouch fitment 30 in a side sectional view while it demonstrates the side view of the impermeable seal 25. The impermeable seal 25 encloses the pouch void 22, as shown in FIG. 8A, and forms a wide margin around the pouch void 22, as shown in FIGS. 8A and 8B.

FIG. 8C shows a side exploded cross-sectional view of the fourth preferred pouch fitment prior to use. Shown in 8C is the pouch fitment 30 having a fitment body 31 having an upper opening 36, a lower opening 37, an interior 33, and positioning fins 32, a pressure rupturable diaphragm 45, and a sealing member 35. The upper opening 36 of the fitment body 31 is sealed by the pressure rupturable diaphragm 45 and the lower opening 37 of the fitment body 31 is sealed by the sealing member 35. Here the sealing member 35 takes the form of a cover having a peel-away tab 39, as shown in FIGS. 7G and 7H. The difference of FIG. 8 is that the pouch fitment 30 further comprises a outflow valve 50, which also covers the lower opening 37 and stays above the sealing member 35. From this side view, the outflow valve 50 is shown to flex upward with its center portion protruding closer to the interior 33 of the pouch fitment 30.

FIG. 8D shows a top view of the outflow valve 50. Here the outflow valve 50 is shown as round and this is a preferred shape. However, it should be noted that the outflow valve 50 must fit the horizontal-sectional shape of the pouch fitment 30, especially at the lower opening 37. Therefore, from a top view, the outflow valve 50 may be round or square, or any other shape that fits the pouch fitment 30. Also shown FIG. 8D is a "+" shaped outlet 49 at the center of the outflow valve 50. The "+" shaped outlet 49 allows liquid in the pouch void 22 to flow through. The "+" shape is preferred here. However, it is still possible to make the outlet other shapes such as a "T" shape, a "✳" shape, or any other shape that may be used to control liquid flow.

The outflow valve 50 is preferably made of silicon-based polymeric materials known as silicones. The key features of the outflow valve are impermeability to water, low friction, and flexibility. Therefore, when other materials, such as carbon-based plastics, meet the requirements, they may also be used to make the valve 50.

FIG. 8E shows the pouch fitment 30 prior to use; FIG. 8F shows the pouch fitment 30 during use; and FIG. 8G shows the pouch fitment 30 after use. The arrows between FIGS. 8E, 8F, and 8G indicate the transitions from a sealed pouch fitment 30, to a pouch fitment 30 allowing flow through, and finally to a pouch fitment 30 having an outflow valve 50 that prevents dripping.

Prior to use, a user may peel away the sealing member 35 from the fitment body 31 by pulling the peel-away tab 39 and apply pressure to the pouch void 22 to cause the pressure rupturable diaphragm 45 to rupture, thus allowing liquid in the pouch void 22 to flow from the pouch fitment 30 to reach the outflow valve 50. When pressure from the liquid is applied to the outflow valve 50 from the top, it flexes downward with the center portion of the outflow valve 50 protruding to a direction away from the interior 33 of the pouch fitment 30, as shown in FIG. 8F. The continued pressure from the liquid further opens the "+" shaped outlet 49, allowing the liquid to flow through the outlet.

As shown in FIG. 8G, when the pressure is removed or significantly reduced, the outflow valve 50 flexes back to its original position, with the center portion of the outflow valve 50 protruding to the interior 33 of the pouch fitment 30. The "+" shaped outlet 49 is closed, preventing the remaining liquid in the pouch void 22 from dripping out.

Figures 9A, 9B:
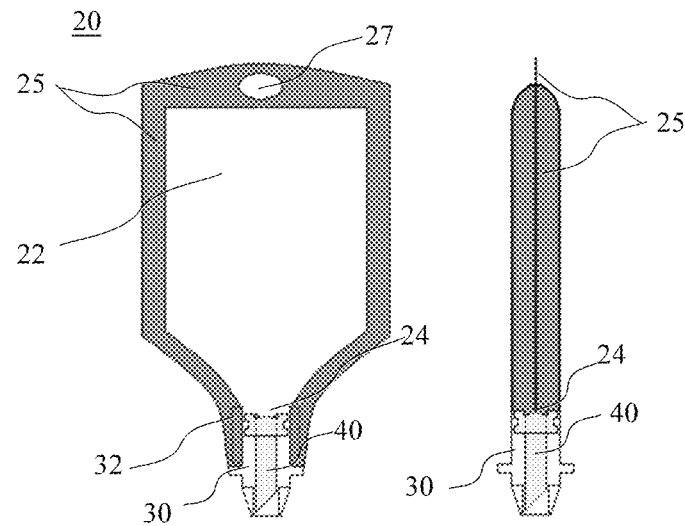
FIG. 9A shows a front cross-section view of another preferred embodiment of a single serve disposable beverage pouch using a fifth preferred pouch fitment prior to use.
FIG. 9B shows a partial side view and partial cross section view, of another preferred embodiment of a single serve disposable beverage pouch using a fifth preferred pouch fitment prior to use.

FIG. 9A shows a front cross-section view of another preferred embodiment of a single serve disposable beverage pouch using a fifth preferred pouch fitment prior to use. This pouch fitment 30 is fundamentally different from what is shown in FIG. 7 and FIG. 8 since the pouch fitment 30 further comprises a plunger 40. Shown in FIG. 9A is a pouch void 22 enclosed in an impermeable seal 25 substantially impermeable to liquids at room temperature. Also shown in FIG. 9A is that the pouch void 22 has a lower end 24 which is sealed by a pouch fitment 30. The pouch fitment 30 has positioning fins 32 that may be used to anchor the pouch fitment 30 to the pouch void 22. Shown also in FIG. 9A is a plunger 40, which is considered part of the pouch fitment 30. The detailed structures of the pouch fitment 30 and the plunger 40 are shown in FIG. 9C.

FIG. 9B shows a partial side view and partial cross section view, of another preferred embodiment of a single serve disposable beverage pouch using a fifth preferred pouch fitment prior to use. For clarity, FIG. 9B shows the pouch fitment 30 comprising a plunger 40 in a sectional view while it demonstrates the side view of the impermeable seal 25. The impermeable seal 25 encloses the pouch void 22, as shown in FIG. 9A, and forms a wide margin around the pouch void 22, as shown in FIGS. 9A and 9B.

Figures 9C, 9D:
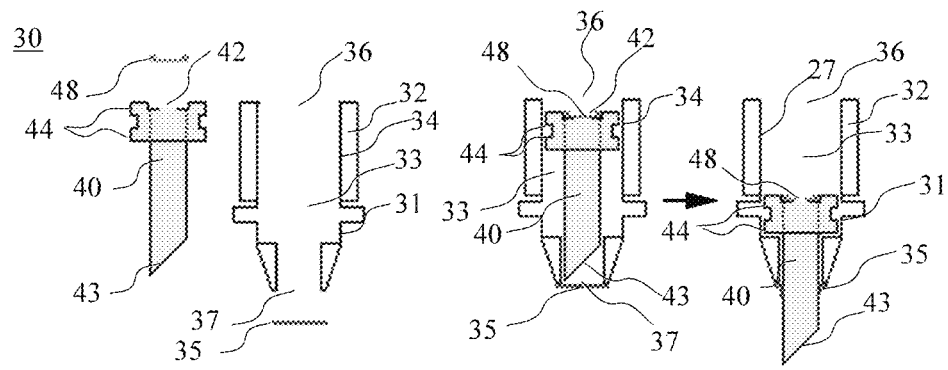
FIG. 9C shows a side exploded cross-section view of the fifth preferred pouch fitment prior to use.
FIG. 9D shows a side cross section view of the fifth preferred pouch fitment both prior to and after use.

FIG. 9C shows a side cross-sectional exploded view of the fifth preferred pouch fitment prior to use, demonstrating the individual components. Shown in FIG. 9C is a the pouch fitment 30 having a pouch void 22 having a upper opening 36, an interior 33, an interior wall 34, positioning fins 32, and a lower opening 37. Also shown in FIG. 9C is that the pouch fitment 30 further comprises a plunger 40 having a top aperture 42, a liquid outlet 43, and plunger pistons 43. The pouch fitment 30 further comprises a second pressure rupturable diaphragm 48 that seals the top aperture 42 of the plunger 40. The plunger 40 resides in the interior of the pouch fitment 30 and the plunger pistons 43 form slidable seal with the interior wall 34 of the pouch fitment 30. Here, for clarity purposes, the interior wall 34 of the pouch fitment 30 and the plunger pistons 43 are not completely in contact. However, it should be noted that the interior wall 34 and the plunger pistons 43 abut each other and form a slidable but fluid-tight seal. Moreover, the pouch fitment 30 further comprises a sealing member 35 that seals the lower opening 37 of the fitment body 31.

FIG. 9D shows a side cross section view of the fifth preferred pouch fitment both prior to and after use. The arrow in FIG. 9D indicates the transition from an unused sealed pouch fitment 30 to an open used pouch fitment 30. While in the left panel of FIG. 9D the sealing member 35 securely seals the lower opening 37, and the plunger 40 completely resides in the interior 33 of the fitment body 31, in the right panel of FIG. 9D the sealing member 35 is pierced by the liquid outlet 43 of the plunger 40, the liquid outlet 43 protrudes of the interior 33 of the fitment body 31, and the second pressure rupturable diaphragm 48 is ruptured.

Here the sealing member 35 is preferably a foil or paper that may be pierced. However, the sealing member 35 may also be any material that was referred to during the discussion of FIG. 7. The addition of the plunger 40 removes the necessity for a use to remove the sealing member 35. With the plunger 40, the sealing member 35 may simply be compromised by the penetration of the liquid outlet 43 of the plunger 40. Such a design reduces the chance that the liquid exit portion of the device may be touched by human hand or otherwise contaminated, thus raising the hygienic standard of the beverage dispensing device.

To use the beverage dispensing pouch 20, a user may apply pressure to the pouch void 22 and the pressure will be partially transmitted to the pouch fitment 30. Since the plunger pistons 43 of the plunger 40 form a slidable but fluid-tight seal with the interior wall 34 of the fitment body 31, the pressure pushes the plunger 40 to move downward so that the liquid outlet 43 of the plunger 40 may pierce the sealing member 35 and the liquid outlet 43 is exposed. When the plunger 40 reaches its lower-most position, the increase of pressure may rupture the second pressure rupturable diaphragm 48, allowing the liquid in the pouch void 22 to flow through the interior 33 of the fitment body 31 and out of the liquid outlet 43 of the plunger 40. The "prior" and "after" states of the pouch fitment 30 are illustrated in FIG. 9D It is preferred that the threshold pressure for making the plunger 40 slide downward should be lower than the threshold pressure to rupture the second pressure rupturable diaphragm 48. The design allows the plunger 40 to pierce the sealing member 35 before the second pressure rupturable diaphragm 48 is ruptured and the fluid in the pouch void 22 flows out of the liquid outlet 43. If the sequence is reversed and second pressure rupturable diaphragm 48 ruptures first, then the fluid from the pouch void 22 will be pushed through the plunger before the plunger pierces the sealing member 35. The likely outcome is that the sealing member 35 will be ruptured and the fluid flows through the plunger 40 while the liquid outlet 43 does not protrude out of the fitment body 31. Although this scenario is not preferred, it does not fundamentally affect the ability of the beverage dispensing pouch 20 to dispense the liquid in the pouch void 22.

Figures 10A, 10B:
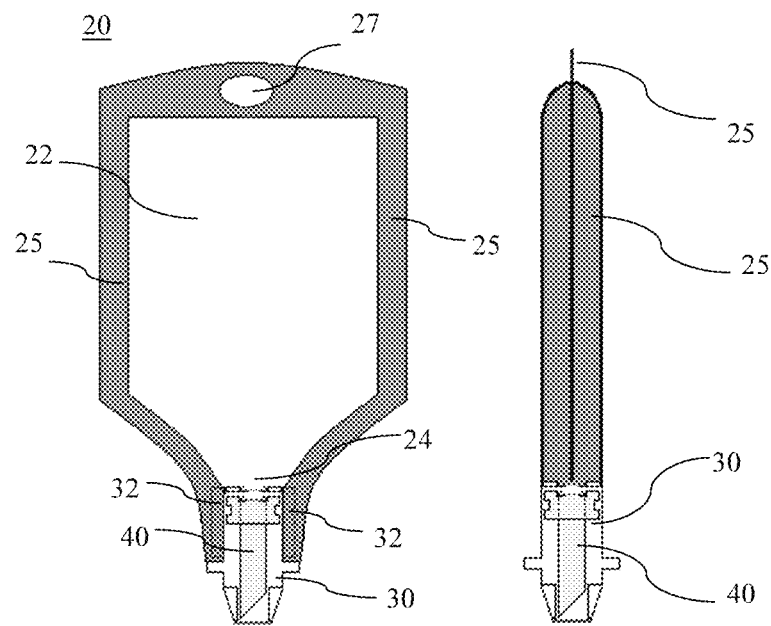
FIG. 10A shows a front cross-section view of yet another preferred embodiment of a single serve disposable beverage pouch using a sixth preferred pouch fitment prior to use.
FIG. 10B shows a partial side view and partial cross section view, of another preferred embodiment of a single serve disposable beverage pouch using a sixth preferred pouch fitment prior to use.

FIG. 10A shows a front cross-section view of yet another preferred embodiment of a single serve disposable beverage pouch using a sixth preferred pouch fitment prior to use. Shown in FIG. 10A is a pouch void 22 enclosed in an impermeable seal 25 substantially impermeable to liquids at room temperature. Also shown in FIG. 10A is that the pouch void 22 has an open lower end 24 which is sealed by a pouch fitment 30. The pouch fitment 30 has positioning fins 32 that may be used to anchor the pouch fitment 30 to the pouch void 22. Shown also in FIG. 10A is a plunger 40, which is considered part of the pouch fitment 30. The detailed structures of the pouch fitment 30 and the plunger 40 are shown in FIG. 10C.

FIG. 10B shows a partial side view and partial cross section view, of another preferred embodiment of a single serve disposable beverage pouch using a sixth preferred pouch fitment prior to use. For clarity, FIG. 10B shows the pouch fitment 30 comprising a plunger 40 in a sectional view while it demonstrates the side view of the impermeable seal 25. The impermeable seal 25 encloses the pouch void 22, as shown in FIG. 10A, and forms a wide margin around the pouch void 22, as shown in FIGS. 10A and 10B.

Figures 10C, 10D:
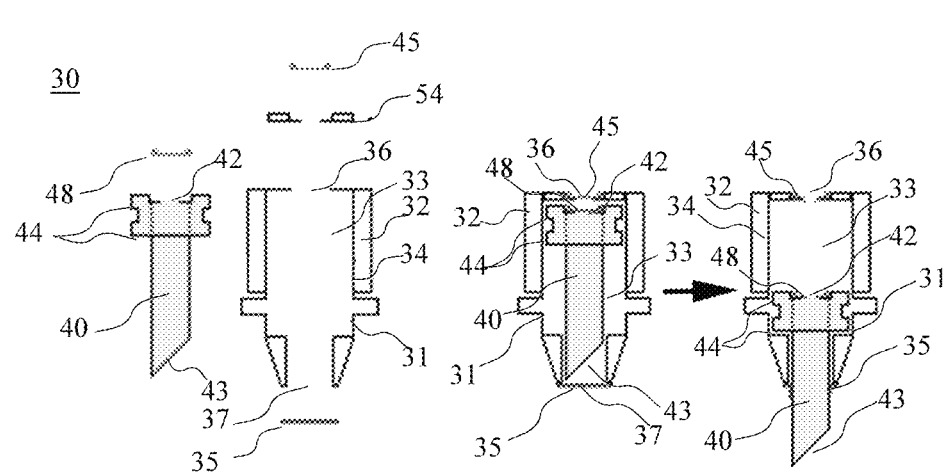
FIG. 10C shows a side exploded cross-section view of the sixth preferred pouch fitment prior to use.
FIG. 10D shows a side cross section view of the sixth preferred pouch fitment both prior to and after use.

FIG. 10C shows a side exploded cross-section view of the sixth preferred pouch fitment prior to use, demonstrating the individual components of the pouch fitment 30. FIG. 10D shows a side cross section view of the sixth preferred pouch fitment both prior to and after use.

As shown in FIGS. 10C and 10D, the pouch fitment 30 has an interior 33, interior wall 34, upper opening 36, and lower opening 37. The lower opening 37 is sealed by a sealing member 35. The upper opening 36 encircles a snap-in ring 54, which is sealed by the first pressure rupturable diaphragm 45. Positioned in the interior 33 of the pouch fitment 30 is a plunger 40, which has a top aperture 42, a plunger piston 44, and a liquid outlet 43. The plunger piston 44 forms a slidable but fluid-tight seal with the interior wall 34 of the pouch fitment 30. The top aperture 42 of the plunger 40 is positioned below the snap-in ring 54 and the second pressure rupturable diaphragm 48 and is sealed by a first pressure rupturable diaphragm 45. Here, for clarity purposes, the interior wall 34 of the pouch fitment 30 and the plunger pistons 43 are not completely in contact. However, it should be noted that the interior wall 34 and the plunger pistons 43 abut each other and form a slidable but fluid-tight seal.

The key difference between the sixth preferred embodiment of the pouch fitment 30, which is shown in FIG. 10, and the further preferred embodiment, which is shown in FIG. 9, is the addition structure of snap-in ring 54 and the first pressure rupturable diaphragm 45. The snap-in ring 54 and first pressure rupturable diaphragm 45, in combination, seal the upper opening 36 of the fitment body 31. This design separates the plunger 40 from the liquid kept in the pouch void 22, thus decreasing the chances of contamination even further.

Similar to the discussion for FIG. 9, it is preferred that the plunger 40 is pushed to pierce the sealing member 35 before the second pressure rupturable diaphragm 48 ruptures. Such a design ensures that the liquid outlet 43 of the plunger 40 protrudes out of the interior 33 of the fitment body 31 before liquid is dispensed. However, this feature is not indispensible.

The snap-in ring 54 may be made of the same of different materials as the fitment body 31. In general, it may be made from foil, metal, paper and fabric with waterproof coatings, wood, rubber, plastic such as but not limited to HDPE, TPE, polyethylene terephthalate (PET), polyethylene (PE), high-density polyethylene, polyvinyl chloride (PVC), polyvinylidene chloride (PVDC), low-density polyethylene (LDPE), polypropylene (PP), polystyrene (PS), high impact polystyrene (HIPS) and polycarbonate (PC), or some combination thereof. The snap-in ring 54 may be welded, glued, molded, or co-molded to the fitment body 31. Preferably, the snap-in ring 54 is sonic welded to the fitment body 31.

The first pressure rupturable diaphragm 45 may be attached to the snap-in ring 54 in similar ways that the second pressure rupturable diaphragm 48 is attached to the plunger.

FIGS. 11 A-C show, in a side view, the process of how the beverage dispensing pouch 20 is pressed by rollers and the liquid is released from the beverage dispensing pouch. Here, the sixth preferred embodiment of the pouch fitment 30 shown in FIG. 10 is used as an example to demonstrate how pressure may be applied to the pouch void 22 and how liquid may be dispensed. However, it should be noted that any of the pouch fitment 30 may be used.

Figure 11A:
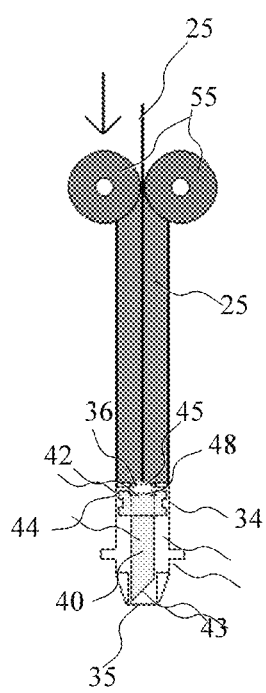
FIG. 11 A-C show, in a side view, the pouch being pressed by rollers and the liquid being released from the beverage dispensing pouch.
Figure 11B:
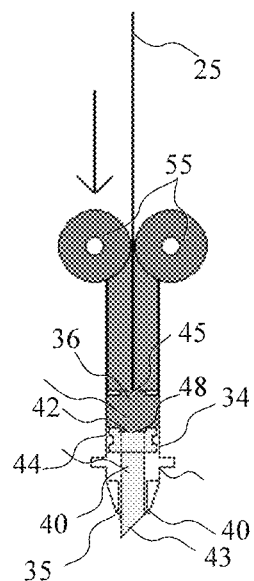
Figure 11C:
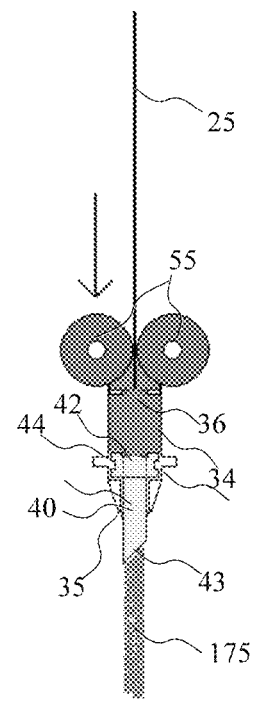

As shown in FIGS. 11A, 11B, and 11C, when pressure is applied to the pouch void 22, since the pouch fitment 30 is fluidly connected to the pouch void 22, pressure is also applied to the pouch fitment 30, and specifically, to the top of the pouch fitment 30 where there is a upper opening 36 that encircles a snap-in ring 54, which is sealed by the first pressure rupturable diaphragm 45. When the pressure increases, the first pressure rupturable diaphragm 45 ruptures and the plunger 40 becomes fluidly connected to the pouch void 22. The pressure is then directly applied to the top of the plunger 40, which is sealed by the second pressure rupturable diaphragm 48. Since the plunger has plunger pistons 43, as shown in FIG. 10, that slidably abut the interior wall 34 of the pouch fitment 30 and form a fluid-tight seal, the entire plunger is driven away from the pouch void 22. The liquid outlet 43 of the plunger 40 then pierces the sealing member 35, which is sealing the lower opening 37 of the pouch fitment 30. When the plunger 40 moves to the lowest possible position, the pressure builds up on the second pressure rupturable diaphragm 48, eventually rupturing it, allowing the beverage concentrate 175 that was kept in the pouch void 22 to flow out from the liquid outlet 43.

FIGS. 11A, 11B, and 11C show that rollers 55 are pressed against the impermeable seal 25 and the two rollers stay very close to each other. When the rollers 55 roll downward, they apply pressure on the pouch void 22 and that pressure is at least partially transmitted to all the parts that are fluidly connected to the pouch void 22.

It should be noted that the mechanism to apply pressure shown in FIG. 11 is not the only way to achieve the goal. As long as a continuous pressure may be applied to the pouch void 22, any mechanism may be employed. For example, an alternative design puts two inflatable bags on the front and back of the pouch void 22. With the inflation of the bags, pressure is applied to the pouch void 22 and the sequence of events leading to the outflow of liquid may be triggers by continuous inflation of the bags.

Figure 12A:
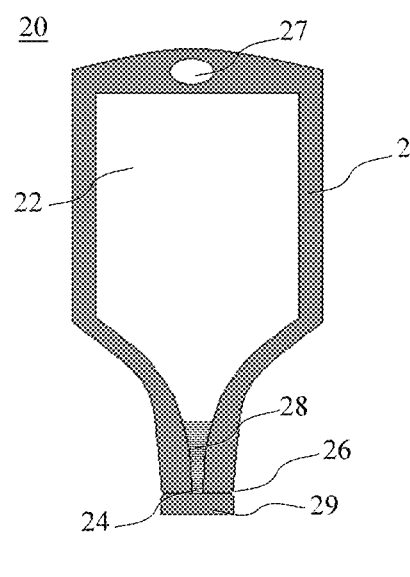
FIGS. 12A and 12B are front sectional views.
Figure 12B:
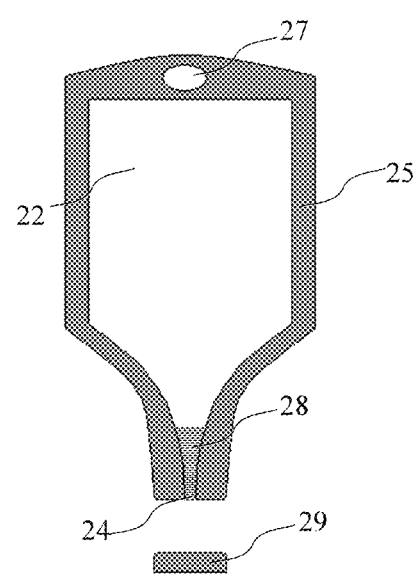
Figure 12C:
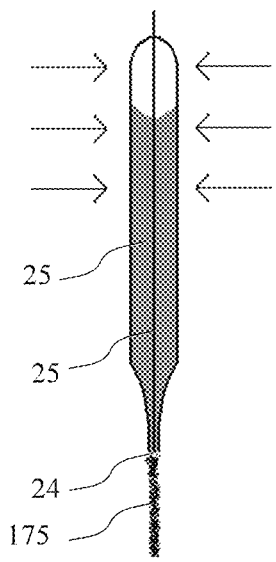
FIG. 12C is a side view.

FIG. 12 A-C show another preferred embodiment of the beverage dispensing pouch 20 wherein the pouch is sealed with a pressure rupturable seal and a tear-off pouch tip. While FIGS. 12A and 12B are front sectional views, FIG. 12C is a side view.

Shown in FIGS. 12A and 12B, the pouch void 22 is sealed with an impermeable seal 25 having a hanger hole 27. Instead of a pouch fitment 30, here the lower end 24 of the pouch void 22 is sealed with a pressure rupturable seal 28 and a pouch tip 29.

The pressure rupturable seal 28, as shown in FIGS. 12A and 12B, is preferably asserted into the lower end 24 and partly into the pouch void to ensure effective seal. However, the pressure rupturable seal 28 may stay completely outside the pouch void 22 and still prevent the liquid from flowing out of the pouch void 22.

The pressure rupturable seal 28 may be made of any material that is non-toxic to human. It may comprise a strip made of plastic or other materials and be glued or heat-bonded to the impermeable seal 25 with a pressure-sensitive adhesive. Or, the pressure rupturable seal 28 may just be made of pressure-sensitive material as a whole. The key feature here is that the pressure rupturable seal 28 may be ruptured and removed with the increase of pressure applied from the inside of the pouch.

The pouch tip 29 is an optional structure. While it is preferable to have the pouch tip 29, which further seals the lower end 24 of the pouch void 22 and present the lower end 24 to be contaminated, it is possible to only use the pressure rupturable seal 28 to seal the lower end 24. The pouch tip 29 may be made of any material that can be used to make the impermeable seal 25 or the pouch fitment 30. The pouch tip 29 may be glued, riveted, welded, heat-bonded to the impermeable seal 25 or fastened to the impermeable seal 25 using any means that allow a forceful removal. Shown here in FIG. 12A, between the pouch tip 29 and the impermeable seal 25 is a tear notch 26 that facilitates the removal of the pouch tip 29.

In actual use, as shown in FIGS. 12B and 12C, the pouch tip 29 is removed by tearing it away at the tear notch 26. Then pressure is applied to the pouch void 22. Here pressure is indicated by the arrows in FIG. 12C. The pressure may be applied using the methods discussed in the description for FIG. 11, or any methods that achieve the same result. The pressure rupturable seal 28 is then ruptured under the pressure and the beverage concentrate 175 in the pouch void 22 is released into the mixing nozzle 195 as shown in FIG. 1.

Figure 13:
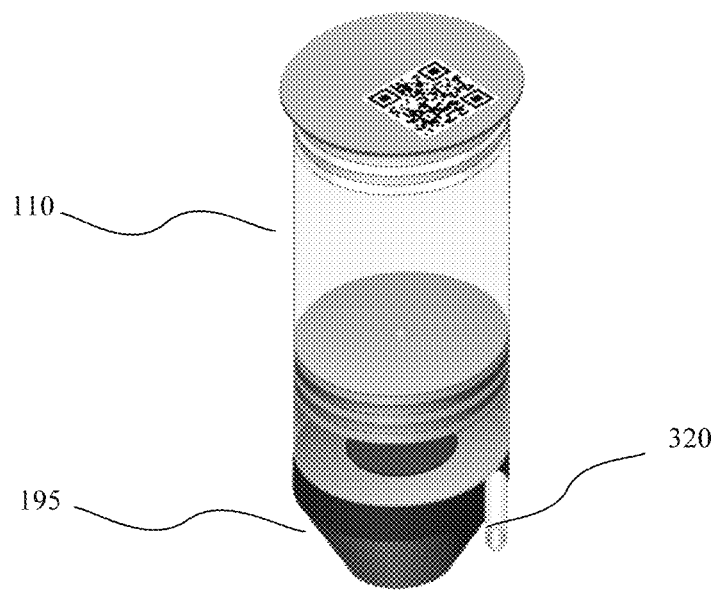
FIG. 13 shows a perspective view of a preferred embodiment of a mixing nozzle structure and a single serve disposable beverage cartridge of the present invention.

FIG. 13 shows a perspective view of a preferred embodiment of a mixing nozzle structure and a single serve disposable beverage cartridge of the present invention. Here a beverage dispensing cartridge is shown as an example. However, it should be clear that a beverage dispensing pouch 20 as shown in FIGS. 7-11 may also be used for dispensing beverage concentrates.

The beverage dispensing cartridge 110 or the beverage dispensing pouch 20 may be located above the mixing nozzle structure 195 so that beverage concentrate 175 dispensed from the beverage dispensing cartridge 110 or the beverage dispensing pouch 20 may enter the mixing chamber along with a suitable mixing fluid that may be supplied via the mixing liquid inlet 320.

Figure 14:
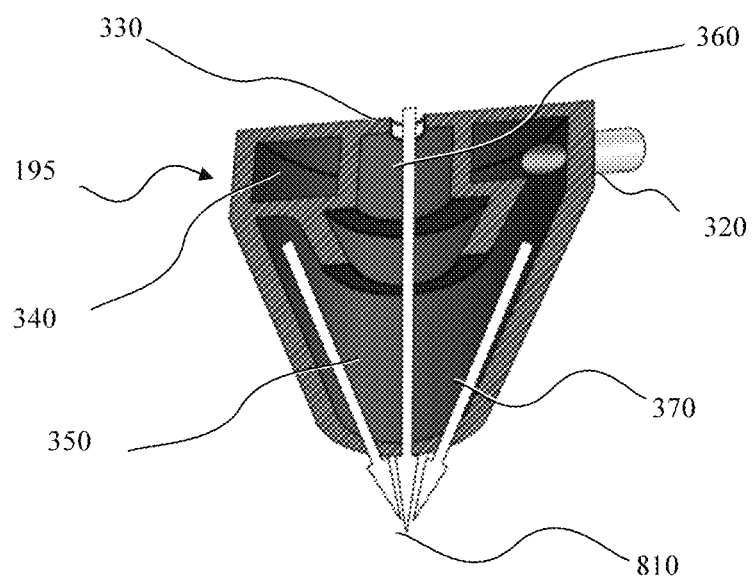
FIG. 14 shows a cross-sectional view of a preferred embodiment of a mixing nozzle structure of the present invention during use.

FIG. 14 shows a cross-sectional view of a preferred embodiment of a mixing nozzle structure of the present invention during use.

The cross-sectional view of FIG. 14 shows how the beverage concentrate 175 may be dispensed through the beverage concentrate inlet 330 of the mixing nozzle structure 195, resulting in a flow that may be a substantially vertically downward jet of dispensed concentrate 360.

The view of FIG. 14 also shows how a mixing fluid may be introduced to the mixing nozzle structure 195 via the mixing liquid inlet 320. This mixing fluid may enter the upper vortex chamber 340 where it may be constrained into a cylindrical vortex before exiting into the lower mixing chamber 350. As it exits the lower mixing chamber 350, the downward jet of dispensed concentrate 360 may combine with the downward spiraling vortex of mixing liquid 370 in such a way the two combine at a mixing zone 810 that may be external to the mixing nozzle structure 195. In this way the mixing of the diluting liquid with the beverage concentrate may occur without the concentrate contacting the walls of the lower mixing chamber 350 of the mixing nozzle structure 195. This type of mixing in the air is sometimes referred to as "post-mixing".

The mixing nozzle structure 195 may, for instance, be designed in accordance with the inventive principals detailed in U.S. Pat. No. 4,708,266, issued on Nov. 24, 1987 to Ruddick, the contents of which are hereby incorporated by reference.

Figure 15:
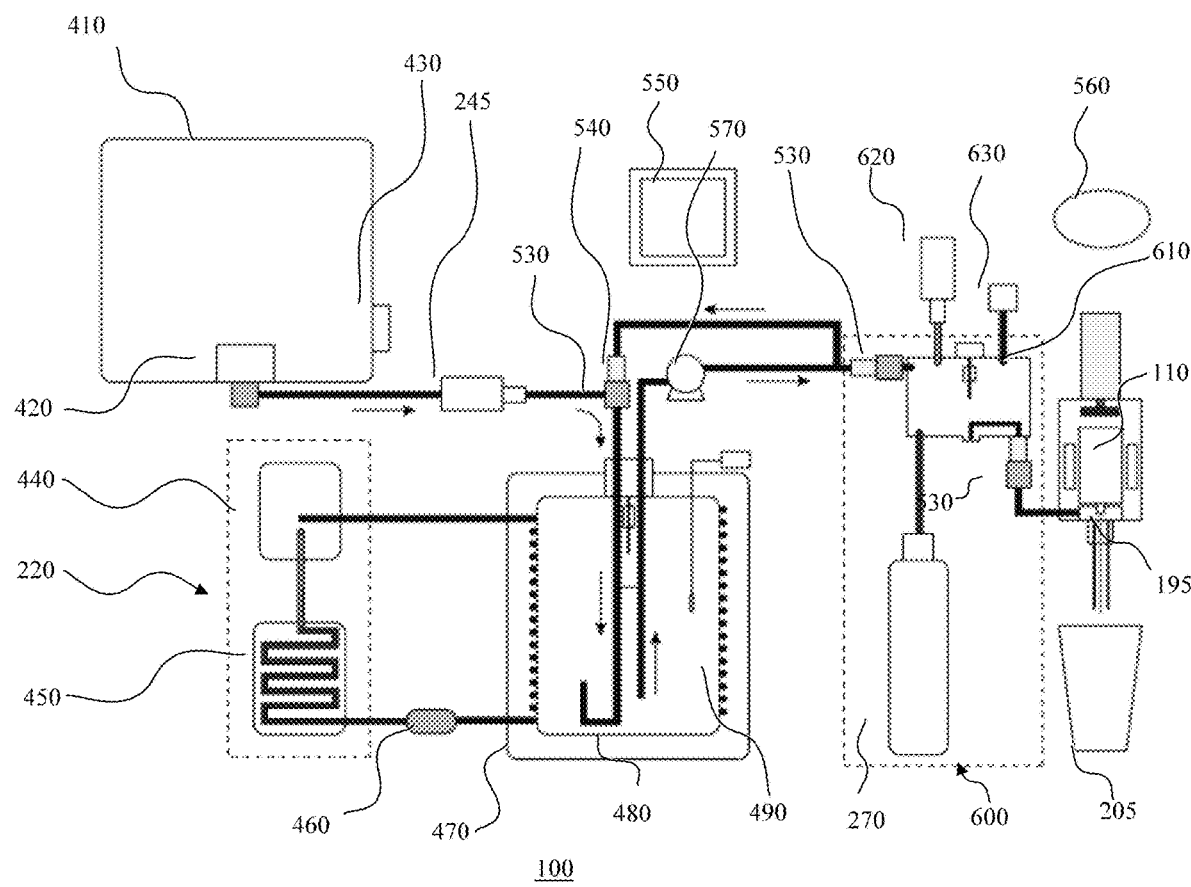
FIG. 15 shows a schematic lay out of the components of a first preferred embodiment of the single serve beverage dispenser of the present invention.

FIG. 15 shows a schematic lay out of the components of a first preferred embodiment of the single serve beverage dispenser of the present invention.

Elements of the beverage dispensing device 100 include a liquid reservoir 410, a liquid refrigeration unit 220, a chilled liquid container 480, an insulated carbonation dispensing tank 610, a beverage dispensing cartridge 110 and a beverage container 205. Again, it should be noted that beverage dispensing pouch 20 may be used instead of the beverage dispensing cartridge 110.

In a preferred embodiment, the liquid reservoir 410 may, for instance, be a 1 gallon refillable water tank, having a liquid level sensor 430 and a liquid filter 420. Water from the liquid reservoir 410 may be moved to the chilled liquid container 480 by a suitable liquid pump 245. The transfer may be done via a check valve 530 and a solenoid activated flow valve 540.

The chilled liquid container 480 may, for instance, be a stainless steel tank having a insulation jacket 470. The chilled liquid container 480 may be cooled by a liquid refrigeration unit 220 that circulates a chilled refrigerant liquid or gas through refrigeration coils 490 that may surround the chilled liquid container 480. The liquid refrigeration unit 220 may include a refrigeration compressor 440 that compresses the refrigerant from a gas to a liquid, generating heat. The refrigerant may then pass through a refrigeration evaporator 450 that allows the liquid to evaporate and cool. The cold gas or liquid may then be circulated through the refrigeration coils 490 via a refrigerated liquid accumulator 460.

The refrigerant may be any suitable chemical compound such as, but not limited to, Carbon tetrachloride, Trichlorofluoromethane, Bromodifluoromethane, Trifluoromethane, Dichloromethane, Chlorofluoromethane, Difluoromethane, Chloromethane, Fluoromethane, Methane, Hexachloroethane, Pentachlorofluoroethane, Hexafluoroethane, trifluoroethane, Tetrafluoroethane, Trifluoroethane, Difluoroethane, Chloroethane, Ethane, Octafluoropropane, Heptafluoropropane, Hexafluoropropane, Hexafluoropropane, Propane, Octafluorocyclobutane, Decafluorobutane, Tetradecafluorohexane, Isobutane, Pentane, Isopentane, Diethyl ether, Methyl formate, Methylamine, Ethylamine, Hydrogen, Helium, Ammonia, or some combination thereof.

The carbonation system 600 may include an insulating carbonation dispensing tank 610 into which refrigerated water may be pumped via a check valve 530. The liquid in the insulating carbonation dispensing tank 610 may be carbonated by CO2 provided from a CO2 cylinder 270. The carbonated water in the insulating carbonation dispensing tank 610 may be kept under pressure by an air pump 620 that may be regulated by a vent valve 630. When the user selects to dispense a beverage, the carbonated water may be supplied under the pressure in the carbonation tank via a check valve 530 to the mixing nozzle structure 195 to mix with the concentrate from the beverage dispensing cartridge 110 or the beverage dispensing pouch 20.

From the cold liquid container 480, the cold liquid may be pumped to the beverage container 205 by a circulation pump 570, or the cold liquid may be dispensed by means of the pressure in the container. The circulation pump 570 may, when beverages are not being dispensed, circulate water around a loop back to the cold liquid container 480 via the solenoid activated flow valve 540 and the check valve 530. This may, for instance, be done to keep the plumbing and other components of the beverage dispensing device 100 at a sufficiently low temperature to ensure that the mixing fluid is dispensed at an optimal temperature.

Figure 16:
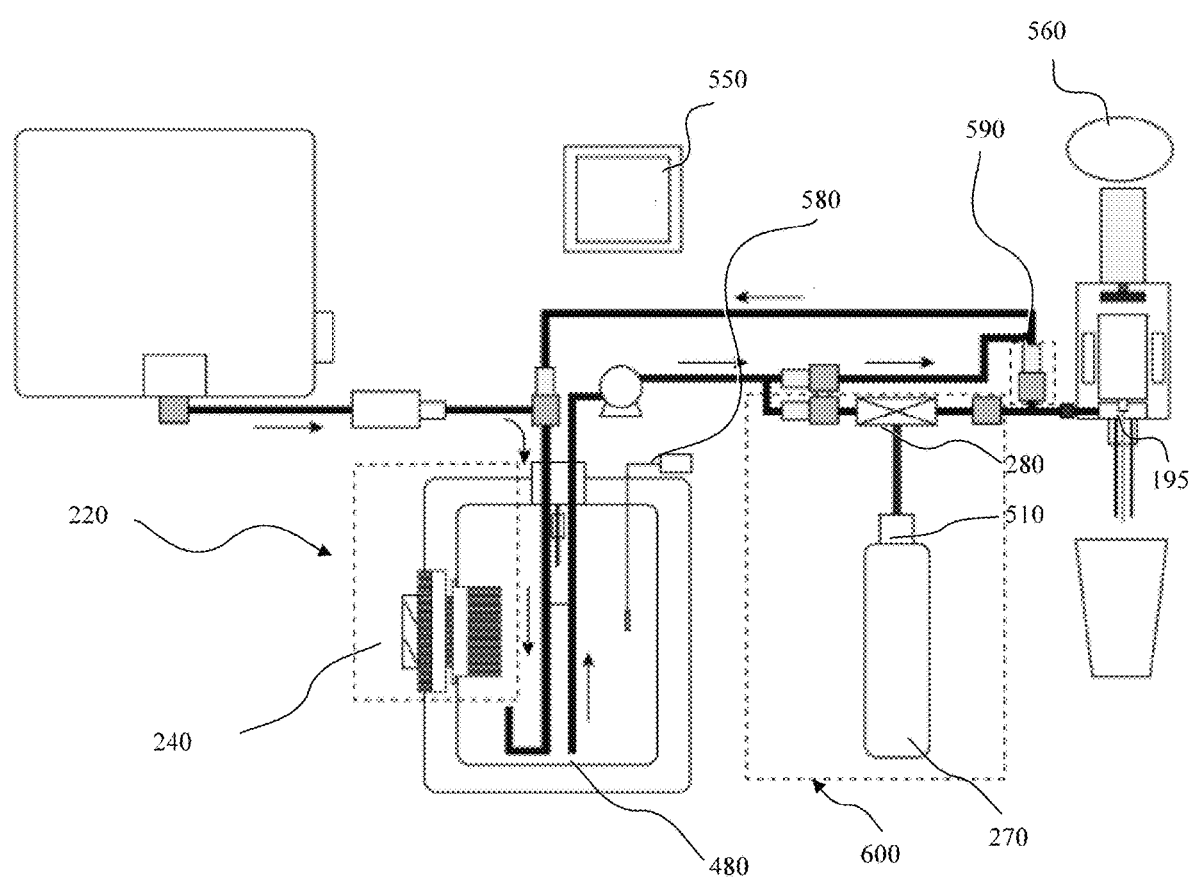
FIG. 16 shows a schematic lay out of the components of a second preferred embodiment of the single serve beverage dispenser of the present invention.

FIG. 16 shows a schematic lay out of the components of a second preferred embodiment of the single serve beverage dispenser of the present invention. The schematic design shown in FIG. 16 is substantially similar to the design shown in FIG. 15, except that the liquid refrigeration unit 220 now consists of a Peltier device 240 that may be mounted on the wall of the chilled liquid container 480 that may be a plastic container. The temperature may be monitored by a suitable temperature sensor 580, such as, but not limited to, a thermocouple device.

The design of FIG. 16 also differs from that of FIG. 15 in that the carbonation unit may now be an inline carbonation device.

A Peltier device 240 produces thermoelectric cooling using the Peltier effect in which a current flow across the junction of two different types of materials causes a transfer of heat across the junction. The main advantages of a Peltier cooler compared to a vapor-compression refrigerator are its lack of moving parts or circulating liquid, and its small size and flexible shape or form factor. Its main disadvantages are that it is relatively expensive and inefficient. Peltier devices 240 are generally 5-10% as efficient as the ideal refrigerator, as determined by the Carnot cycle, compared with 40-60% achieved by conventional compression cycle systems. Due to the low efficiency, thermoelectric cooling is most useful in environments where the benefits of having a refrigerator with no moving parts, that is maintenance-free and of a compact size outweigh pure efficiency.

Using the user interface 560 a user may instruct the beverage dispensing device 100 via the internal electronics controller 550 to direct the mixing liquid either directly to the mixing nozzle structure 195 or to send it via the carbonation device 280, or to send a portion of the liquid via both of these paths. In this way, the user may select how carbonated the beverage concentrate 175 in the beverage dispensing cartridge 110 or the beverage dispensing pouch 20 will be when dispensed into the beverage container 205.

The carbonation device 280 may, for instance, be an inline Venturi carbonator activated using a refillable CO2 cylinder 270 and controlled by a $CO_2$ gas regulator 510.

The carbonation system 600 may, for instance, allow the user to select one of three options. The first may be complete carbonation of the mixing fluid, in which essentially all the mixing fluid flow through the carbonation device 280. The second may be no carbonation, in which essentially all the mixing fluid flows through the bypass assembly 590. The third may be partial carbonation in which a possibly variable amount of the mixing fluid flows through the carbonation device 280, while the reminder of the mixing fluid flows through the bypass assembly 590.

Figure 17:
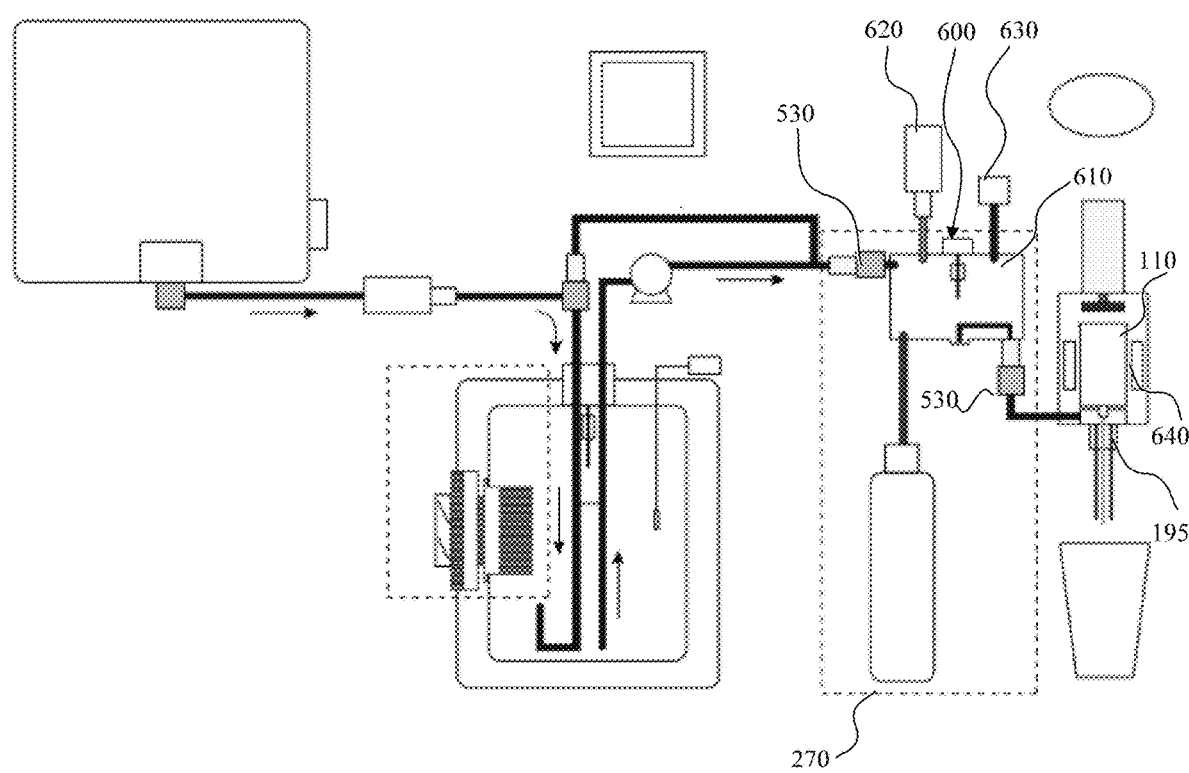
FIG. 17 shows a schematic lay out of the components of a third preferred embodiment of the single serve beverage dispenser of the present invention.

FIG. 17 shows a schematic layout of the components of a third preferred embodiment of the single serve beverage dispenser of the present invention.

The schematic design of FIG. 17 is substantially similar to that of FIG. 16 expect that the carbonation of the liquid may now be done using the carbonation system 600, as described in connection with FIG. 15. The carbonation system 600 may, for instance, include a insulating carbonation dispensing tank 610 into which refrigerated water may be pumped via a check valve 530. The liquid in the insulating carbonation dispensing tank 610 may be carbonated by $CO_2$ provided from a $CO_2$ cylinder 270. The carbonated water in the insulating carbonation dispensing tank 610 may be kept under pressure by an air pump 620 that may be regulated by a vent valve 630. When the user selects to dispense a beverage, the carbonated water may be supplied by a check valve 530 to the mixing nozzle structure 195 to mix with the concentrate from the beverage dispensing cartridge 110 or the beverage dispensing pouch 20.

In the embodiment shown schematically in FIG. 17, there may also be a beverage concentrate cooler 640. The beverage concentrate cooler 640 may, for instance, be a Peltier device whose functioning is described in greater detail above.

Figure 18:
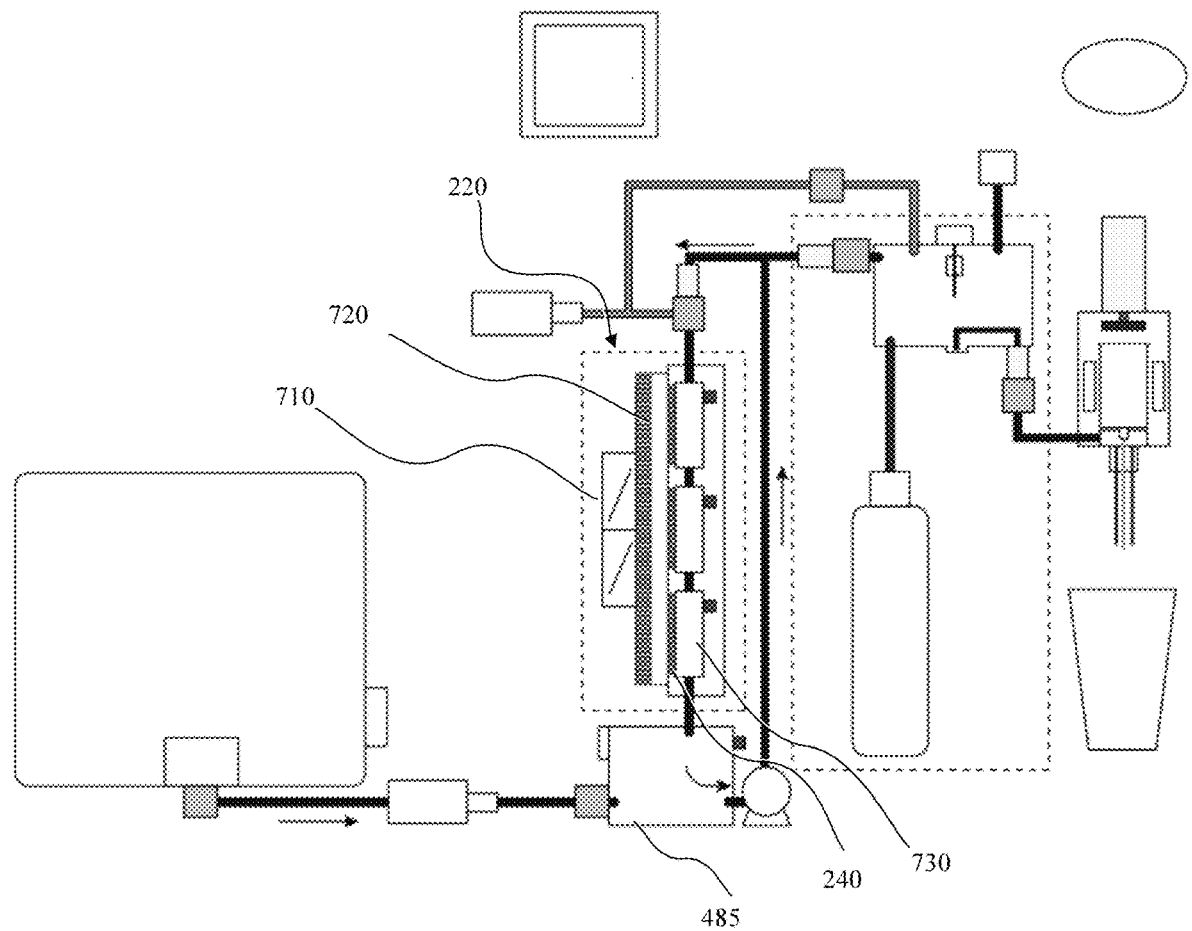
FIG. 18 shows a schematic lay out of the components of a fourth preferred embodiment of the single serve beverage dispenser of the present invention.

FIG. 18 shows a schematic lay out of the components of a fourth preferred embodiment of the single serve beverage dispenser of the present invention.

The schematic design shown in FIG. 18 is substantially similar to the design described in connection with FIG. 17, except that the liquid refrigeration unit 220 may now be a pass through device with a liquid reservoir 485. The liquid refrigeration unit 220 may now include one or more Peltier devices 240, placed alongside water blocks 730. The water block 730 may, for instance, be flattened portions of pipe that allow the water being re-circulated to the cold liquid reservoir 485 to be cooled by the Peltier devices 240. The water block 730 may, for instance, include baffles to slow the passage of the water in those regions so as to more effectively cool the water.

The Peltier devices 240 may be cooled by a combination of a heat sink 720 and a heat dispensing fan 710.

Figure 19:
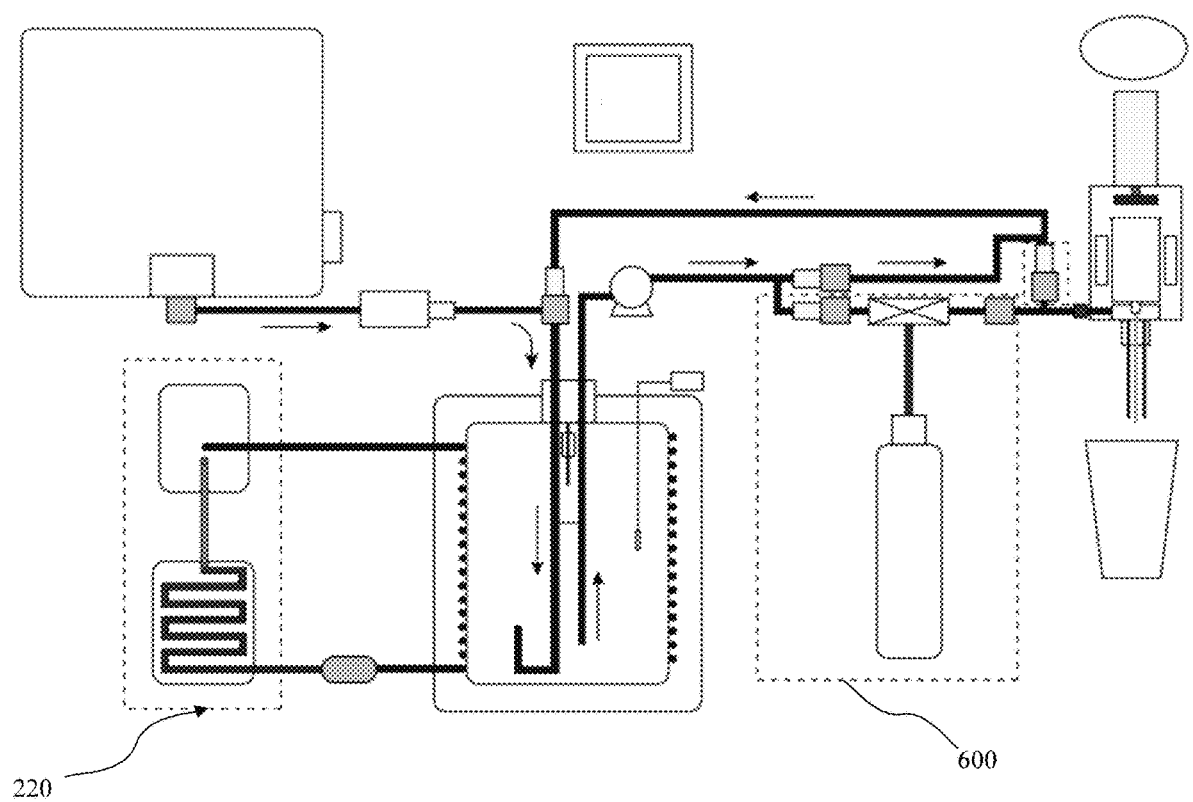
FIG. 19 shows a schematic lay out of the components of a fifth preferred embodiment of the single serve beverage dispenser of the present invention.

FIG. 19 shows a schematic lay out of the components of a fifth preferred embodiment of the single serve beverage dispenser of the present invention.

The schematic design shown in FIG. 19 is substantially similar to the design described in connection with FIG. 17, except that the liquid refrigeration unit 220 may now be a vapor compression refrigeration unit similar to that described above in, for instance, the description of FIG. 15. The carbonation system 600 may, however, be a carbonation device 280 such as, but not limited to, an inline Venturi device similar to that described above in, for instance, the description of FIG. 18.

To use the beverage dispensing device 100, a user may first ensure the liquid reservoir 410 is sufficiently full with water. The user may then place a beverage dispensing cartridge 110 or a beverage dispensing pouch 20 in the beverage dispensing device 100. In various alternate embodiments, a user may then use the user interface 560 to select a desired quantity to be dispensed into the beverage container 205. The user may also use the user interface and controller 560 to select other attributes of the drink to be dispensed such as, but not limited to, the temperature the drink is to be dispensed at and the degree, if any, of carbonation of the drink.

The user may then use the user interface 560 to initiate dispensing of the drink. This may, for instance, activate the internal electronics controller 550 to initiate a sequence of events such as, but not limited to, water being transferred from the liquid reservoir 410 by the liquid pump 245 to the chilled liquid container 480, and when the temperature sensor 580 registers the appropriate temperature, transferring chilled liquid to carbonation/dispensing tank 610, where the water may or may not be carbonated, and then transferring liquid to the mixing nozzle structure 195 by means of circulation pump 570, or by the pressure within the carbonation tank.

This transfer may be timed with an activation of the beverage dispensing cartridge 110 or the beverage dispensing pouch 20, i.e., with a manual or automatic action in which the upper piston 160 of the beverage dispensing cartridge 110 may be driven towards the lower piston 170, or in which rollers 55 are pressing against the impermeable seal 25 of the beverage dispensing pouch 20 to apply pressure to the pouch void 22. In doing so, for the beverage dispensing cartridge 110, the liquid outlet 180 of the lower piston 170 may penetrate the pressure rupturable diaphragm 150 and the base of the impermeable, cylindrical cartridge 120 and release the beverage concentrate 175 into the mixing nozzle structure 195. For the beverage dispensing pouch 20, the sealing member 35 is removed or pierced by the liquid outlet 43, first and/or second pressure rupturable diaphragm 45/48 are ruptured, and the beverage concentrate 175 may be released from the pouch void 22 into the mixing nozzle 195. This release of the beverage concentrate 175 into the mixing nozzle structure 195 may be timed to coincide with chilled, possibly carbonated, liquid entering the mixing nozzle structure 195 and mixing with the beverage concentrate 175 so that a suitably chilled and mixed beverage is dispensed into the beverage container 205. As detailed above, the mixing nozzle structure 195 may be designed so that the mixing of water and concentrate occurs at a mixing zone 810 that is beneath and outside the mixing nozzle structure 195. This is often called "post mixing" and has the advantage of the concentrate not contacting the surface of the mixing nozzle structure 195, avoiding residue and possible flavor contamination from serving to serving, and provides a well mixed drink, formed from accurately predetermined mix ratios resulting in predictable Brix values for the dispensed beverage.

In addition to applications indicated above, the beverage dispensing technology disclosed here may also be used to a refrigerator or a water cooler. In addition, the beverage dispensing device may replace the refrigeration unit with a container, such as a removable pitcher, that may be put into a refrigerator to chill the liquid in the container and use the cold liquid for making the beverage.

Figure 20:
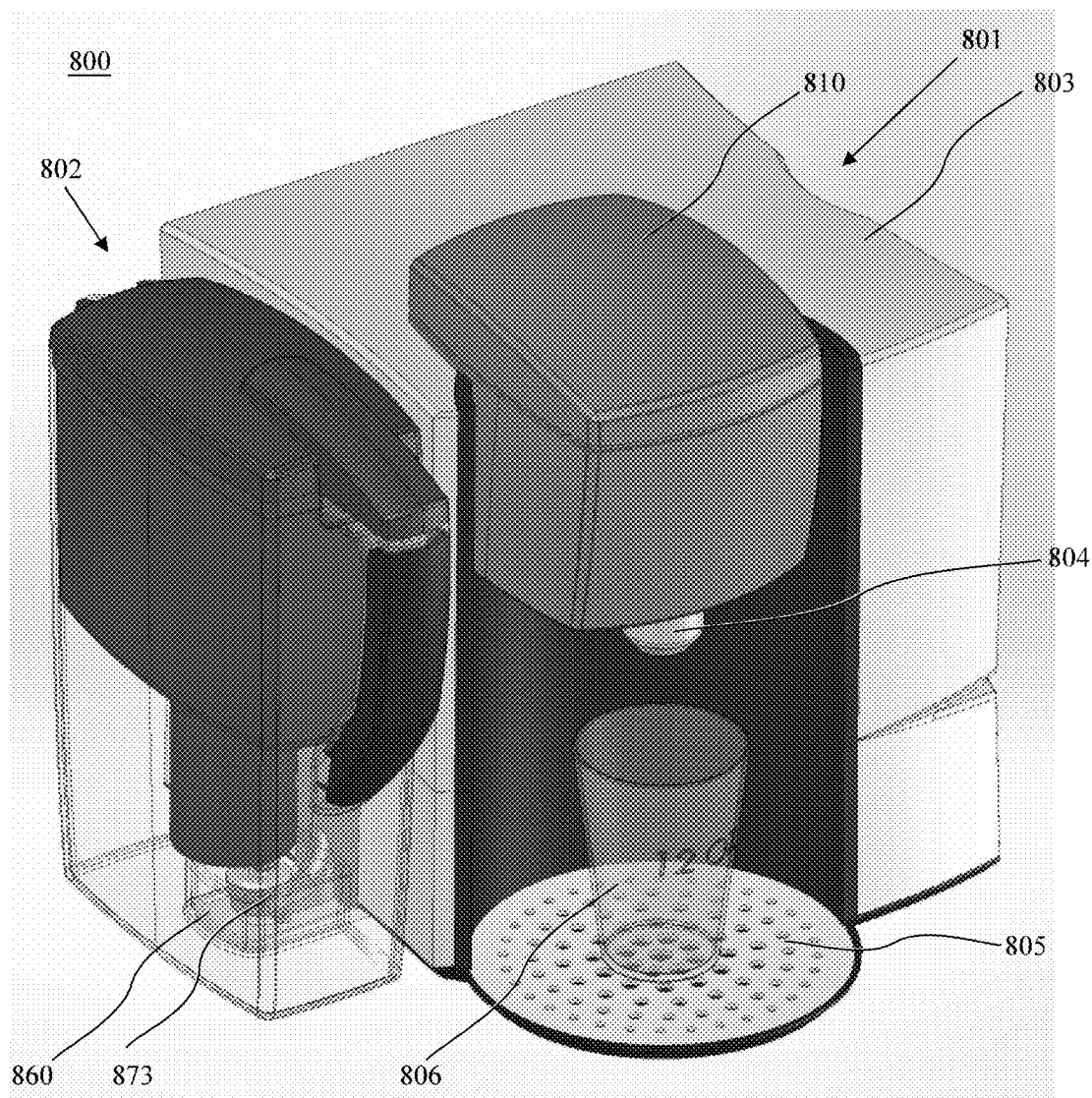
FIG. 20 shows a perspective view of another embodiment of the single serve beverage dispenser having a main unit and a removable water pitcher.

FIG. 20 shows a perspective view of another embodiment of the single serve beverage dispenser. Shown in FIG. 20 is the beverage dispenser 800 having a main unit 801 and a pitcher 802. The main unit 801 includes a main unit housing 803, a dripping pad 805 suitable for placement of beverage containers such as a cup 806, and a dispenser head compartment 810 with a dispensing nozzle 804. The main unit 801 and the pitcher 802 are connected by engaging a flipping inlet unit 873 from the main unit 801 with an outlet channel in a bottom concave 860 of the pitch 802.

Figure 21A:
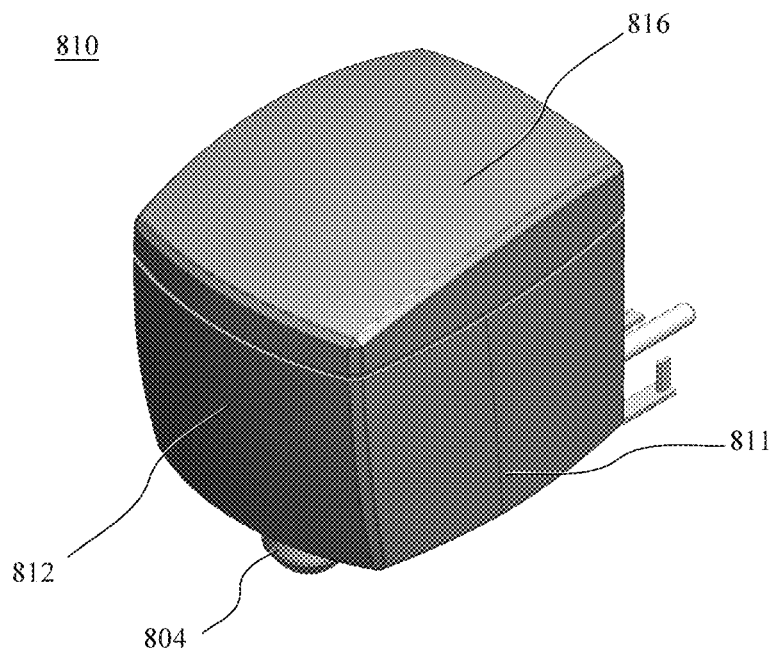
FIG. 21A shows a perspective view of a dispensing head compartment when the head compartment drawer is closed.

FIG. 21A shows a perspective view of the dispensing head compartment 810, as illustrated in FIG. 20. Shown in FIG. 21A is the dispensing head compartment 810 having a head compartment side housing 811, a head compartment drawer 812, and a head compartment cover 816, and the dispensing nozzle 804. As shown in FIG. 21A, the head compartment drawer 812 is closed, shielding the interior of the head compartment 810.

Figure 21B:
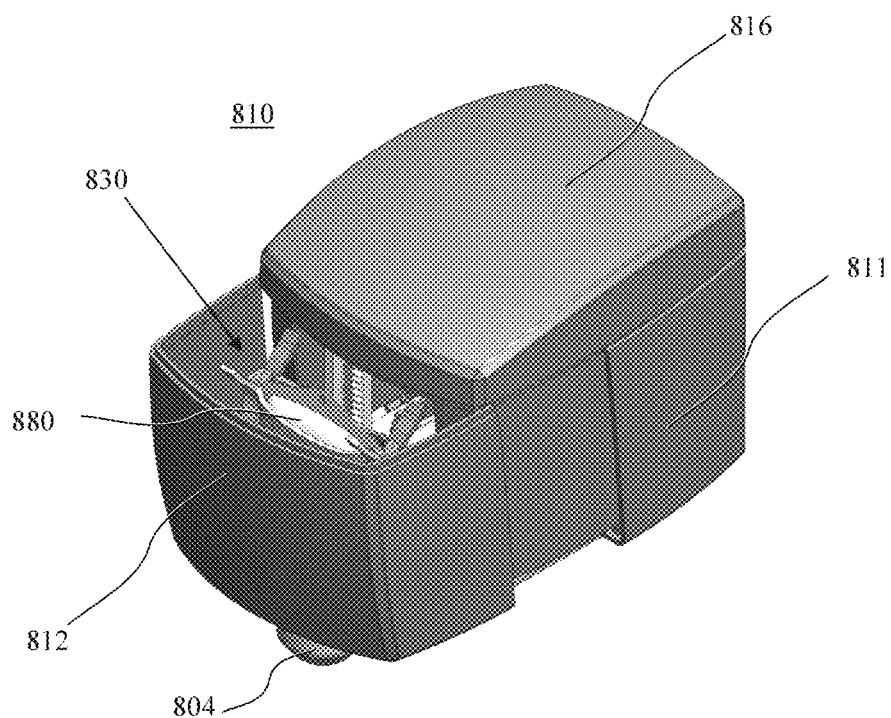
FIG. 21B shows a perspective view of a dispensing head compartment when the head compartment drawer is opened and a beverage pouch is inserted.

FIG. 21B shows a perspective view of the dispensing head compartment 810, as illustrated in FIG. 20. Shown in FIG. 21B is the dispensing head compartment 810 having a head compartment side housing 811, a head compartment drawer 812, a head compartment cover 816, and the dispensing nozzle 804. As shown in FIG. 21B, the head compartment drawer 812 is open, exposing the internal structures of the head compartment 810. Inside the head compartment 810, there is a pouch groove 830 accommodating a beverage dispensing pouch 880.

Figure 21C:
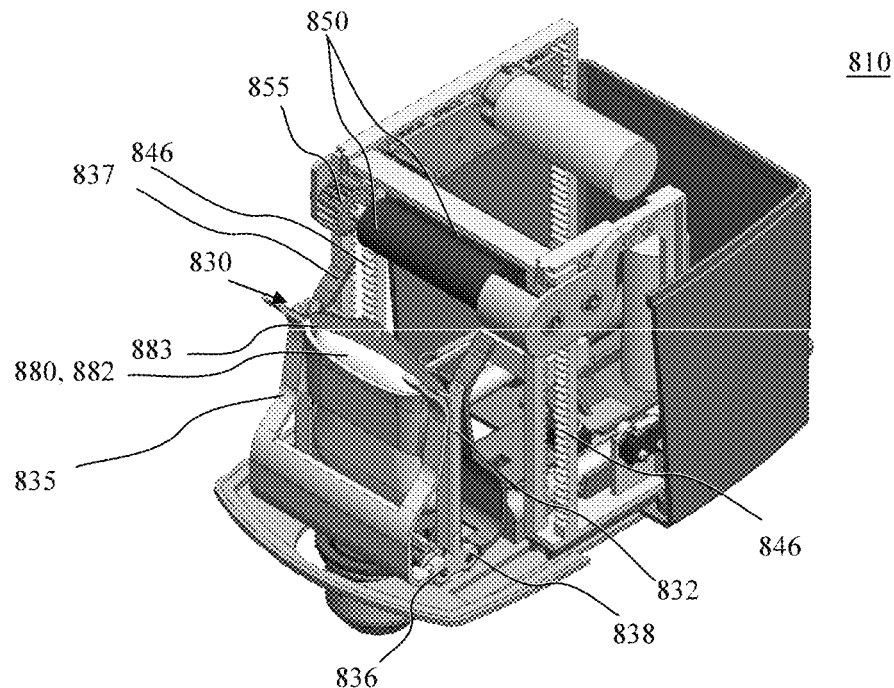
FIG. 21C shows a perspective view of the internal structures of the dispensing head compartment when the head compartment drawer is opened.

FIG. 21C shows a perspective view of the internal structures of the dispensing head compartment 810 when the head compartment drawer is opened. For clarity purposes, the head compartment cover 816, a front part of the head compartment side housing 811, and the head compartment drawer 812, as shown in FIGS. 21A and 21B, are not in FIG. 21C. Shown in FIG. 21C is the pouch groove 830 including a pouch groove cassette 832, a front rack 835, and a back rack 837. The lower part of the front rack 835 connects to the groove cassette 832 with a front rack hinge 836. Similarly, the lower part of the back rack 837 connects to the groove cassette 832 with a back rack hinge 838. As a whole, the pouch groove 830 embraces the beverage dispensing pouch 880 having a pouch seal body 882 and pouch seal side strips 883. The pouch seal side strips 883 are embraced by the groove cassette 832. The upper parts of the front rack 835 and back rack 837 are conformed to generally fit the outer contours of the pouch seal body 883, while the lower parts of the front rack 835 and back rack 837 arch away from the beverage dispensing pouch 880. The combination of the front rack 835, back rack 837, and the groove cassette 832 ensures that the dispensing pouch 880 is securely disposed in the pouch groove 830. In addition, though not shown in FIG. 21C, the lower end of the dispensing pouch 880 is sealed by a pouch fitment that engages the dispensing nozzle 804, further securing the dispensing pouch 880 in place. Also shown in FIG. 21C is a set of vertical gear tracks 846, rollers 850, and roller gear wheels 855. The specific structures and functions of these components are shown in details in FIGS. 24A and 24B.

Figure 21D:
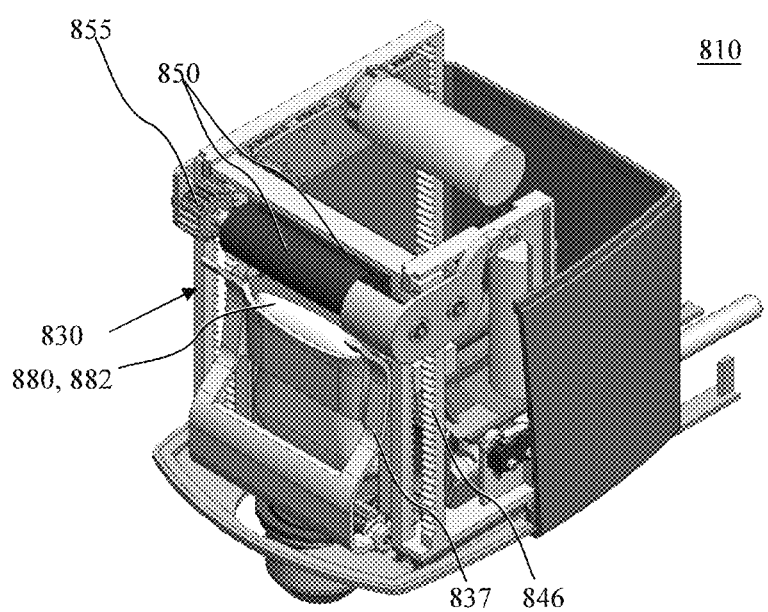
FIG. 21D shows a perspective view of the internal structures of the dispensing head compartment when the head compartment drawer is closed but before the rollers engage the pouch.

FIG. 21D shows a perspective view of the internal structures of the dispensing head compartment 810 when the head compartment drawer is closed but before the rollers 850 engage the dispensing pouch 880. Essentially the same components are shown in FIG. 21D as FIG. 21C. Here, the head compartment drawer (not shown in FIG. 21C) is closed as in FIG. 21A. As in FIG. 21C, the shielding components are removed to illustrate the internal structures. In FIG. 21D, the pouch groove 830 and accordingly the dispensing pouch 880, are positioned right beneath the rollers 850.

FIGS. 21A-21D demonstrate how the beverage dispensing pouch 880 may be added to the dispenser. A user of the dispenser may pull the head compartment drawer 812 open, exposing the pouch groove 830, which is empty before the insertion. The user may then put the dispensing pouch 880 into the pouch groove 830, push the pouch all the way down, and be sure that the pouch groove cassette 832, the front rack 835, and the back rack 837 secure the pouch in place. In the next step, the user pushes the head compartment drawer 812 back so that the head compartment 810 closes and the components are as shown in FIGS. 21A and 21D. It should also be noted that the pouch-loading process may be either manual or automated. In an automated model, the user may electronically control the opening and closing of the head compartment 810 by pushing buttons or adjusting switches.

Figure 22A:
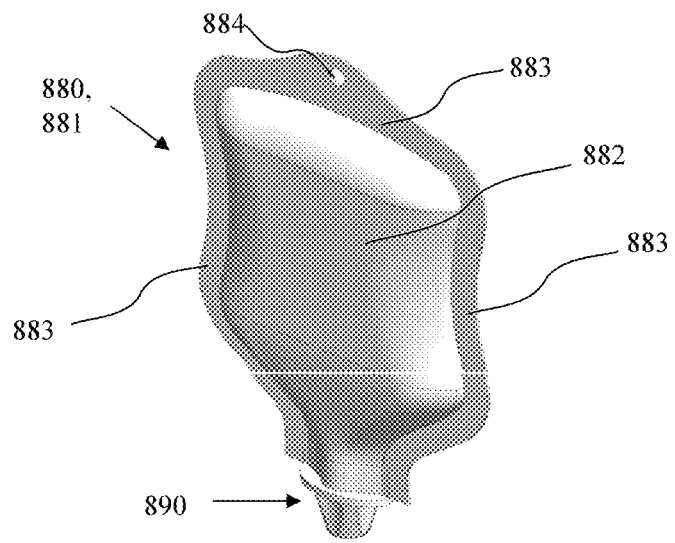
FIG. 22A shows a perspective view of a dispensing pouch and a pouch fitment.

FIG. 22A shows a perspective view of a dispensing pouch 880 and a pouch fitment 890. Shown in FIG. 22A is a pouch seal 881 having a pouch seal body 882 and a pouch seal side strips 883. On the top strip of the pouch seal side strips 883 there is a hanger hole 884. The pouch seal 881 encloses pouch void (not shown in FIG. 22A), which has a open lower end that is sealed by a pouch fitment 890.

Figure 22B:
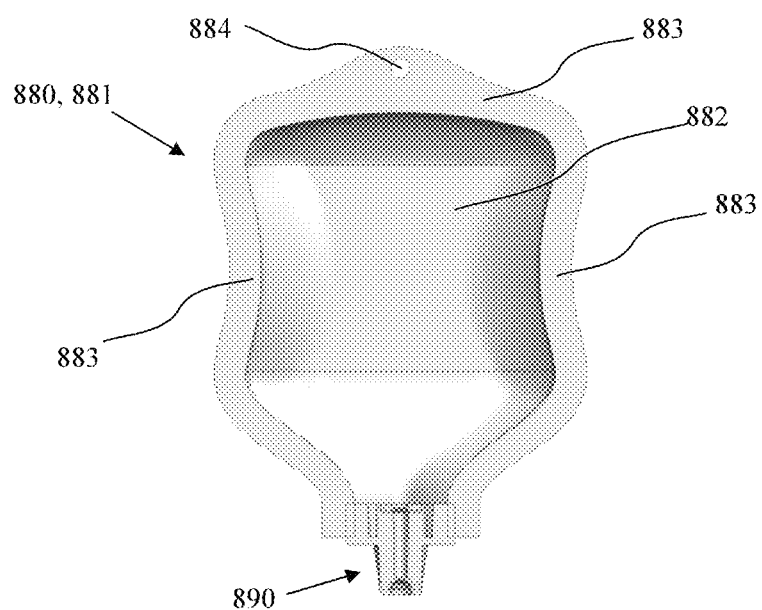
FIG. 22B shows a front view of a dispensing pouch and a front sectional view of a pouch fitment.

FIG. 22B shows a front view of a dispensing pouch 880 and a front sectional view of a pouch fitment 890. Shown in FIG. 22B is a pouch seal 881 having a pouch seal body 882 and a pouch seal side strips 883. On the top strip of the pouch seal side strips 883 there is a hanger hole 884. The pouch seal 881 encloses pouch void (not shown in FIG. 22B), which has an open lower end that is sealed by a pouch fitment 890. The pouch fitment 890 has position fins that help to attach the pouch fitment 890 to the beverage dispensing pouch 880.

Generally, FIGS. 22A and 22B show similar structures as illustrated in FIGS. 7A, 7B, 8A, 8B, 9A, and 9B, though the specific design of the pouch seal and pouch fitment may be different. As indicated in the discussions for beverage dispensing pouch in general, the beverage dispensing pouch 880 is used to store syrup/concentrate for the dispensing device. The syrup/concentrate may be mixed and/or diluted with other liquid in the dispensing process. Also as indicated above, the pouch fitment 890 is used to seal the pouch and, when necessary, control the flow of the content of the pouch. The specific design of the pouch fitment 890 is discussed in FIG. 23.

Having individual pouches allow the user to choose and change what beverage the dispenser makes with ease. Pouches housing different concentrates may be distinguished by shape, color, label, surface texture, bar code, and/or any combination thereof. Other aspects of the dispenser may be adjusted according to the contents of the pouch. Factors such as the multitude of dilution, the temperature of the final beverage, whether to carbonate, may all be set or programmed by the seller and/or the user of the dispenser. The individual parameters may be set individually. Or a series of parameters may be programmed for a specific beverage. The user may rely on his/her eyes to choose the right pouch and right program. Or the dispenser may sense the type of pouch, for example, by reading a bar code on the pouch, to automatically trigger a beverage-making program.

Figure 23A:
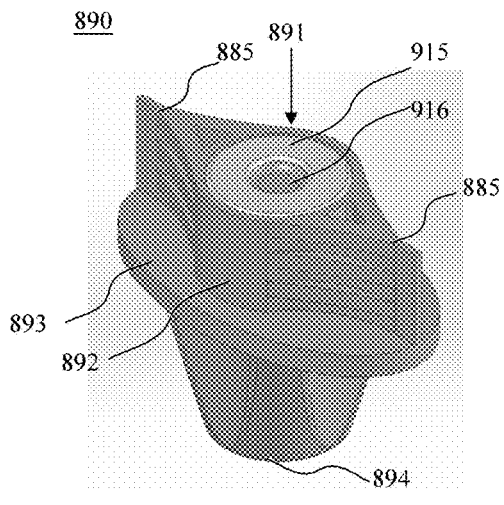
FIG. 23A shows a perspective view of a pouch fitment.

FIG. 23A shows a perspective view of the pouch fitment 890. Shown in FIG. 23A is the pouch fitment 890 having a fitment body 892 with a pair of positioning fins 885, a horizontal flange 893 and a fitment nozzle 894. The fitment body 892 encircles a fitment interior channel (not shown in FIG. 23A) having a top opening that is sealed by a pressure rupturable diaphragm 891. The pressure rupturable diaphragm 891 comprises a surrounding ring 915 and a rupturable membrane 916 attached to the middle of the surrounding ring 915.

Figure 23B:
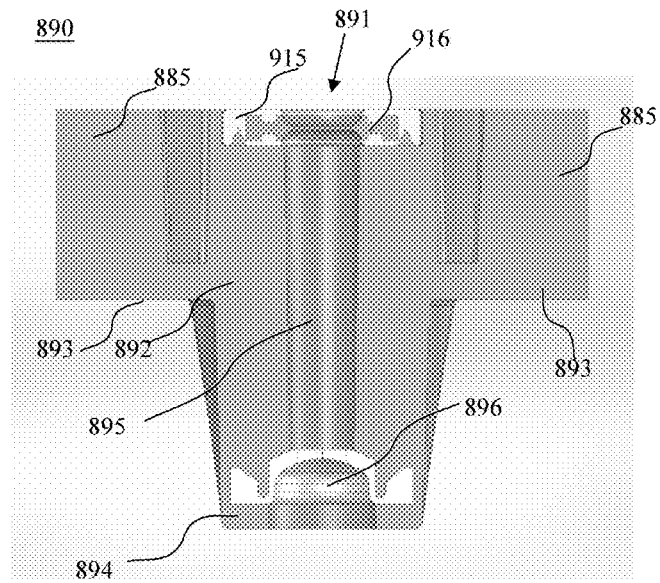
FIG. 23B shows a front sectional view of the pouch fitment.

FIG. 23B shows a front sectional view of the pouch fitment 890. Shown in FIG. 23B is the pouch fitment 890 having a fitment body 892 with a pair of positioning fins 885, a horizontal flange 893 and a fitment nozzle 894. The fitment body 892 encircles a fitment interior channel 895. The top opening of the fitment interior channel 895 is sealed by a pressure rupturable diaphragm 891. The pressure rupturable diaphragm 891 comprises a surrounding ring 915 and a rupturable membrane 916 attached to the middle of the surrounding ring 915. As a whole the surrounding ring 915 and the rupturable membrane 915 covers the top opening of the fitment interior channel 895. The surrounding ring 915 is preferably made from hard plastic; the rupturable membrane 915 is preferably made from thermoplastic elastomer (TPE) or foil, though both elements may be made from different materials. The rupturing of the pressure rupturable diaphragm 891 refers to the rupturing of the rupturable membrane. Also shown in FIG. 23B is outflow valve 896 covering the bottom opening of the fitment interior channel 895.

Figure 23C:
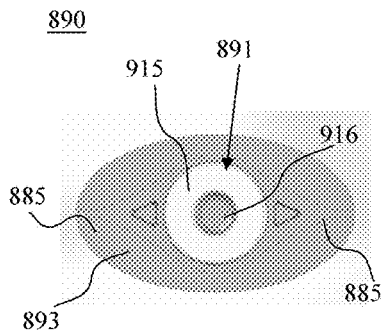
FIG. 23C shows a top view of a pouch fitment.

FIG. 23C shows a top view of the pouch fitment 890. Shown in FIG. 23C is the pouch fitment 890 having a fitment body 892 with a pair of positioning fins 885 and a horizontal flange 893. The fitment body 892 encircles a fitment interior channel (not shown in FIG. 23C) having a top opining that is sealed by a pressure rupturable diaphragm 891.

Figure 23D:
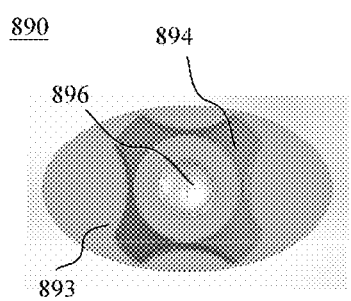
FIG. 23D shows a bottom view of a pouch fitment.

FIG. 23D shows a bottom view of a pouch fitment 890. Shown in FIG. 23D is the pouch fitment 890 having a fitment body 892 with a horizontal flange 893 and a fitment nozzle 894. There is an outflow valve 896 disposed at the bottom opening of the fitment interior channel 895 (not shown in FIG. 23D).

Figure 23E:
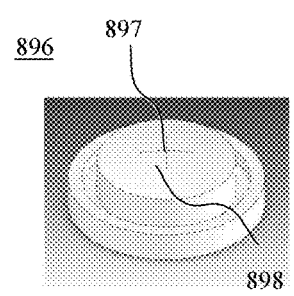
FIG. 23E shows a perspective view of the outflow valve.

FIG. 23E show a top perspective view of the outflow valve 896. Shown in FIG. 23E are the "+" shaped outlet 897 and the triangular leave 898. The outflow valve 896 is the same structure as the outflow valve in FIGS. 8C-8G and the descriptions to FIGS. 8C-8G also apply here. Preferably, the outflow valve 896 has an arcuate portion that arches upward toward the direction of the pouch, as shown in FIG. 23B. The arcuate portion of the outflow valve 896 membrane may be provided with intersecting slits to define a plurality of generally triangular leaves 898. When contents of the pouch are pressurized for dispensing, the triangular leaves bend to allow the liquid to pass through the fitment's lower orifice. When the dispensing pressure is released, the triangular leaves 898 spring back to their original position and operate to block passage of liquid through the fitment orifice. The leaves of the valve are sufficiently resilient that they do not bend open unless the applied pressure exceeds the hydraulic static pressure generated by a full pouch, therefore prevent dripping.

FIGS. 23A-23E illustrate an embodiment of the pouch fitment 890. The embodiment here is generally similar to the embodiment shown in FIGS. 8C-8G, without the sealing member 35. Therefore, the descriptions provided for FIGS. 8C-8G should be considered included by the current embodiment, as long as the descriptions do not conflict with the specific structures shown here.

Figure 24A:
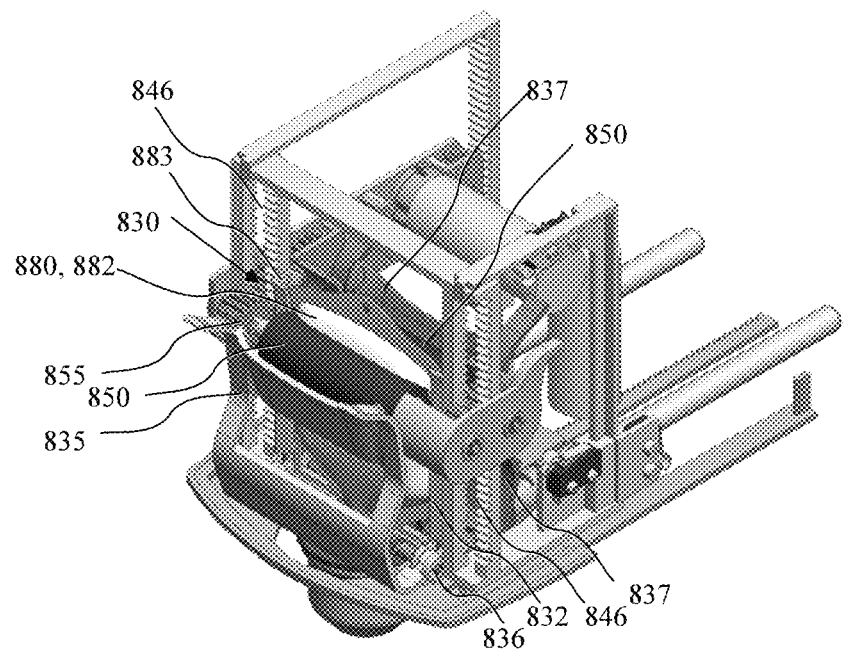
FIG. 24A shows a perspective view of the internal structures of the dispensing head compartment when the rollers press the pouch.
Figure 24B:
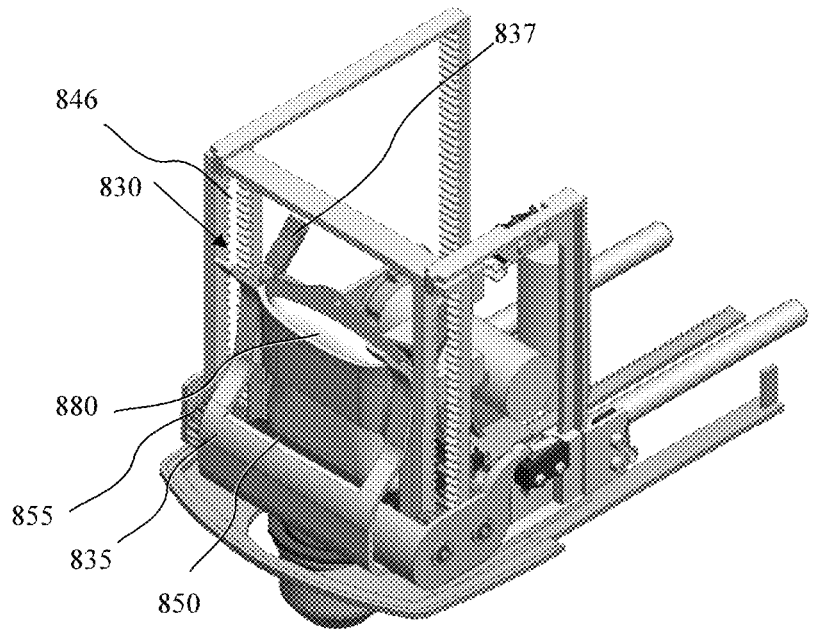
FIG. 24B shows a perspective view of the internal structures of the dispensing head compartment when the rollers finish a pouch-pressing process.

FIGS. 24A and 24B show how the contents of the beverage dispensing pouch 880 are dispensed by the rollers 850. The roller system is similar to what is shown in FIGS. 11A-11C, with more details to the structures of the various components and controlling mechanisms. Preferably, the rollers 850 include a pair of rollers aligned horizontally opposite to each other and held close to each other. When the roller system moves down, the rollers squeeze the beverage dispensing pouch 880 so that one roller presses against the front side and the other against the back side of the beverage dispensing pouch 880.

FIG. 24A shows a perspective view of the internal structures of the dispensing head compartment 810 when the rollers 850 squeeze the beverage dispensing pouch 880. For clarity purposes, the head compartment cover 816, the head compartment side housing 811, and the head compartment drawer 812, as shown in FIGS. 21A and 21B, are not in FIG. 24A. Shown in FIG. 24A is the pouch groove 830 including a pouch groove cassette 832, a front rack 835, and a back rack 837. The lower part of the front rack 835 connects to the groove cassette 832 with a front rack hinge 836. Similarly, the lower part of the back rack 837 connects to the groove cassette 832 with a back rack hinge 838 (not shown in FIG. 24A). As a whole, the pouch groove 830 embraces the beverage dispensing pouch 880 having a pouch body 882 and pouch seal side strips 883. The pouch seal side strips 883 are embraced by the groove cassette 832. Also shown in FIG. 24A are rollers 850, a set of vertical gear tracks 846, and roller gear wheels 855 that are co-axially connected to the roller 850 and engage the vertical gear tracks 847. Here in FIG. 24A, the rollers 850 are moving down to press against the beverage dispensing pouch 880 through the engaged rotation of the rollers gear wheels 855 along the vertical gear tracks 846. In the meantime, the upper parts of the front rack 835 and back rack 837 are tilting away from the beverage dispensing pouch 880, making way for the rollers 850 and the roller gear wheels 855.

FIG. 24B shows a perspective view of the internal structures of the dispensing head compartment 810 when the rollers 850 finish a pouch-pressing process. Shown in FIG. 24B are essentially the same elements as FIG. 24A. For clarity purposes, not all components are marked. Here in FIG. 24B, the rollers 850 have moved all the way down and have finished pressing against the beverage dispensing pouch 880. In the meantime, the upper parts of the front rack 835 and back rack 837 are back in their original positions to embrace the beverage dispensing pouch 880, while the lower parts of the front rack 835 and back rack 837 arch away from the beverage dispensing pouch 880, making room to accommodate the rollers 850. The rollers 850 may then move back up to their original positions, ready for the next dispensing process.

Referring to FIGS. 21A-D, FIGS. 22A-B, FIGS. 23A-D, and FIGS. 24A-B, the process of dispensing the contents of the beverage dispensing pouch 880 may be described as the following: As shown in FIGS. 21B-D, after inserting the beverage dispensing pouch 880 into the pouch groove 830, the user may push back the head compartment drawer 810, positioning the beverage dispensing pouch 880 beneath the rollers 850. Here, preferably through an automated process (such as pushing a "pour" button), a user may cause the roller gear wheels 855 to rotatably move down the vertical gear tracks 846, making the rollers 850 to move down as well and press again the front and back sides of the beverage dispensing pouch 880. The pressing motion is similar to what is shown in FIGS. 11A-11C, though the specific design of the pouch fitment may be different. Referring to FIGS. 22A-B and FIGS. 23A-D, the pressing of the roller 850 causes the pressure on the pressure rupturable diaphragm 891 to increase. Above a certain threshold, the pressure rupturable diaphragm 891 ruptures and the contents of the beverage dispensing pouch 880 flows into the fitment interior channel 895. The outflow valve 896 is the same structure as the outflow valve 50 shown in FIGS. 8C-8G. The outflow valve 896 flexes down and allows the contents of the beverage dispensing pouch 880 to flow through its "+" shaped outlet. The outflow valve 896 serves at least two goals: (1) it directs the liquid flowing out of the beverage dispensing pouch 880 in a straight precise stream, and (2) it prevents dripping after the dispensing process is completed. Through the outflow valve, under certain pressure, the contents of the beverage dispensing pouch 880 then reaches the dispenser nozzle 804, where such contents, most likely syrup/concentrates are mixed with other liquid.

Figure 25A:
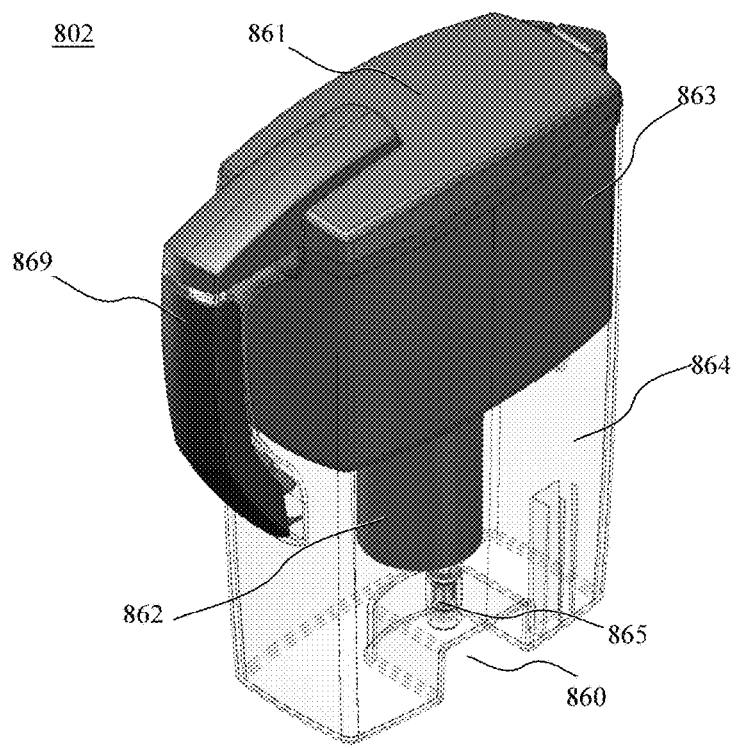
FIG. 25A shows a perspective view of a pitcher that can be connected to a main unit of a beverage dispenser.

FIG. 25A shows a perspective view of a pitcher 802 that can be connected to a main unit 801 of a beverage dispenser 800, as illustrated in FIG. 20. Shown in FIG. 25A is the pitcher 802 having an upper compartment 863, a lower compartment 864, a pitcher cover 861, a pitcher filter 862, a pitcher handle 869, and a bottom concave 860 located at the bottom of the lower compartment 864. In the bottom concave 860 there is an outlet channel 865.

The general design of the pitcher 802 may vary. The key feature is that the pitcher 802 may be fluidly and removably connected to the main unit 801 so that the liquid in the pitcher may be conveniently provided to the main unit 801.

The pitcher 802, with the liquid inside, may be refrigerated so that the liquid may become chilled or maintain a low temperature. Alternatively, the pitcher 802 may receive hot liquid and be kept in an insulated environment to maintain the high temperature for the liquid. No matter cold or hot, when the pitcher 802 is connected to the main unit 801, the liquid in the pitcher may be extracted and used for making the beverage dispensed from the main unit 801. The removable picture concept eliminates the need for the beverage dispenser to have its own refrigeration and/or heating system.

Figure 25B:
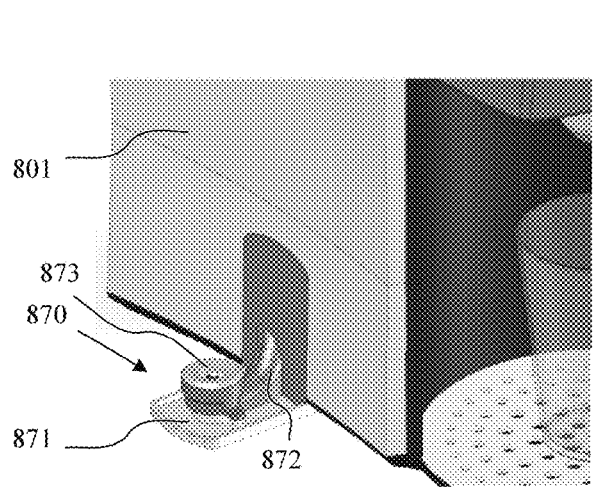
FIG. 25B shows a perspective view of a flipping inlet unit as part of the main unit of a beverage dispenser when the flipping inlet unit is flipped down.

FIG. 25B shows a perspective view of a flipping inlet unit 870 as part of the main unit 801 of a beverage dispenser 800 when the flipping inlet unit 870 is flipped down, as illustrated in FIG. 20. Shown in FIG. 25B is the flipping inlet unit 870 comprising a flipping base 871, an inlet tube 872, and an inlet nozzle 873. The flipping inlet unit 870 may be flipped down to an open position from the side walls of the main unit 801, as illustrated in FIG. 25B.

Figure 25C:
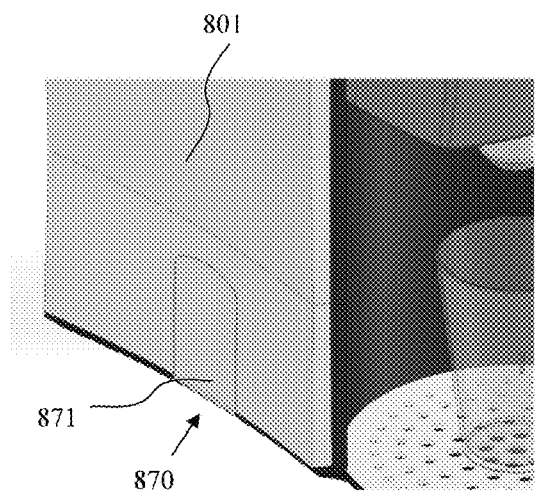
FIG. 25C shows a perspective view of a flipping inlet unit as part of the main unit of a beverage dispenser when the flipping inlet unit is flipped up.

FIG. 25C shows a perspective view of a flipping inlet unit 870 as part of the main unit 801 of a beverage dispenser 800 when the flipping inlet unit 870 is flipped up. Shown in FIG. 25B is the flipping inlet unit 870 having a flipping base 871. The flipping inlet unit 870 may be flipped up to a closed position into the side walls of the main unit 801, as illustrated in FIG. 25C.

Figure 25D:
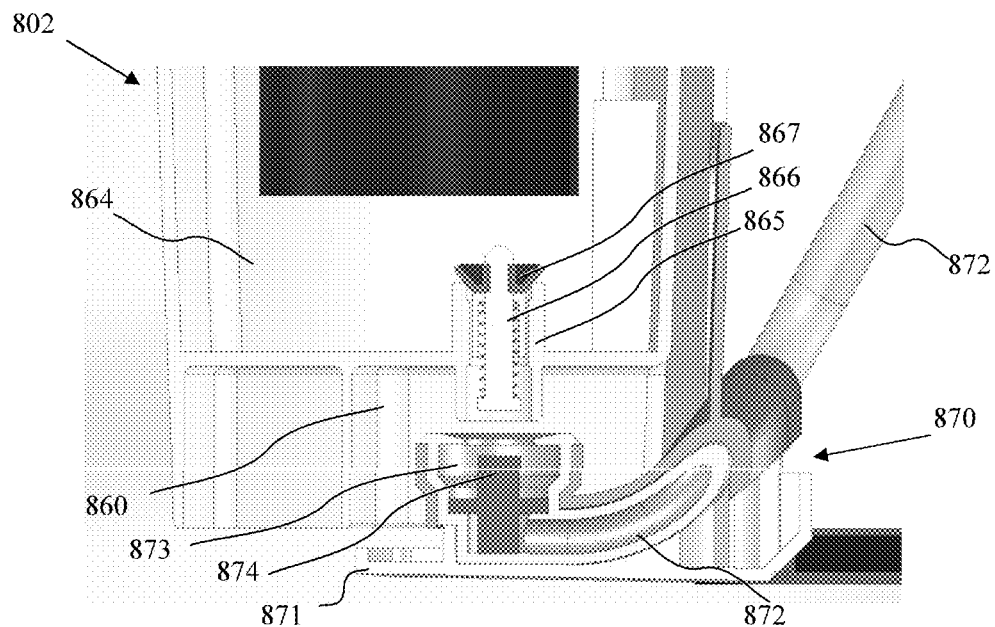
FIG. 25D shows a side sectional view of an outlet channel and a flipping inlet unit before the outlet channel and the inlet unit are engaged.

FIG. 25D shows a side sectional view of the outlet channel 865 and the flipping inlet unit 870 before the outlet channel and the inlet unit are engaged. Shown in FIG. 25D is the pitcher 802 having a lower compartment 864, a bottom concave 860, and an outlet channel 865. Also shown in FIG. 25D is the flipping inlet unit 870 having a flipping base 871, an inlet tube 872, and an inlet nozzle 873. More particularly, residing in the outlet channel 865 is a spring valve 866. An O-ring 867 is attached to the spring valve 866 and disposed on the top of the outlet channel 865. There is an adapter 874 residing in the middle of the inlet nozzle 873. The adapter 874 is a rod structure pointing upward. Before engagement, the O-ring 867 seals the outlet channel 865 because the spring valve 866 pulls the O-ring 867 down to be held flush against the top surrounding walls of the outlet channel 865.

Figure 25E:
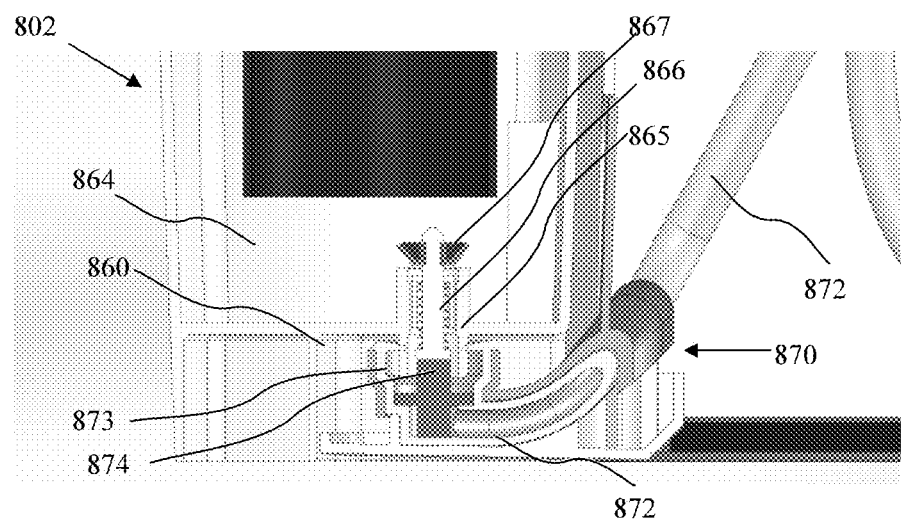
FIG. 25E shows a side sectional view of an outlet channel and a flipping inlet unit after the outlet channel and the inlet unit are engaged.

FIG. 25E shows a side sectional view of the outlet channel 865 and the flipping inlet unit 870 after the outlet channel and the inlet unit are engaged. Essentially the same elements are shown in FIG. 25E as FIG. 25D. For clarity purposes, not all elements are marked in FIG. 25E. As shown in FIG. 25E, after the outlet channel 865 and inlet nozzle 873 are engaged, the adapter 874 is inserted into the outlet channel 865, pushing the spring valve 866 upward, thereby also pushing the O-ring 867 up so that the O-ring 867 is no longer held flush against the top surround walls of the outlet channel 865. The liquid in the lower compartment 864 of the pitcher 802 may then flow through the outlet channel 865 into the inlet nozzle 873, resulting in a fluid connection between the pitcher 802 and the main unit 801 (not shown in FIG. 25E).

According to FIGS. 25A-E, liquid such as water may be poured into the upper compartment 863 and filtered by pitcher filter 862. The pitcher 802 may be put into a refrigerator to chill the liquid. Then a user may flip down the flipping inlet unit 870 and position the bottom concave 860 on the flipping inlet unit 870, making sure that the outlet channel 865 engages the inlet nozzle 873, establishing a fluid connection between the pitcher 802 and the main unit 801. The indentation of the bottom concave 860, the position and length of the outlet channel 865, and the height of the inlet nozzle 873 are designed so that when the outlet channel 865 operatively engages the inlet nozzle 873, the pitcher 802 is properly evenly positioned on the surface where the main unit 801 is placed. Moreover, with a proper connection between the pitcher 802 and the main unit 801, the two components are positioned side by side on a shared flat surface.

Figure 26:
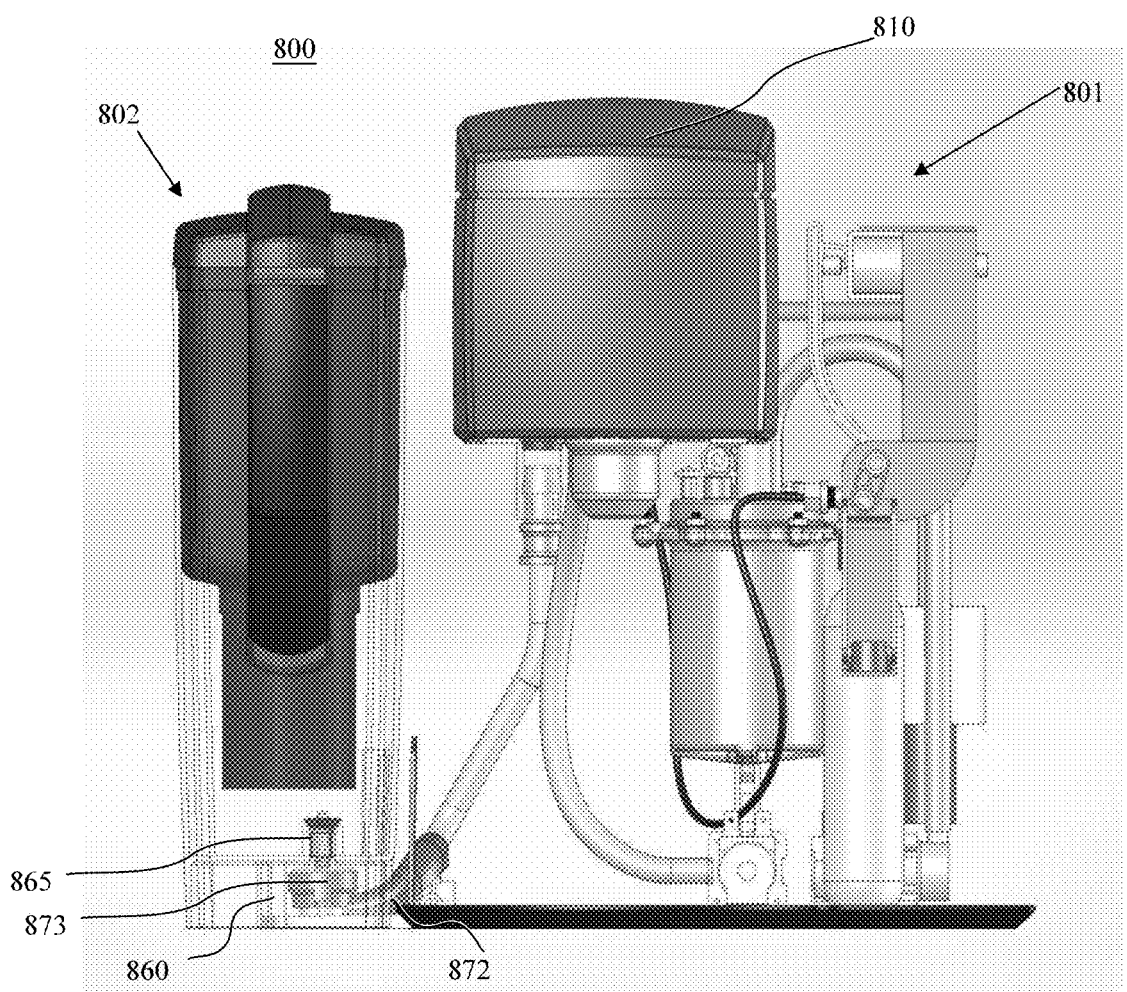
FIG. 26 shows a back view of the internal structures of the main unit of the beverage dispenser having a main unit and a removable water pitcher.

FIG. 26 shows a back view of the internal structures of the main unit 801 of the beverage dispenser 800. Shown in FIG. 26 are the main unit 801 having a head compartment 810, and the pitcher 802 having a bottom concave 860 and an outlet channel 865. Here the outlet channel 865 and the inlet nozzle 873 are engaged so that liquid in the pitcher may flow throw the inlet tube 872 into main unit 801. The dispensing housing 803, as illustrated in FIG. 20, is not shown in FIG. 26, exposing the internal components, the details of which are described in FIGS. 27A and 27B.

Figure 27A:
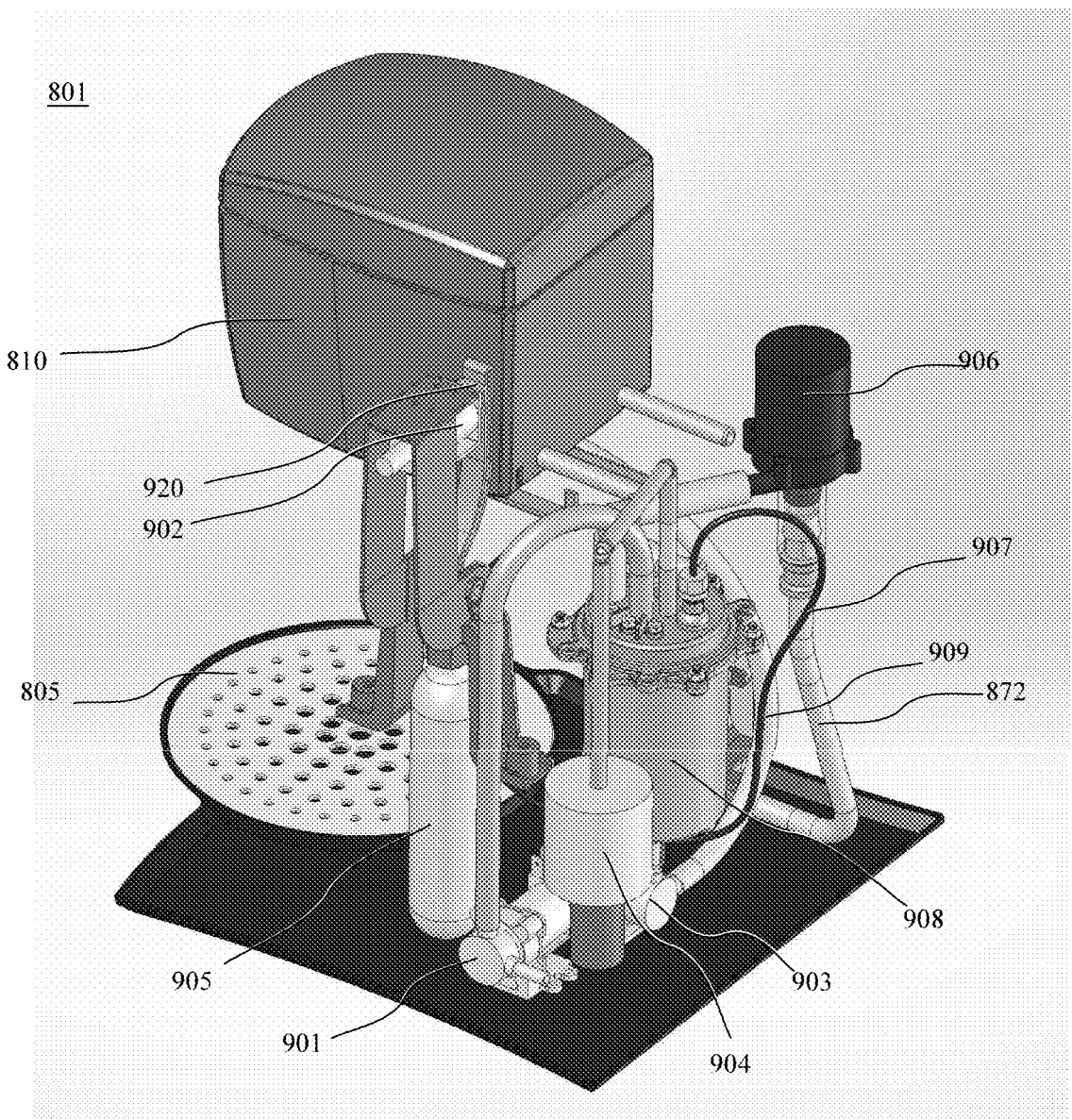
FIG. 27A shows a first perspective view of the internal structures of the main unit of the beverage dispenser.

FIG. 27A shows a first perspective view of the internal structures of the main unit 801 of the beverage dispenser. Shown in FIG. 27A are the head compartment 810, the inlet tube 872, a first solenoid 901, a second solenoid 902, a third solenoid 903, an air pump 904, a CO2 cylinder 905, a liquid pump 906, a CO2 supply line 907, a carbonation/dispensing tank 908, a main manifold supply line 909, a CO2 valve release lever 920, and a dripping pad 805.

Figure 27B:
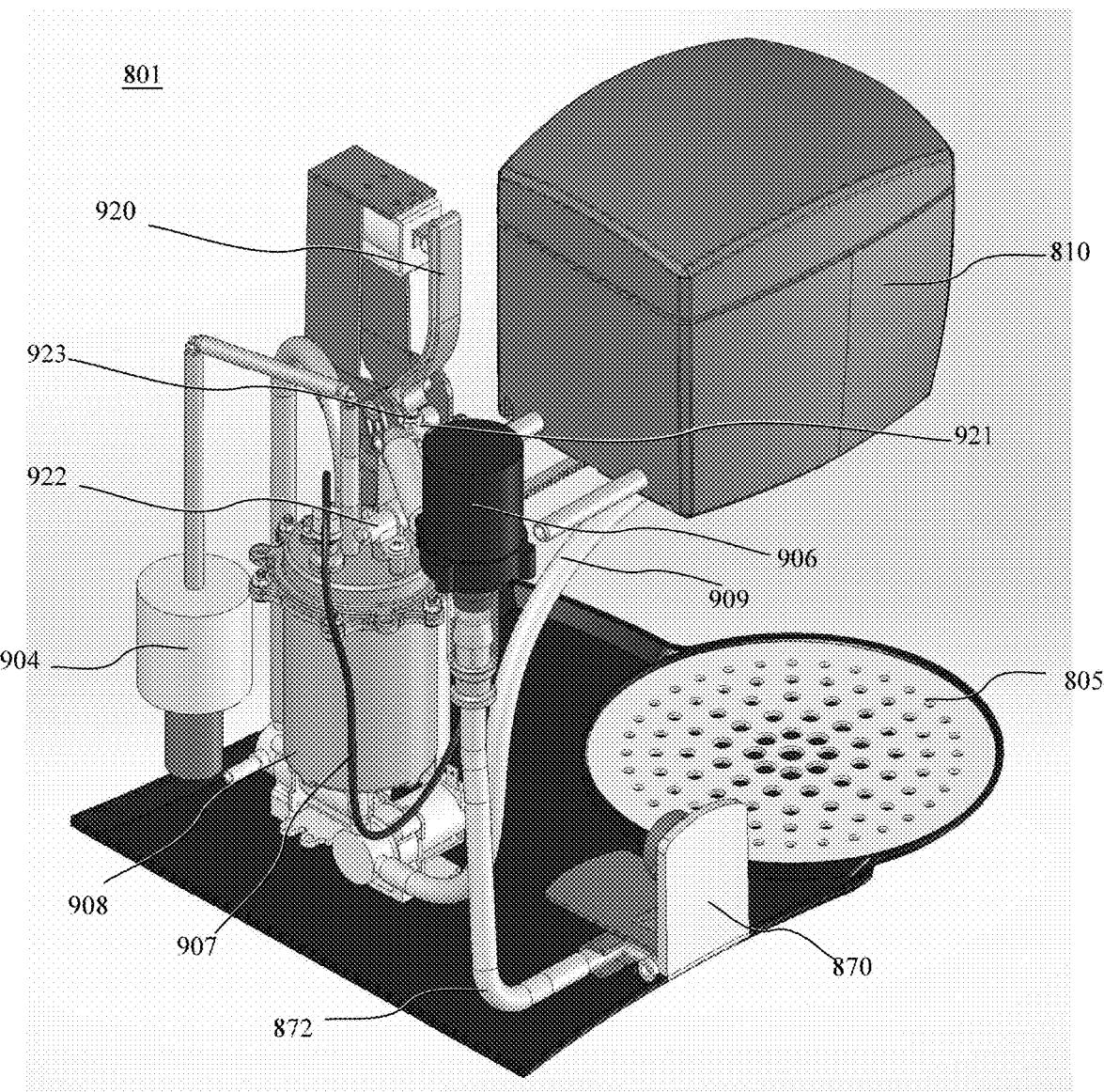
FIG. 27B shows a second perspective view of the internal structures of the main unit of the beverage dispenser.

FIG. 27B shows a second perspective view of the internal structures of the main unit 801 of the beverage dispenser. Shown in FIG. 27B are the head compartment 810, the flipping inlet unit 870, the inlet tube 872, an air pump 904, a liquid pump 906, a $CO_2$ supply line 907, a carbonation/dispensing tank 908, a main manifold supply line 909, a $CO_2$ valve release lever 920, a $CO_2$ valve body 921, a pressure relief valve 922, a valve plunger 923, and a dripping pad 805.

Figure 27C:
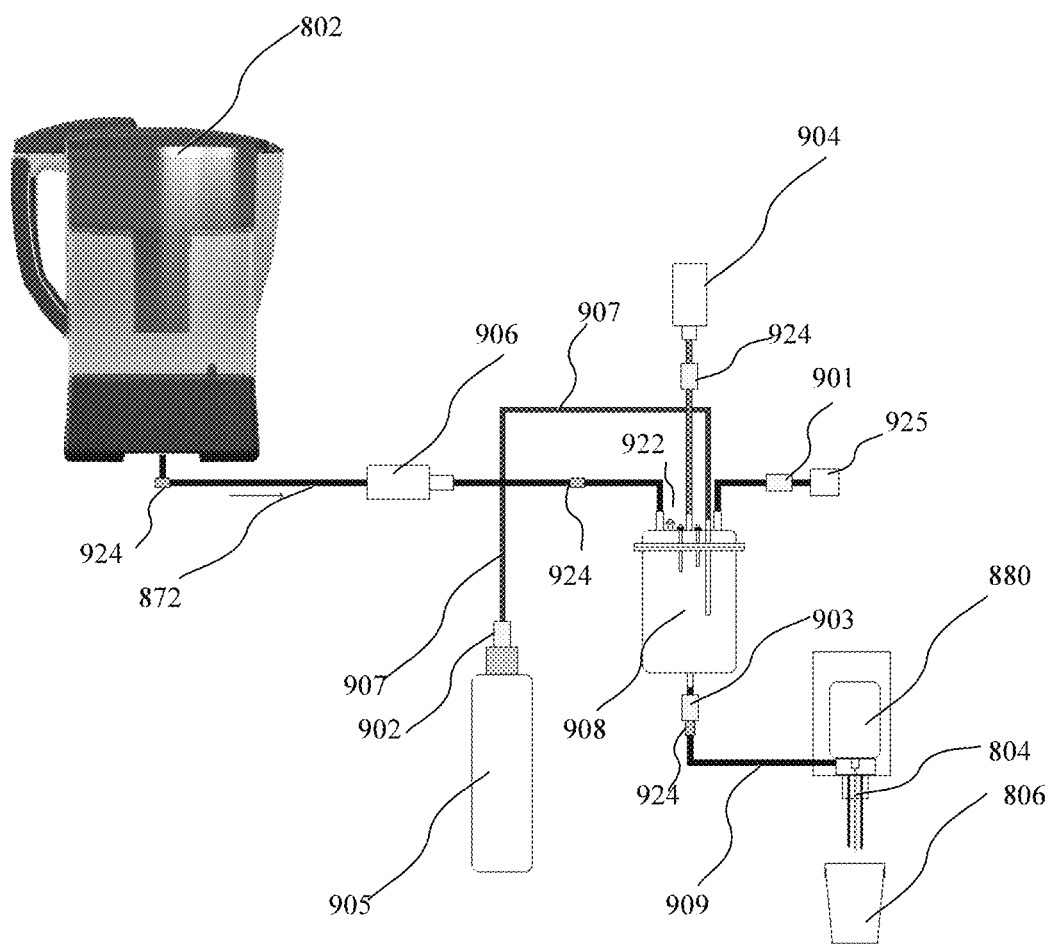
FIG. 27C shows a schematic diagram of the internal structures and their connections in the main unit.

FIG. 27C shows a schematic diagram of the internal structures and their connections in the main unit 801 of the beverage dispenser. Shown in FIG. 27C are the pitcher 802 connected with a inlet tube 872 the internal structures, including a first solenoid 901, a second solenoid 902, a third solenoid 903, an air pump 904, a CO2 cylinder 905, a liquid pump 906, a CO2 supply line 907, a carbonation/dispensing tank 908, a main manifold supply line 909, a pressure relief valve 922, a check valve 924, and a vent valve 925. Also shown in FIG. 27C is the beverage dispensing pouch 880, the dispensing nozzle 804, and the cup 806.

Referring to FIGS. 27A-C and also considering FIGS. 20-26, it is clear that the components of the main unit 801 are inter-connected. The beverage to be dispensed by the dispenser nozzle 804 is a mixture of concentrates from the beverage dispensing pouch 880 and liquid, e.g. water, from the pitcher 801. Some of the internal elements in FIGS. 27A and 27B are included to ensure that the liquid coming from the pitcher 802 may be carbonated so that the eventual beverage may be carbonated.

In a dispensing process, the contents of the beverage dispensing pouch 880 are identified by distinguishing factors such as a bar code on the pouch so that it may be determined what type of drink is to be produced. The first solenoid 901, which is connected to the vent valve 925, activates to allow the carbonation/dispensing tank 908 to attain atmospheric pressure. The water pump 906 then pumps the water out of the removable pitcher 802 and into the carbonation/dispensing tank 908. After the water is pumped into the tank 908, first solenoid 901 deactivates the vent valve to seal the tank 908 from atmospheric pressure.

If the beverage is carbonated, such as soda, the following process applies: the second solenoid 902, which is connected to the $CO_2$ valve release lever 920, activates and pushes the $CO_2$ valve release lever 920 to depress the valve plunger 923 on the $CO_2$ valve body 921 attached to the $CO_2$ cylinder 905, which in turn allows the $CO_2$ to go through the $CO_2$ supply line 907 into the carbonation/dispensing tank 908. This carbonation cycle happens 2 to 4 times until the pressure relief valve registers that full carbonation is attained. This whole carbonation process takes less than 15 seconds, preferably less than 4 seconds. If the beverage is non-carbonated, then no carbonation cycle is triggered.

When the water in the carbonation/dispensing tank 908 is ready, the air pump 904 turns on and applies constant air pressure to the carbonation/dispensing tank 908. Then, the third solenoid 903 opens to allow the carbonated or non-carbonated water in the carbonation/dispensing tank 908 to flow out the main manifold supply line 909 and into the dispensing nozzle 804. At the same time in the dispensing head 810, the rollers 850 are compressing the beverage dispensing pouch 880 so that the contents of the beverage dispensing pouch 880 are dispensed, as shown in FIGS. 24A and 24B. The contents of the beverage dispensing pouch 880 flows into the dispensing nozzle 804. In this process, the carbonated or non-carbonated water and syrup/concentrate from the beverage dispensing pouch 880 flow at the same time through the dispensing nozzle 804 and post-mix in the air as they flow into the users glass. The air pump 904 continues to pump air for a few seconds after dispensing is complete in order to flush out the residues from any left over water. Once the drink is dispensed the user can dispose of the used beverage dispensing pouch 880 and remove the water pitcher 802 and place it back in the refrigerator to continue to chill the water for the next use. The user can fill the pitcher 802 as needed with fresh water. The user may also use ice to chill the water in the pitcher 802. Overall, not including a refrigerating unit in the dispenser may save significant cost.

Figure 28A:
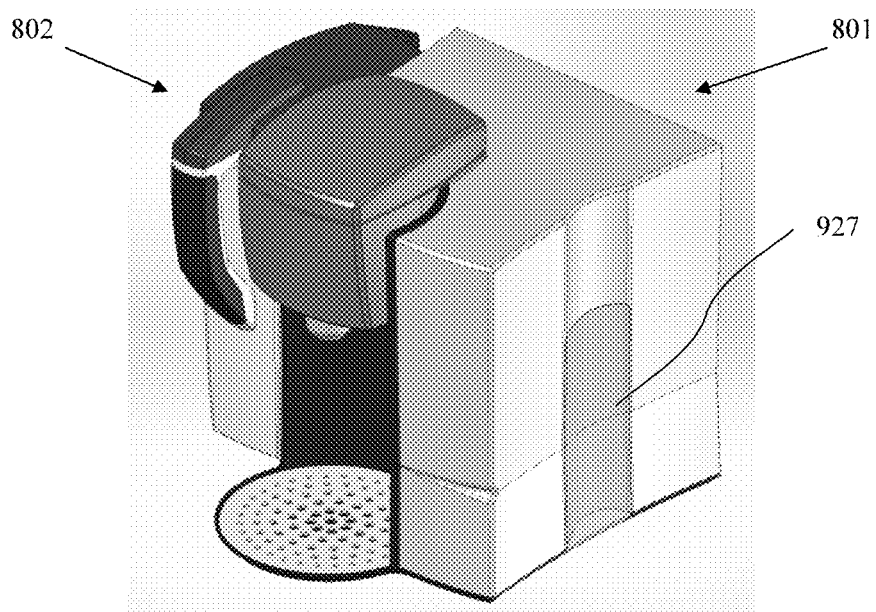
FIG. 28A shows a perspective view of the beverage dispenser with a CO2 cylinder replacement mechanism when the $CO_2$ cylinder gate is closed.

FIG. 28A shows a prospective view of the beverage dispenser 800 with the CO2 cylinder replacement mechanism when the $CO_2$ cylinder gate 927 is closed. Shown in FIG. 28A are the pitcher 802 and the main unit 801, wherein on a side wall of the main unit 801 there is a $CO_2$ cylinder gate 927 that is closed.

Figure 28B:
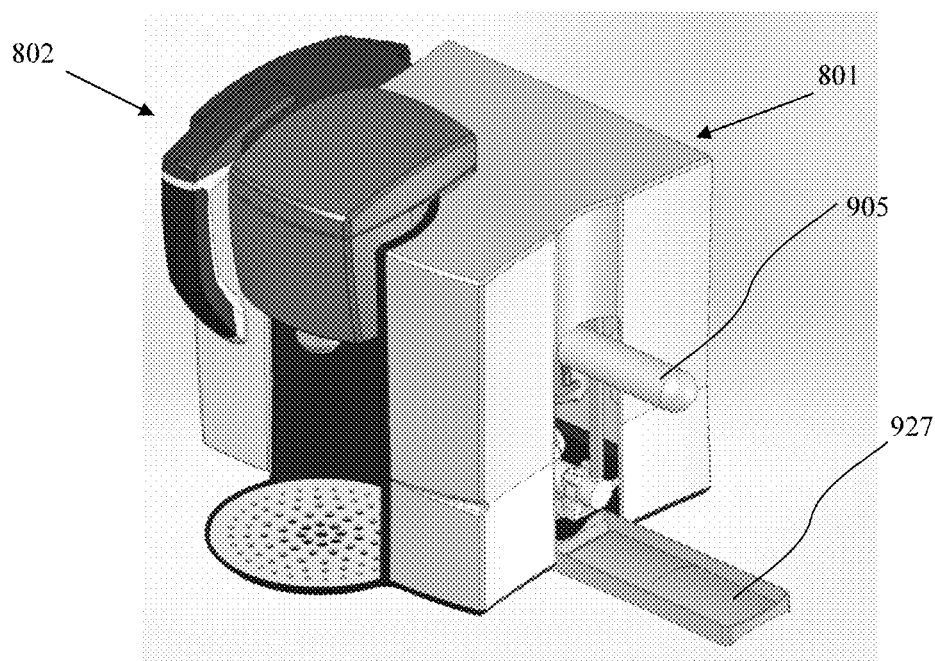
FIG. 28B shows a perspective view of the beverage dispenser with the CO2 cylinder replacement mechanism when the $CO_2$ cylinder gate is open.

FIG. 28B shows a prospective view of the beverage dispenser 800 with the CO2 cylinder replacement mechanism when the $CO_2$ cylinder gate 927 is open. Shown in FIG. 28A are the pitcher 802 and the main unit 801, wherein on a side wall of the main unit 801 there is a $CO_2$ cylinder gate 927 that is open by flipping down. The $CO_2$ cylinder 905 is rotated from a vertical position as shown in FIG. 27A to a horizontal position, allowing the user to change the $CO_2$ cylinder 905 with ease. The $CO_2$ cylinder 905 is attached to frame with a hinge, allowing the $CO_2$ cylinder 905 to pivot and protrude out of the $CO_2$ cylinder gate 927 when the gate is open. The opening of the gate and the pivoting of the $CO_2$ cylinder may be controlled manually or automatically.

The beverage dispensing device may also include a telemetry control and data retrieval system. For example, a Wi-Fi card or a similar transmitting device may be implanted into the circuits of the beverage dispensing device, allowing it to communicate with the internal IC board and connect to the user's home Wi-Fi network and the Internet.

The user may register his/her machine and MAC Address with a designated website and create a user profile. This connectivity may allow the beverage dispensing device to communicate with the supplier's back end servers to track the user's personal consumption and allow an automated re-order system to know when to send out the user's next order of consumables. It may also help to identify what flavors of beverage are selling best and allow the manufacturing facility to streamline what is manufactured to avoid excessive warehousing of inventory. The supplier may also be able to target users with special offerings based on this data.

It is also within the realm of this disclosure to include a specific program, or application, for smart phones such as the iPhone®, and/or other hand-held computing devices such as iPad®, to allow the users to see their consumptions and be notified when they are running low on consumables such as beverage pouches, filter cartridges and $CO_2$ gas cylinders.

The carbonation system 600 may include an insulating carbonation dispensing tank 610 into which refrigerated water may be pumped via a check valve 530. The liquid in the insulating carbonation dispensing tank 610 may be carbonated by $CO_2$ provided from a $CO_2$ cylinder 270. The carbonated water in the insulating carbonation dispensing tank 610 may be kept under pressure by an air pump 620 that may be regulated by a vent valve 630. When the user selects to dispense a beverage, the carbonated water may be supplied under the pressure in the carbonation tank via a check valve 530 to the mixing nozzle structure 195 to mix with the concentrate from the beverage dispensing cartridge 110 or the beverage dispensing pouch 20.

To use this embodiment, a user opens the dispensing head 810 and inserts a syrup/concentrate pouch 110 into the beverage dispensing head 810. When the dispensing head 810 is opened a lever/cantilever mechanism cocks a spring mechanism that provides the pressure needed to compress the compression plates to dispense the pouch 110's contents. Preferably, this spring mechanism will incorporate a 401b to 801b spring. This mechanism is a manual dispense process that is set in motion by the user placing a glass under the dispense head 810 and depressing a metal lever. In addition this lever/mechanism can also dispense the soda water out of the carbonation dispensing tank 610 via a manual lever process.

This embodiment has the advantage of eliminating the need for separate motorized assemblies for dispensing and carbonation. This embodiment also eliminates the need for an air pump to blow the lines clean by simply using $CO_2$ to blow the lines clean after each dispense. This also engages the consumer into a fun recognizable experience.

In a preferred embodiment, the present invention uses a removable/refillable water pitcher concept which is simple and unique. However, unlike the contents of that application, the water outlet can and should be placed on the top right of the water pitcher, as opposed to it being located on the bottom left of the water pitcher. By using the removable/refillable water pitcher concept, the need for the present invention to have its own refrigeration system is eliminated. Beneficially, the refrigeration source can be, for example, a standard refrigerator; something that is located in almost every kitchen in America.

In a preferred embodiment, this pitcher is equipped with a replaceable water filter, which sits in the top of the pitcher reservoir. The replaceable water filter can be comprised of many suitable materials such as, for example, elemental carbon. This replaceable water filter may be equipped with either standardized or proprietary fittings. In a preferred embodiment, this replaceable water filter has a unique oval base shape. It is also suitable for the replaceable water filter to utilize ion filtration. In a preferred embodiment, the pitcher's method of use is as follows: a user pours tap or any other kind of water into the reservoir, allowing it to filter down into the pitcher. Once the pitcher is filled the user will place the pitcher into a refrigerator to chill the water. Once the water is chilled the user will remove the pitcher from the refrigerator and seat it onto the male inlet adapter, which flips down, on the side of the beverage machine. Once this connection between the pitcher and the beverage machine is made, the male adapter pushes in the female spring valve in the water pitcher bottom allowing the water in the pitcher to become fluidly connected to the beverage dispenser. Once a drink has been dispensed the user can remove the water pitcher and place it back in the refrigerator to continue to chill the water for the next use. If needed, the user can fill the pitcher with fresh water before returning it to the user's desired source of refrigeration.

In a preferred embodiment, the present invention further comprises a pouch and fitment. This combination is disclosed in U.S. patent application Ser. No. 13/604,825, the contents of which are hereby incorporated by reference. In another preferred embodiment, the present invention further comprises a refillable $CO_2$ container. Preferably, this container will be constructed out of a 16 oz food grade aluminum Type 3 cylinder with a proprietary connection fitting or DOT3AL-1800 aluminum cylinder with proprietary connection fitting. Optionally, this container may also employ standardized parts.

Although this invention has been described with a certain degree of particularity, it is to be understood that the present disclosure has been made only by way of illustration and that numerous changes in the details of construction and arrangement of parts may be resorted to without departing from the spirit and the scope of the invention.

Figure 29:
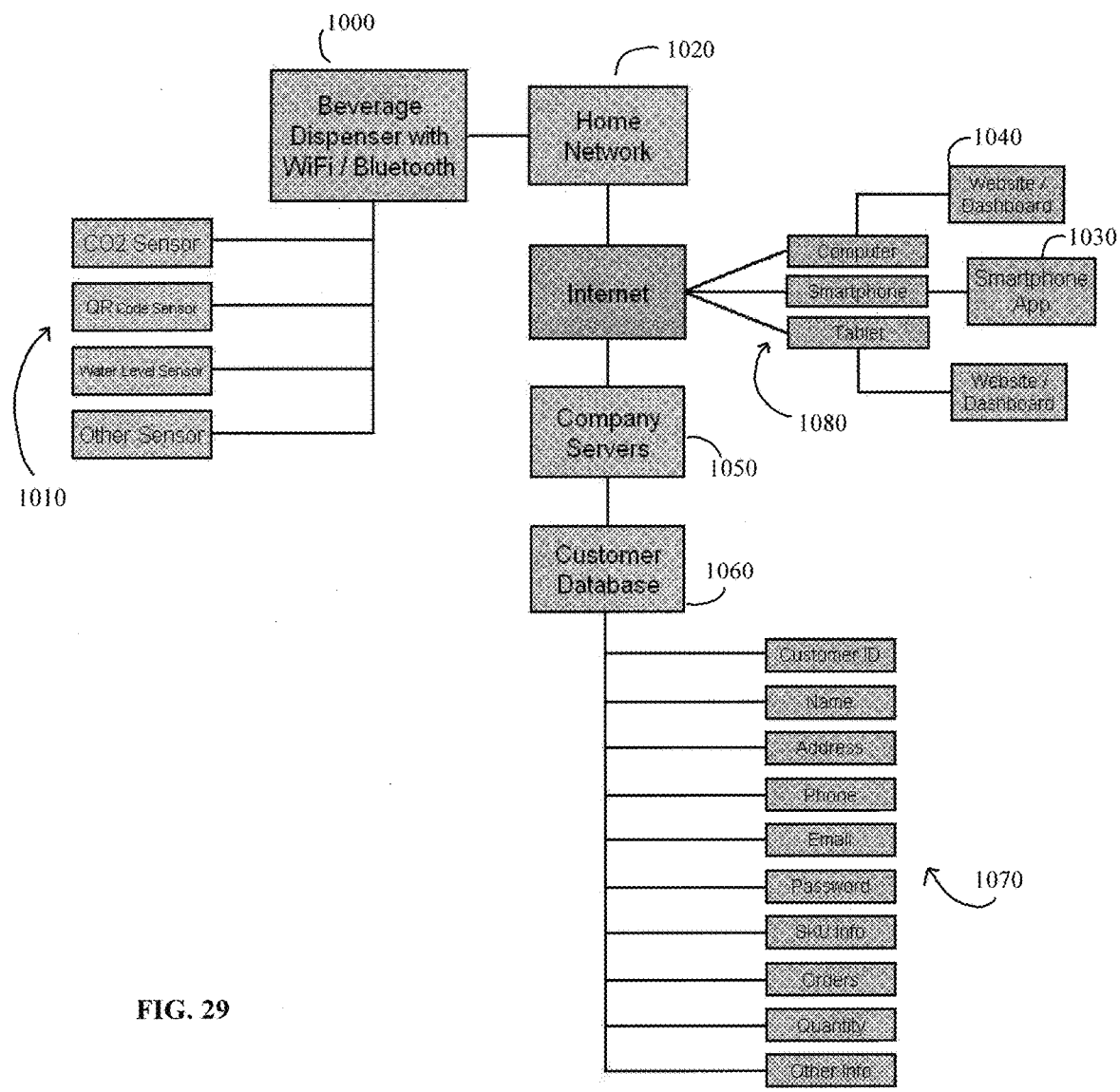
FIG. 29 shows a flow chart illustrating the method of use of the Wi-Fi capabilities of an embodiment of the present invention.

Referring to FIG. 29, a flow chart illustrating the method of use of the Wi-Fi capabilities of an embodiment of the present invention. This figure shows a home beverage dispensing device with Wi-Fi/Bluetooth 1000 operatively connected to a user's home network 1020. This home network 1020 is connected to the internet and may be accessed from a user device 1080. Such a user device 1080 can be, for example, a computer, a smartphone, or a tablet. If user device 1080 is a smartphone, a user will be able to interface with the beverage dispenser with Wi-Fi/Bluetooth 1000 via smartphone app 1030. If user device 1080 is a computer or a tablet, a user will interface with beverage dispenser with Wi-Fi/Bluetooth 1000 via website 1040. In addition to this functionality, smartphone app 1030, website 1040, and beverage dispenser with Wi-Fi/Bluetooth 1000 will communicate with at least one company server 1050. At least one company server 1050 will maintain customer database 1060, which contains at least one item of information 1070. At least one item of information 1070 can be, for example, a user's customer ID, name, address, phone, email, password, SKU info, pending orders, previous orders, consumption habits, as well as other not expressly disclosed items of information. In a preferred embodiment, the present invention is equipped with a radio communications controller. This controller can communicate via, for example, Wi-Fi, Bluetooth, FM, AM, GPS, GSM, CDMA, LTE, HSPA, NFC and HSPA+ protocols.

Figure 30:
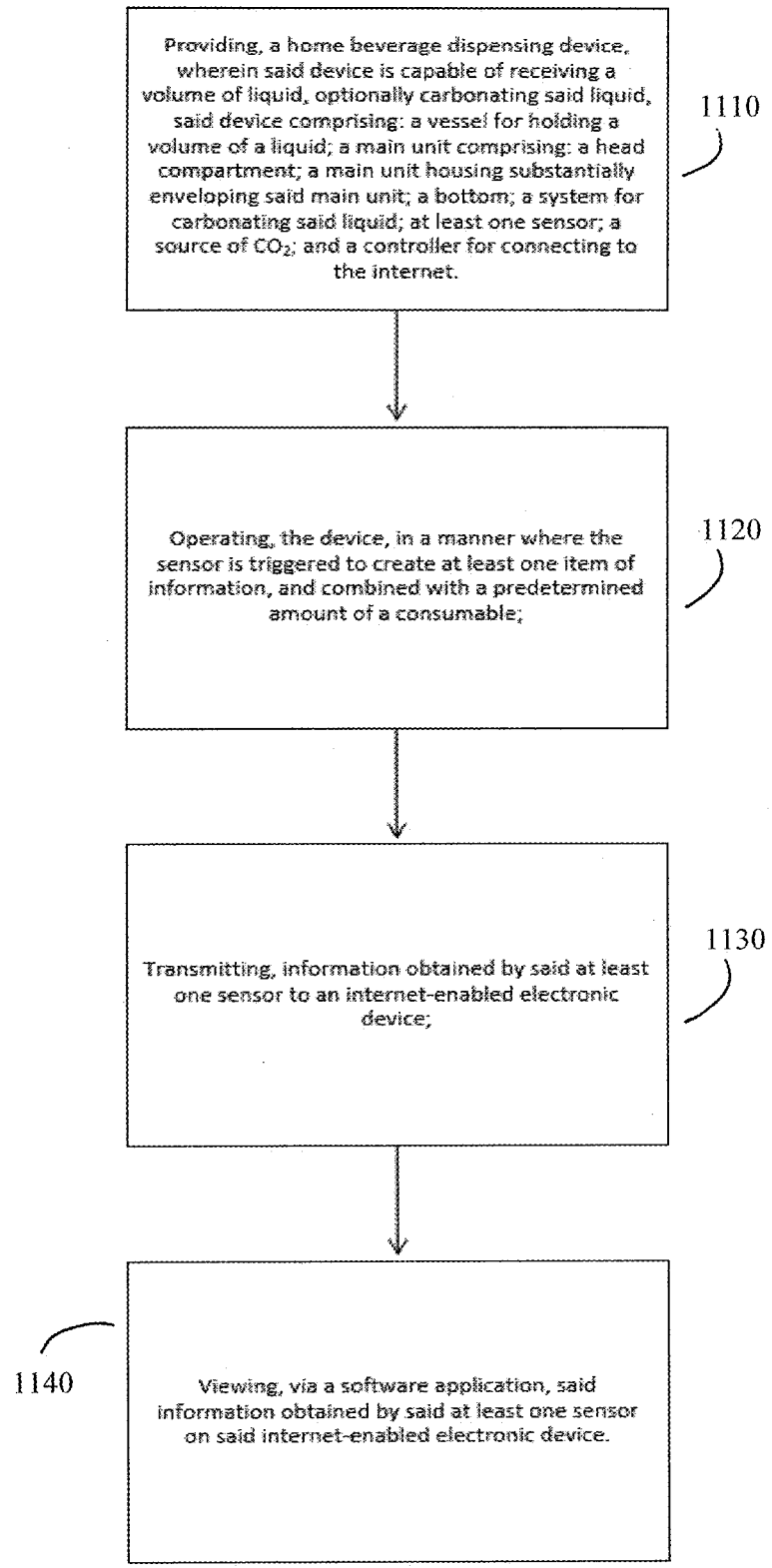
FIG. 30 shows a flow chart illustrating an embodiment of the method of the present invention.

Referring to FIG. 30 a flow chart illustrating the method of the present invention is disclosed. The first step, step 1110 consists of providing, a home beverage dispensing device, wherein said device is capable of receiving a volume of liquid, optionally carbonating said liquid, said device comprising: a vessel for holding a volume of a liquid; a main unit comprising: a head compartment; a main unit housing substantially enveloping said main unit; a bottom; a system for carbonating said liquid; at least one sensor; a source of $CO_2$; and a controller for connecting to the internet. The next step, step 1120 consists of operating, the device, in a manner where the sensor is triggered to create at least one item of information, and combined with a predetermined amount of a consumable. The method then continues with step 1130, which provides for transmitting, information obtained by said at least one sensor to an internet-enabled electronic device. Step 1140 follows, consisting of viewing, via a software application, said information obtained by said at least one sensor on said internet-enabled electronic device.

Specifically, a user places a pouch into the dispensing head and places a glass under the nozzle. The device reads a bar code/QR code/binary code identification on the pouch and determines if the drink is to be carbonation or not. To "Dispense" the beverage we can do it a few different ways but the end result is that the next steps occur. The device will pump cold water from the removable water pitcher and flow that water through the mixing nozzle. At the same time the concentrate from the pouch will be squeezed by the dispensing mechanism and will flow through the center of the mixing nozzle. The cold water and concentrate flow through the mixing nozzle and flow into the users cup to produce a cold post mix beverage. The drink will dispense in 6 to 8 seconds. The nozzle is designed so that the dispensing of each beverage is clean and there is no left over residue from a previous drink, to avoid cross flavor contamination. We want to avoid cross flavor contamination and this system does that. If a carbonated drink is selected there will be an additional step where the water gets pumped into a mini carbonation tank first, then carbonated and then dispensed through the mixing nozzle as described above.

The Wi-Fi module in the beverage dispensing device transmits the user specific data to external server's backend via the users account. This external server may be owned by, for example, a manufacturer of the home beverage dispensing device, a third party, or optionally be the user of the home beverage dispensing device. This data is captured through multiple sensors embedded into the beverage dispenser and used to build a usage profile for every customer. This data is used to benefit the customer as well as the company to make the users' experience simple and fun. The transmittal of data between the beverage dispensing device, the user's home network, the internet and the company's backend servers can be assumed to be protected under secure Wi-Fi standards, firewalls and standard internet security procedures that would already be in place under normal home network circumstances. In various embodiments, some types of data that can be collected includes, but is not limited to: user's name, address, phone, email, password, SKU information, quantity, order history, consumptions usage, frequency of usage, automated supply reorders, special coupons, reminders emails, machine troubleshooting, $CO_2$ usage, drink mix ratios, and user likes and dislikes.

The present invention contemplates an accompanying software application for smartphones including but not limited to windows phone, iPhone, Android type phones, iPads, etc. that is used as an interface to manage the users account. This application can talk to the beverage dispensing machine and an external server to provide inventory updates and sync details between the various data collection categories. For example, a hypothetical user goes to the store and buys 36 flavor pouches and two $CO_2$ cylinders for use with their beverage dispensing machine. The user may simply use their smartphone app to scan the inventory they just bought which in turn will be logged into their customer account. Each time the user uses their beverage dispensing device, the device communicates with said external server's backend to track their inventory and consumption stats. When this user sets up their account, it is possible to arrange for inventory alerts that can remind the user to order more consumables at a set limit. It is also possible for the application to set automatic ordering protocols that order replacement consumables without user input. In addition the app provides a dashboard to the user to show them their consumption stats which can include but not limited to calories, fat, sugars, number of drinks per day/week/month and this can in turn be integrated into the users diet program or data can be shared with various other software applications to be part of a total dietary health program. In one embodiment, the external server provides for a means for users to share recipes with other users over the internet.

In another embodiment, the operation of the home beverage dispenser device results in a carbonated liquid being present in the vessel for holding a volume of liquid.

In one embodiment, the beverage dispensing Wi-Fi system has the capability to link to a user's social media account including but not limited to Facebook, Twitter, Pinterest, Instagram, LinkedIn, etc., to provide updates on the users' consumption as well as other criteria set by the user, should the user so desire to share that information. This can be controlled from within the smartphone application or from the user's account via the company's website. This feature also has the ability to link with popular health and fitness smartphone applications and websites via internet connectivity through the Wi-Fi to allow the user to setup a monitored health and fitness beverage consumption plan.

Figure 31:
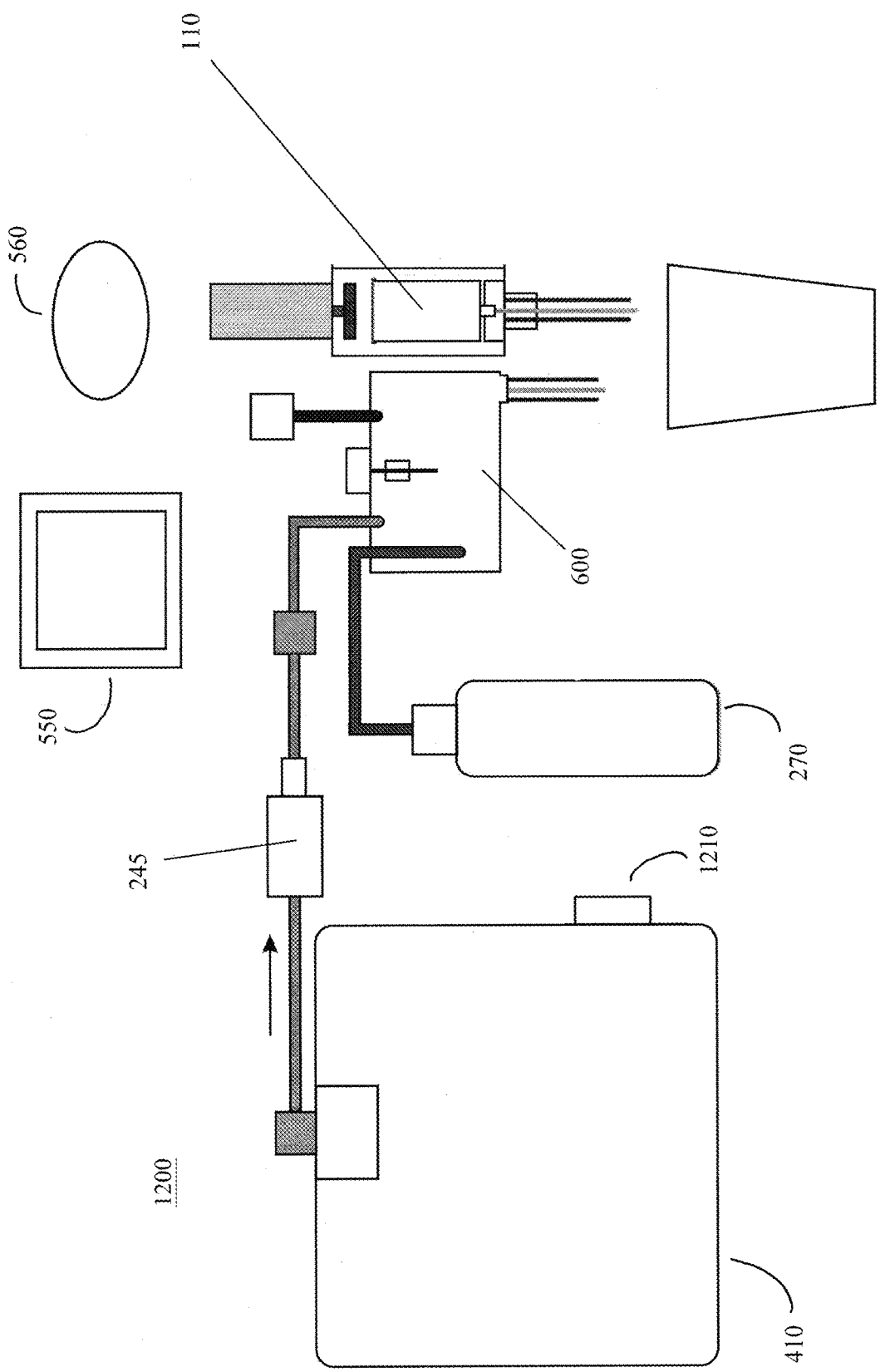
FIG. 31 shows a schematic of an alternative embodiment of the present invention.

Referring to FIG. 31, a schematic of an alternative embodiment of the present invention is provided for. Specifically, home beverage dispensing device 1200 is comprised of, vessel 410, pump 245, controller connecting to the internet 550, at least one sensor 1210, software application 1220, pouch 110, system for carbonating 600, and source of $CO_2$ 270. Of note here is the lack of a refrigeration unit. In a preferred embodiment vessel 410 is removable. In another preferred embodiment, software application 560 is configured to operated home beverage dispensing device 1200 via controller for connecting to the internet 550. In a preferred embodiment, controller for connecting to the internet 550 is configured to communicate with at least one internet-enabled electronic device via, for example, Wi-Fi, Bluetooth, FM, AM, GPS, GSM, CDMA, LTE, HSPA, NFC and HSPA+ protocols.

In another preferred embodiment, the present invention may be used to dispense a plurality of beverages. This process of dispensing a plurality of beverages can be known colloquially as "multi-serve."

In a preferred embodiment, the Wi-Fi connectivity allows the beverage machine to communicate with the users' online account via an external website where a parent (adult) can set limits on the beverage machines usage by a minor (child). This can be done via several methods. For example, the beverage machine can use an authentication based system to identify who is using the beverage machine. In one embodiment, done by Wi-Fi/Bluetooth connectivity to a smartphone, a smartphone token based application, by use of a physical Secure ID token, an RFID user tag (embedded in the child's favorite cup or favorite figurine for example), a manual entered passcode by the user on the beverage machine keypad, etc. The user would simply present their authentication to the beverage machine and the beverage machine would identify the user. The machine would then communicate with the Internet via Wi-Fi connectivity over the user's home internet connection to the external server's backend to obtain the rules that apply to that specific user. The beverage machine would then allow or disallow the user to make their beverage. Whether or not the user is allowed to make a drink, rules can be set to notify the user and or multiple users as to why they were or were not allowed to make their beverage. These notifications can be in the form of, but not limited to, a message via LCD display on the beverage machine, a text via smartphone, an email, etc. For example that specific user may be limited to making 2 sodas a week but unlimited orange juices yet they tried to make a $3^{rd}$ soda but were declined to do so. The beverage machine can then recommend to the user to make a seltzer water or other healthy drink instead of a soda. The configurations are limitless and all based on how the rules are setup by the user. All of these features allow the user whether adult or child be conscience of their beverage consumption. This software also provides the additional benefit of allowing to help monitor and control users with special health needs.

What is claimed is:

1. A method of using information in a machine-readable element located on a beverage dispensing pouch or beverage dispensing cartridge comprising:

retrieving the information in the machine-readable element located on the beverage dispensing pouch or the beverage dispensing cartridge by reading the machine-readable element, the information related to the beverage dispensing pouch or the beverage dispensing cartridge;

controlling an operation of a beverage dispensing device based on the information retrieved from the machine-readable element; and applying pressure to the beverage dispensing pouch or the beverage dispensing cartridge, and rupturing a seal of the beverage dispensing pouch or beverage dispensing cartridge.

2. The method of claim 1, wherein the machine-readable element is one of the group consisting of a printed indicator, a digital indicator, and combinations thereof.

3. The method of claim 1, wherein the information retrieved from the machine-readable element is one of the group consisting of: type of the beverage dispensing pouch or the beverage dispensing cartridge; instructions for use of the beverage dispensing pouch or the beverage dispensing cartridge; ingredients of the beverage dispensing pouch or the beverage dispensing cartridge; and combinations thereof.

4. The method of claim 1, wherein the reading the machine-readable element includes reading the machine-readable element via optics or electronics integral to the beverage dispensing device.

5. A method of using information in a machine-readable element located on a beverage dispensing pouch or beverage dispensing cartridge comprising:

retrieving the information in the machine-readable element located on the beverage dispensing pouch or the beverage dispensing cartridge by reading the machine-readable element, the information related to the beverage dispensing pouch or the beverage dispensing cartridge; and performing an action selected from the group consisting of:

controlling an operation of a beverage dispensing device based on the information retrieved from the machine-readable element;

capturing user behavior of a user of the beverage dispensing device using the information retrieved from the machine-readable element; and combinations thereof wherein the operation of the beverage dispensing device includes applying pressure to the beverage dispensing pouch or the beverage dispensing cartridge, and rupturing a seal of the beverage dispensing pouch or beverage dispensing cartridge.

6. The method of claim 5, wherein the machine-readable element is one of the group consisting of a printed indicator, a digital indicator, and combinations thereof.

7. The method of claim 5, wherein the information retrieved from the machine-readable element is one of the group consisting of: type of the beverage dispensing pouch or the beverage dispensing cartridge; instructions for use of the beverage dispensing pouch or the beverage dispensing cartridge; ingredients of the beverage dispensing pouch or the beverage dispensing cartridge; SKU of the beverage dispensing pouch or the beverage dispensing cartridge; and combinations thereof.

8. The method of claim 5, wherein the beverage dispensing device communicates the information to a remotely located server or computing device.

9. The method of claim 5, wherein the beverage dispensing device communicates the information to a remotely located server or computing device via the Internet.

10. The method of claim 5, wherein the reading the machine-readable element includes reading the machine-readable element via optics or electronics integral to the beverage dispensing device.

11. The method of claim 5, wherein capturing user behavior using the retrieved information includes tracking at least one of the group consisting of: type of the beverage dispensing pouch or the beverage dispensing cartridge; consumption of the beverage dispensing pouch or the beverage dispensing cartridge; and combinations thereof.

12. The method of claim 5, further comprising:
receiving secondary information from the user, the secondary information selected from the group consisting of: user name; user email address; user physical address; user phone number; user password; user likes; user dislikes; beverage dispensing device identification code; and combinations thereof; and
marketing to the user based upon the information retrieved from the machine-readable element and the secondary information.

13. The method of claim 5, further comprising:
receiving secondary information from the user, the secondary information selected from the group consisting of: user name; user email address; user physical address; user phone number; user password; user likes; user dislikes; beverage dispensing device identification code; and combinations thereof; and
automatically shipping beverage dispensing pouches or beverage dispensing cartridges to the user based upon the information retrieved from the machine-readable element and the secondary information.

14. The method of claim 5, further comprising:
receiving secondary information from the user, the secondary information selected from the group consisting of: user name; user email address; user physical address; user phone number; user password; user likes; user dislikes; beverage dispensing device identification code; and combinations thereof; and
prompting the user to reorder beverage dispensing pouches or beverage dispensing cartridges based upon the information retrieved from the machine-readable element and the secondary information.

* * * * *